(12) United States Patent
Losik

(10) Patent No.: US 11,702,886 B2
(45) Date of Patent: Jul. 18, 2023

(54) SAFETY GATE FOR PETS AND SMALL CHILDREN

(71) Applicant: Kyle R. Losik, Healdsburg, CA (US)

(72) Inventor: Kyle R. Losik, Healdsburg, CA (US)

( * ) Notice: Subject to any disclaimer, the term of this patent is extended or adjusted under 35 U.S.C. 154(b) by 0 days.

(21) Appl. No.: 17/606,388

(22) PCT Filed: Aug. 5, 2020

(86) PCT No.: PCT/US2020/045010
§ 371 (c)(1),
(2) Date: Oct. 25, 2021

(87) PCT Pub. No.: WO2021/026237
PCT Pub. Date: Feb. 11, 2021

(65) Prior Publication Data
US 2022/0195790 A1     Jun. 23, 2022

Related U.S. Application Data

(63) Continuation-in-part of application No. 16/459,921, filed on Jul. 2, 2019, now abandoned, which is a continuation-in-part of application No. 15/453,204, filed on Mar. 8, 2017, now Pat. No. 10,538,958.

(60) Provisional application No. 62/882,637, filed on Aug. 5, 2019, provisional application No. 62/692,903, filed on Jul. 2, 2018, provisional application No. 62/305,224, filed on Mar. 8, 2016.

(51) Int. Cl.
| E06B 9/06 | (2006.01) |
| E06B 9/02 | (2006.01) |
| A01K 1/035 | (2006.01) |
| E06B 9/00 | (2006.01) |

(52) U.S. Cl.
CPC ............ *E06B 9/06* (2013.01); *A01K 1/035* (2013.01); *E06B 9/02* (2013.01); *E06B 2009/002* (2013.01)

(58) Field of Classification Search
CPC . E06B 9/0692; E06B 9/08; E06B 9/60; E06B 9/02; E06B 9/04; E06B 9/00; E06B 2009/002; E06B 9/54; E06B 11/02; A01K 1/035
See application file for complete search history.

(56) References Cited

U.S. PATENT DOCUMENTS

| 181,318 | A | | 8/1876 | Davis |
| 232,725 | A | | 9/1880 | Joseph |
| 1,216,794 | A | | 2/1917 | Garman |
| 2,225,167 | A | | 12/1940 | Farmer |
| 5,060,421 | A | | 10/1991 | Castelli |
| 5,312,467 | A | | 5/1994 | Wolfe |
| 5,483,779 | A | * | 1/1996 | Crawford ............... G09F 15/00 52/645 |
| 5,531,258 | A | * | 7/1996 | Poulson ............... E06B 9/0692 256/DIG. 1 |

(Continued)

FOREIGN PATENT DOCUMENTS

GB   2498523 A   7/2013

*Primary Examiner* — Justin B Rephann
(74) *Attorney, Agent, or Firm* — Pandiscio & Pandiscio

(57) ABSTRACT

A safety gate for preventing pets and small children from passing through an opening, the safety gate comprising: a frame for selective disposition in the opening, the frame defining a passageway; and a cross-member for adjustable mounting to the frame so as to prevent a pet or small child from passing through the passageway.

26 Claims, 84 Drawing Sheets

(56) References Cited

U.S. PATENT DOCUMENTS

| | | |
|---|---|---|
| 5,575,113 A | 11/1996 | Huang |
| 5,594,418 A | 1/1997 | Martin |
| 5,638,885 A * | 6/1997 | Freese .................. E06B 9/02 160/369 |
| 5,657,809 A | 8/1997 | Longoria et al. |
| 5,660,144 A | 8/1997 | Venti |
| 5,671,790 A | 9/1997 | Andersen et al. |
| 5,704,164 A | 1/1998 | Huang |
| 5,868,191 A | 2/1999 | Blackmon, Jr. |
| 5,906,421 A | 5/1999 | Floyd |
| 6,056,038 A | 5/2000 | Foster et al. |
| 6,189,839 B1 | 2/2001 | Lemieux |
| 6,296,041 B1 | 10/2001 | Cicero |
| 6,301,832 B1 | 10/2001 | Andersen |
| 6,470,948 B2 | 10/2002 | Yates et al. |
| 6,474,021 B2 * | 11/2002 | Homeyer ............... A47D 7/002 49/57 |
| 6,557,611 B1 | 5/2003 | Fuentes |
| 6,575,435 B1 | 6/2003 | Kotzen |
| 6,638,885 B1 | 10/2003 | Mcgrath et al. |
| 6,711,857 B1 | 3/2004 | Wagnitz et al. |
| 6,733,204 B1 | 5/2004 | Paniccia |
| 6,807,999 B1 | 10/2004 | Bowen |
| 7,178,792 B2 | 2/2007 | Monahan et al. |
| 7,219,709 B1 | 5/2007 | Williams |
| 7,318,298 B2 | 1/2008 | Marsden et al. |
| 7,334,624 B2 | 2/2008 | Waldman et al. |
| 7,356,966 B2 | 4/2008 | Burke |
| 7,377,490 B1 * | 5/2008 | Khosravian ............ E06B 9/08 160/24 |
| 7,658,220 B2 | 2/2010 | Yates |
| 8,230,816 B2 | 7/2012 | Hirokawa et al. |
| D698,505 S | 1/2014 | Muzaffer |
| 8,745,922 B1 | 6/2014 | Matsuda et al. |
| 8,881,787 B2 | 11/2014 | Wang |
| 8,887,441 B2 | 11/2014 | Lundh |
| 9,140,056 B2 | 9/2015 | Fitzpatrick |
| 9,328,551 B2 * | 5/2016 | Henderson .............. E06B 9/04 |
| 9,598,896 B1 | 3/2017 | Pichik |
| 9,802,440 B2 * | 10/2017 | Lu ........................ B44D 3/185 |
| 10,458,152 B2 | 10/2019 | Schort et al. |
| 10,794,091 B2 | 10/2020 | Smith et al. |
| 10,815,723 B1 | 10/2020 | Davis |
| 2002/0194786 A1 | 12/2002 | Hincher, Sr. |
| 2003/0029089 A1 | 2/2003 | Wenzl et al. |
| 2003/0197164 A1 | 10/2003 | Monahan et al. |
| 2005/0098770 A1 | 5/2005 | Schell |
| 2005/0173078 A1 | 8/2005 | Perez, Jr. |
| 2006/0092378 A1 | 5/2006 | Marsden et al. |
| 2006/0151123 A1 | 7/2006 | Chandler |
| 2006/0180283 A1 | 8/2006 | Andersen |
| 2006/0180284 A1 | 8/2006 | Wiggins |
| 2007/0144691 A1 | 6/2007 | Yates |
| 2008/0028681 A1 | 2/2008 | Andersen |
| 2008/0256865 A1 | 10/2008 | Trujilo et al. |
| 2008/0307708 A1 | 12/2008 | Quan |
| 2009/0158665 A1 | 6/2009 | Wu |
| 2010/0293861 A1 | 11/2010 | Ting et al. |
| 2011/0088323 A1 | 4/2011 | Lundh |
| 2012/0186755 A1 | 7/2012 | Sessa |
| 2012/0211182 A1 | 8/2012 | Pilgrim et al. |
| 2012/0256149 A1 | 10/2012 | Sylvester |
| 2014/0182206 A1 | 7/2014 | Yulkowski et al. |
| 2014/0190081 A1 | 7/2014 | Wanjohi |
| 2014/0196371 A1 | 7/2014 | Lundh |
| 2014/0373448 A1 | 12/2014 | Henderson et al. |
| 2015/0330142 A1 | 11/2015 | Pilgrim et al. |
| 2016/0002955 A1 | 1/2016 | Smith et al. |
| 2016/0047102 A1 | 2/2016 | Su |
| 2016/0245381 A1 | 8/2016 | Birkert et al. |
| 2017/0260802 A1 | 9/2017 | Losik |
| 2017/0350165 A1 | 12/2017 | Schort et al. |
| 2018/0044940 A1 | 2/2018 | Anderson |
| 2019/0032399 A1 | 1/2019 | Fitzpatrick |

* cited by examiner

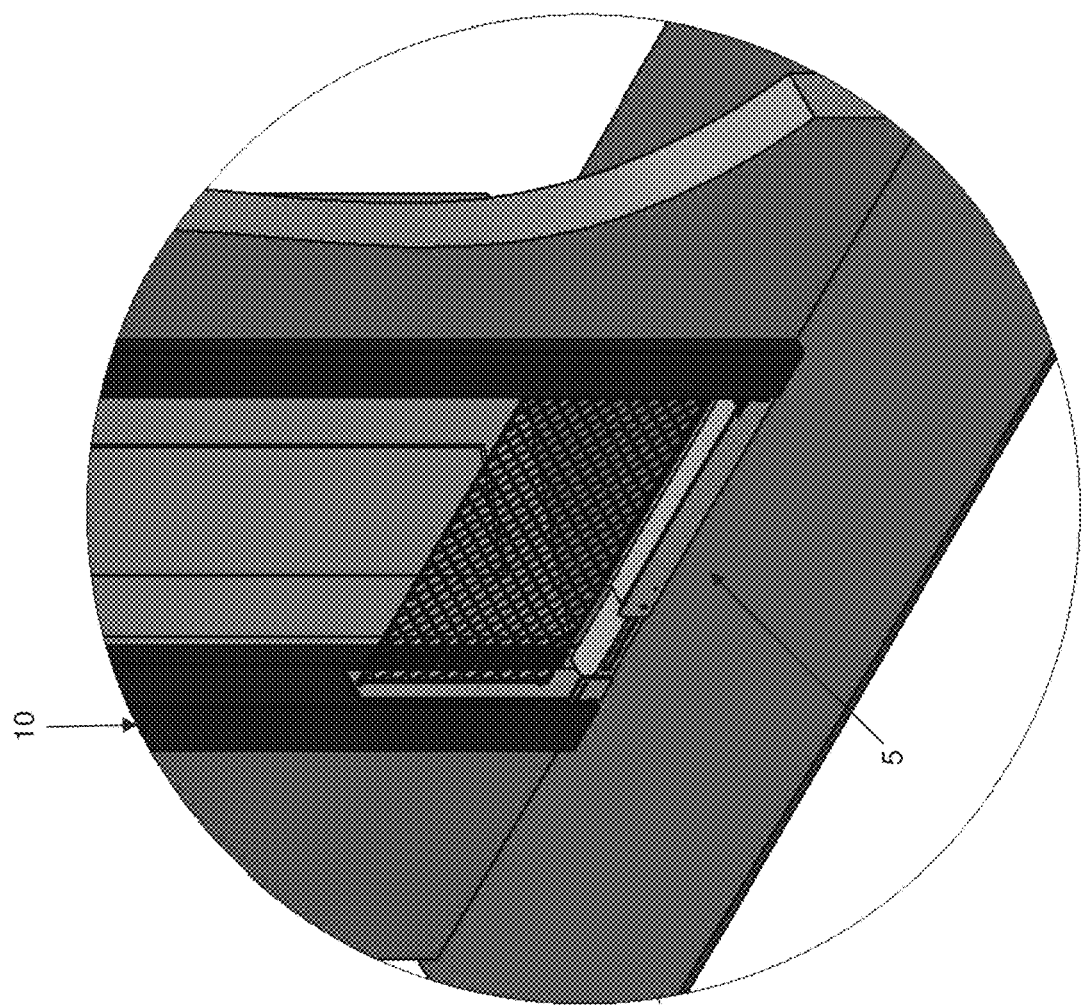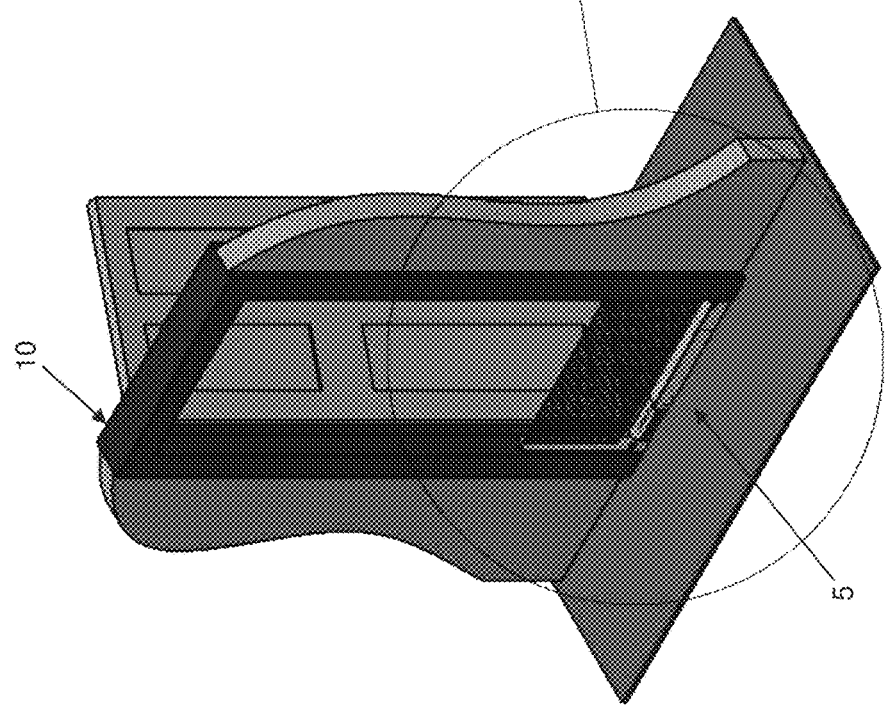
FIG. 2

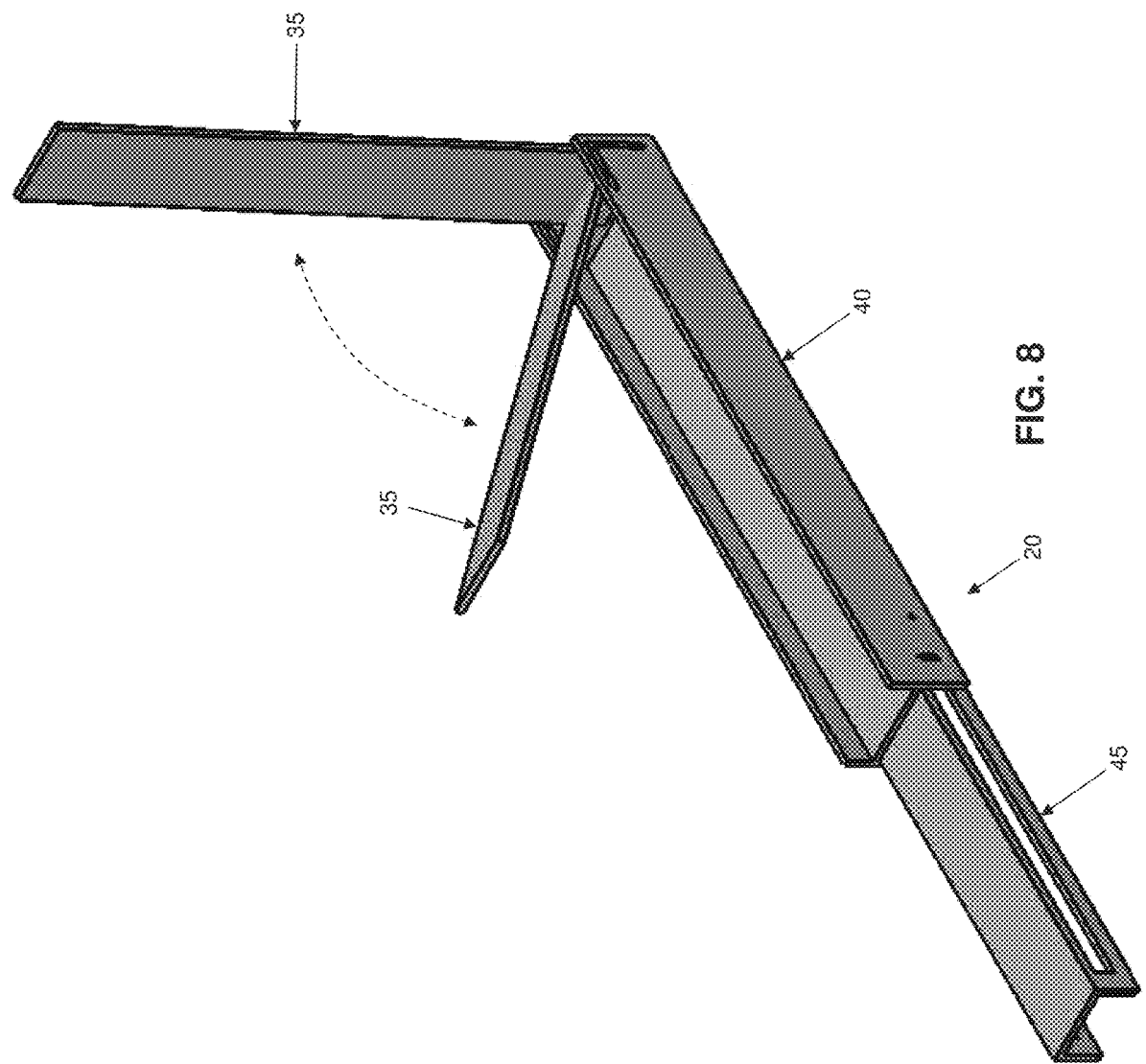

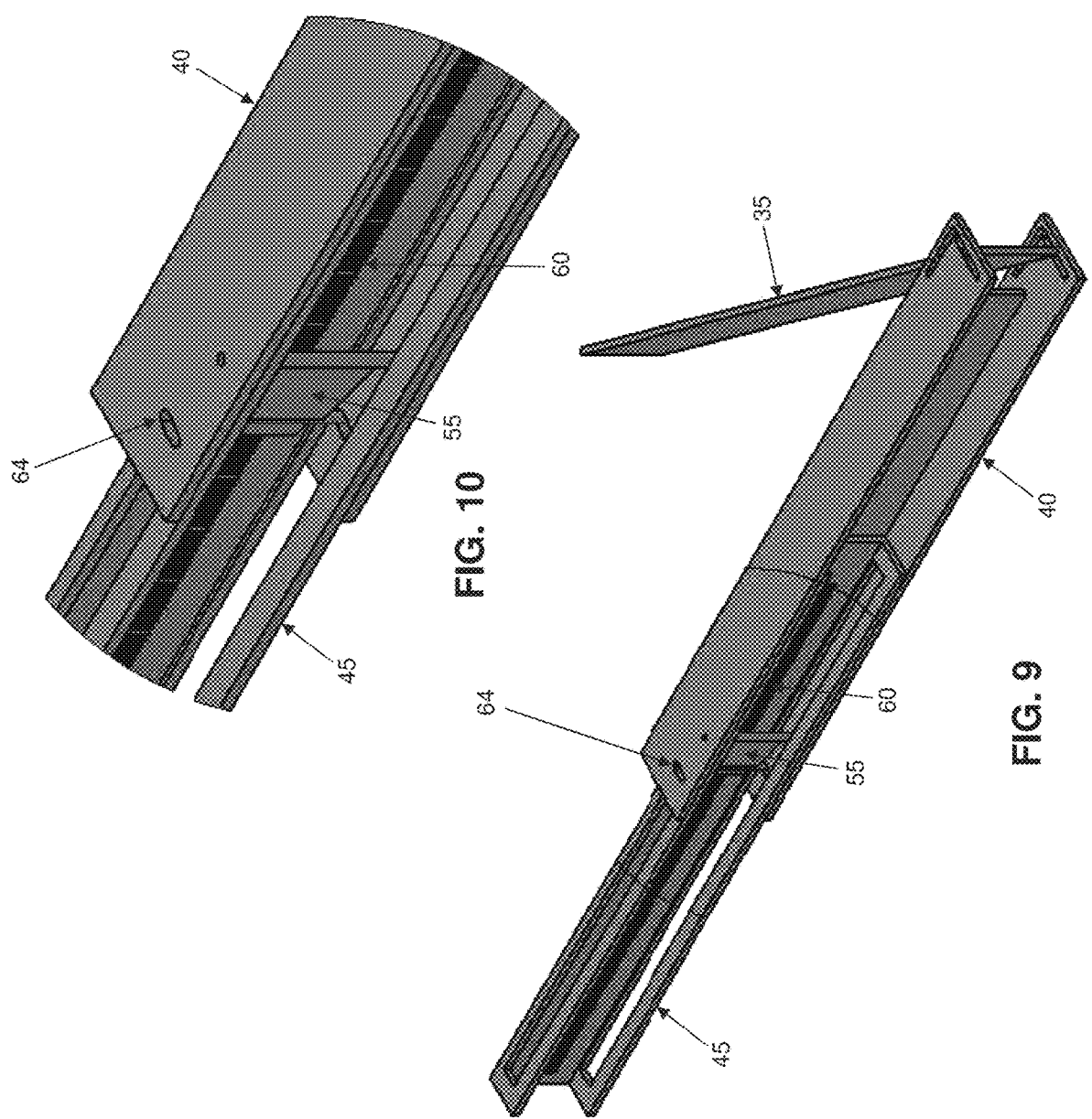

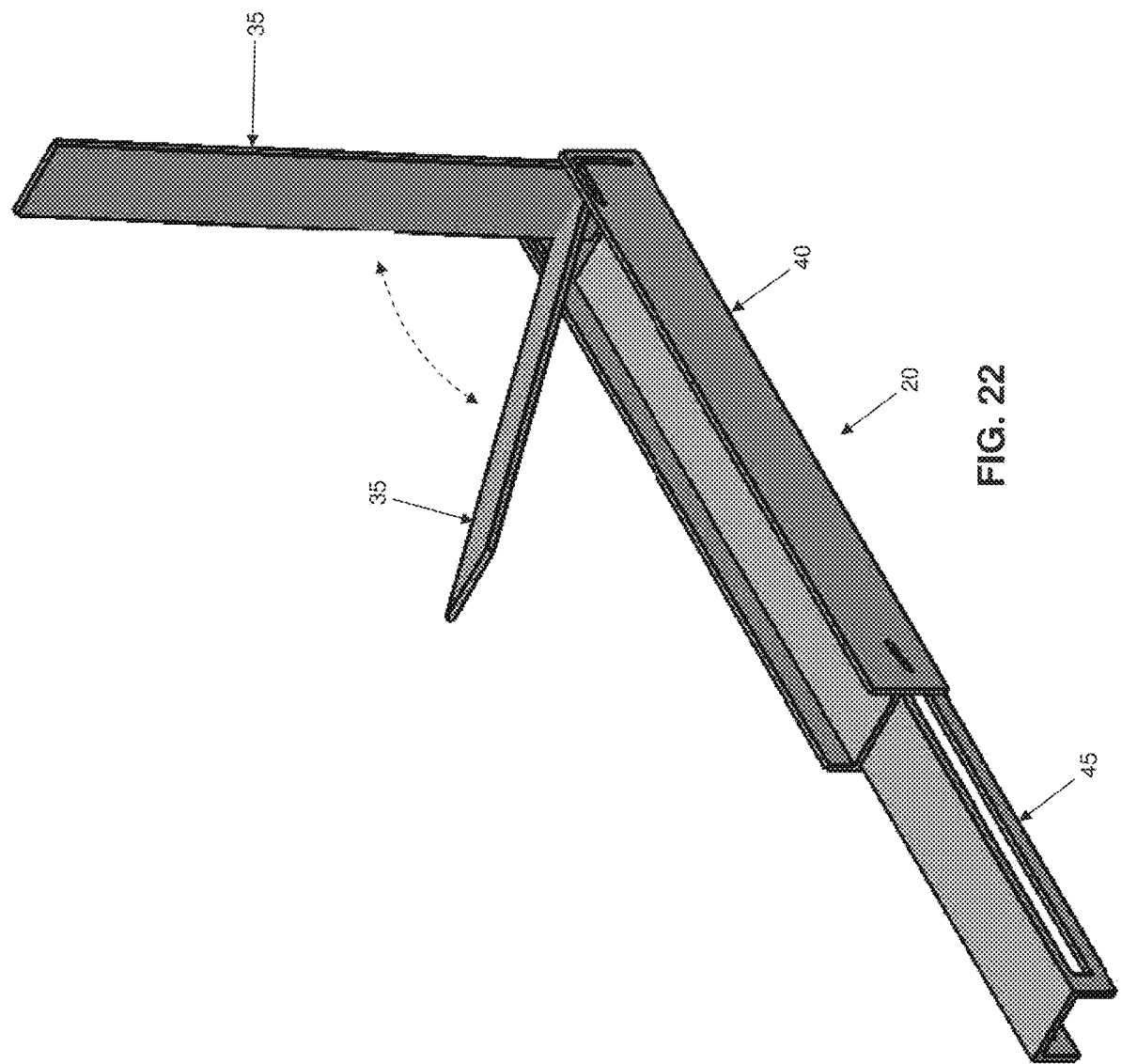

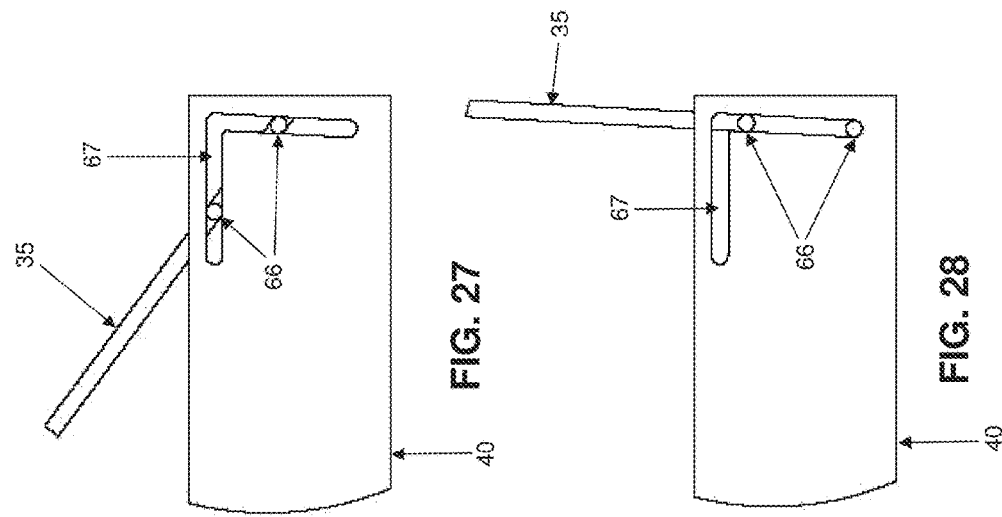
FIG. 27
FIG. 28
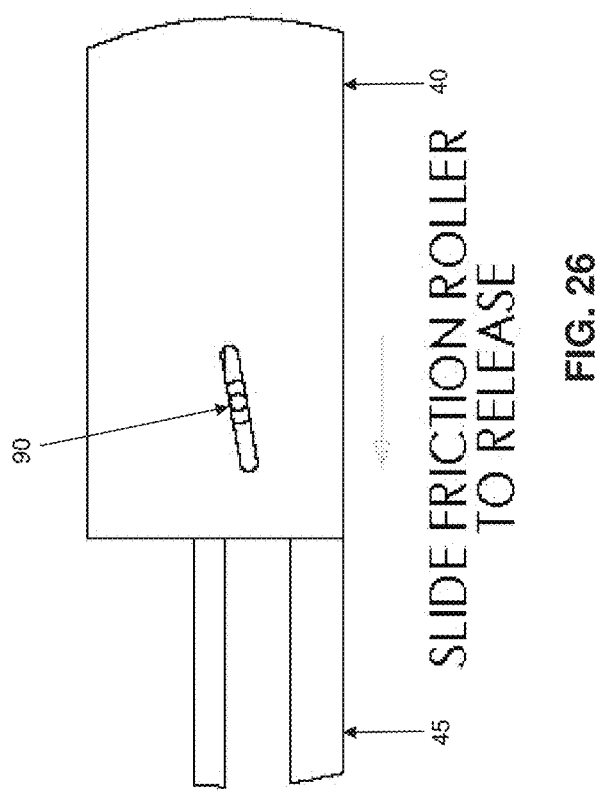
SLIDE FRICTION ROLLER TO RELEASE
FIG. 26

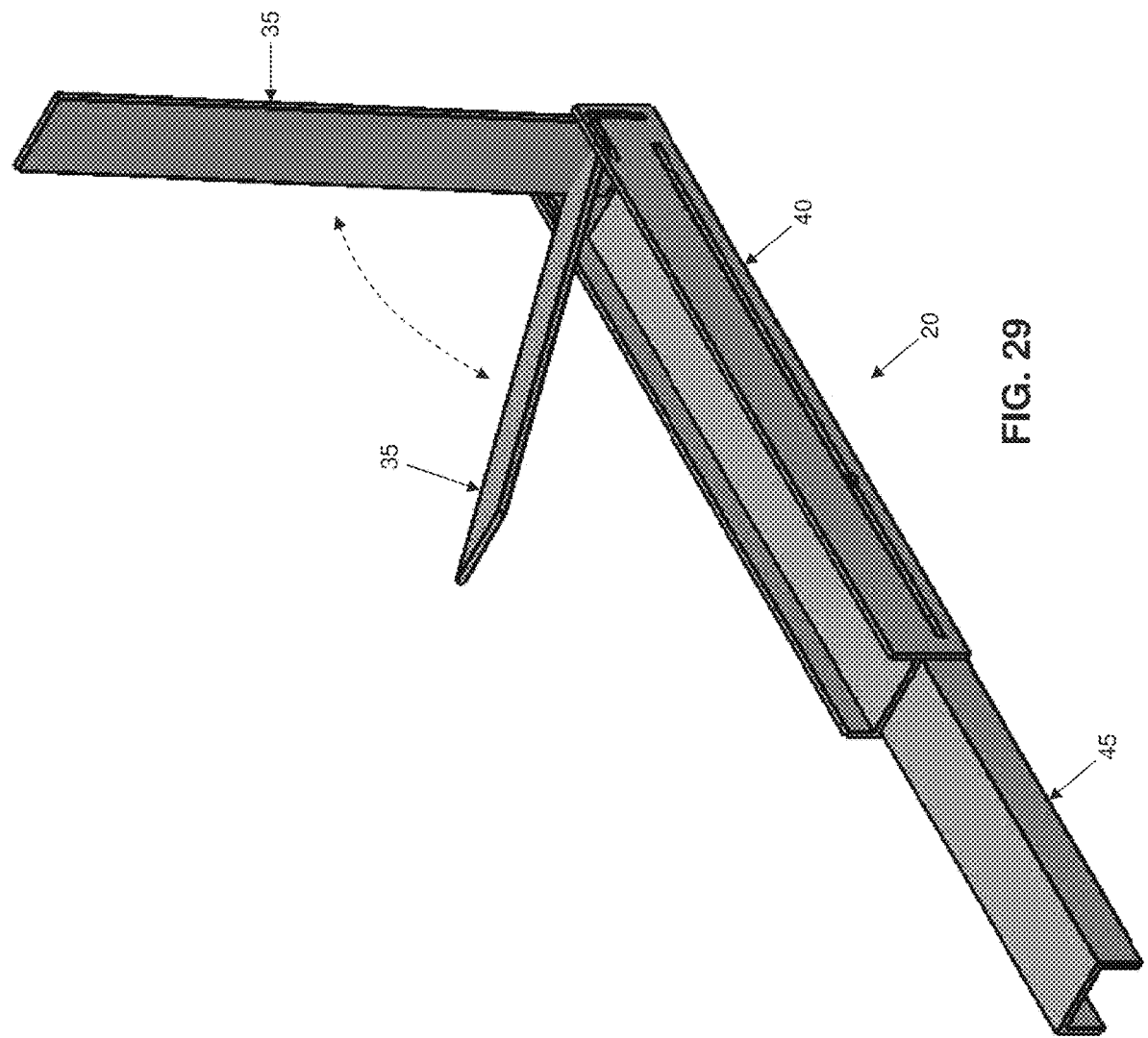

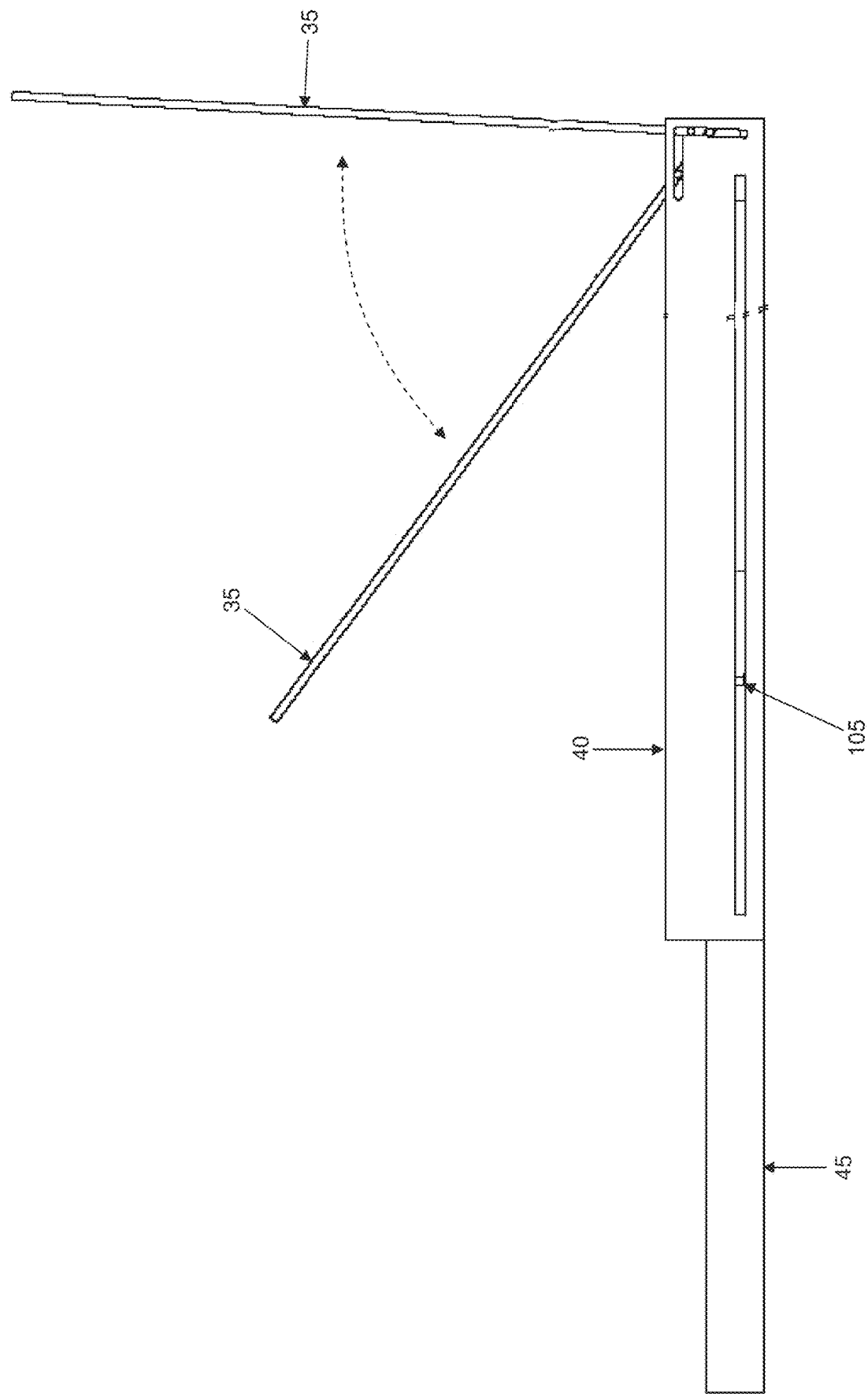

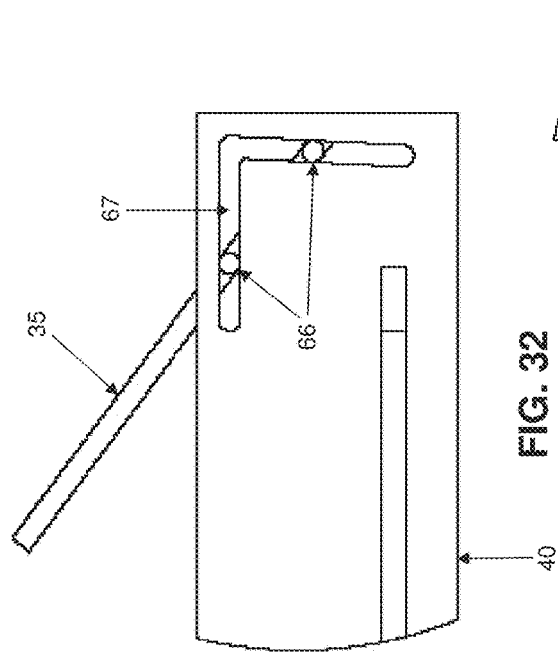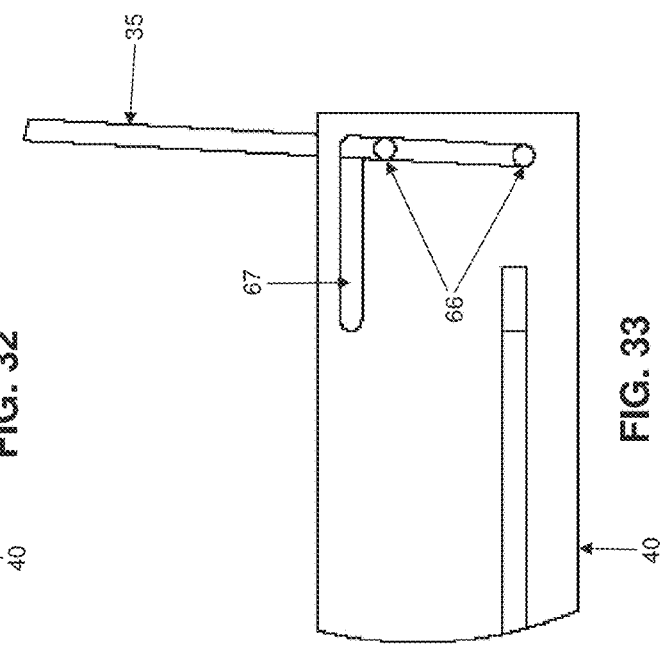

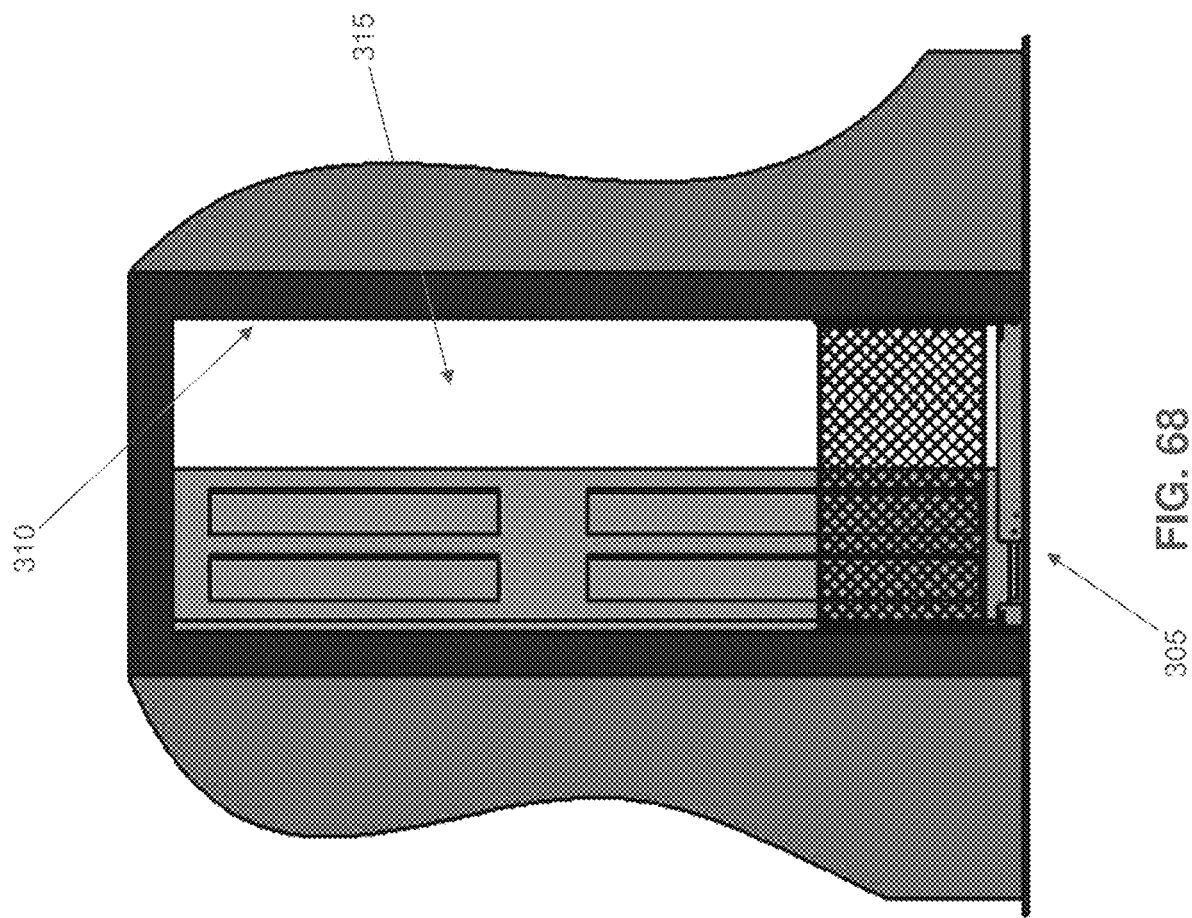

SAFETY GATE FOR PETS AND SMALL CHILDREN

REFERENCE TO PENDING PRIOR PATENT APPLICATIONS

This patent application:

(1) is a continuation-in-part of pending prior U.S. Non-Provisional patent application Ser. No. 16/459,921, filed Jul. 2, 2019 by Kyle R. Losik JR. for SAFETY GATE FOR PETS AND SMALL CHILDREN, which patent application:
  (A) is a continuation-in-part of prior U.S. Non-Provisional patent application Ser. No. 15/453,204, filed Mar. 8, 2017 by Kyle R. Losik for SAFETY GATE FOR PETS AND SMALL CHILDREN, which patent application:
    (i) claims benefit of prior U.S. Provisional Patent Application Ser. No. 62/305,224, filed Mar. 8, 2016 by Kyle R. Losik for COLLAPSIBLE AND FLEXIBLE PET GATE;
  (B) claims benefit of prior U.S. Provisional Patent Application Ser. No. 62/692,903, filed Jul. 2, 2018 by Kyle R. Losik for "SMART" SAFETY GATE AND/OR UNIVERSAL SAFETY GATE MONITORING SYSTEM; and (2) claims benefit of prior U.S. Provisional Patent Application Ser. No. 62/882,637, filed Aug. 5, 2019 by Kyle R. Losik for SAFETY GATE FOR PETS AND SMALL CHILDREN.

The five (5) above-identified patent applications are hereby incorporated herein by reference.

FIELD OF THE INVENTION

This invention relates to gates in general, and more particularly to safety gates for pets and small children.

BACKGROUND OF THE INVENTION

Pet owners and parents of small children currently use a wide variety of safety gates to keep their pets and small children restricted from certain areas. Safety gates provide an array of essential benefits including safety, training, protection, etc.

There are generally two types of safety gates. One type of safety gate (sometimes referred to herein as a "substantially permanent" safety gate) is a safety gate which is intended to be set up once and then thereafter left in place on a substantially permanent basis. The other type of safety gate (sometimes referred to herein as a "temporary" safety gate) is a safety gate which is intended to be set up and taken down as needed.

Current versions of both types of safety gates suffer from significant limitations.

More particularly, substantially permanent safety gates are stationary gates which are secured to walls, doorframes, etc. by permanent fasteners (e.g., bolts, screws, etc.) which extend into the walls, doorframes, etc. In general, these substantially permanent gates are placed in a doorway or hallway or walkway and remain in place on a substantially permanent basis. The primary benefit of substantially permanent gates is that they are generally easier to pass through, since they typically have a hinged door that is opened by a latch or handle. A significant disadvantage of substantially permanent gates is that they are effectively fixed in place and cannot be easily moved from one location to another. Thus, substantially permanent safety gates effectively serve a single location.

Temporary safety gates comprise "freestanding" safety gates and "temporarily-secured" safety gates which are fastened in place against walls, doorframes, etc. using temporary means such as clamps, sliding mechanisms, etc. The primary benefit of temporary safety gates is that they can be set up or taken down as needed. A significant disadvantage of temporary safety gates is that they are not secured to an adjoining architectural structure (in the case of a freestanding safety gate) or they are inadequately secured to (e.g., they slip or easily detach from) an adjoining architectural structure (in the case of a temporarily-secured safety gate). In addition, temporary safety gates tend to be inconvenient when an adult needs to pass by the safety gate—the adult typically needs to either (i) "step over" the temporary gate (and this must be done without touching the temporary gate for fear of knocking over or moving aside the temporary safety gate), or (ii) the adult needs to take down or move the safety gate, pass through the opening, and then reset the safety gate.

In addition to the foregoing, substantially permanent safety gates and temporary safety gates also both possess the following additional limitations:

1. Inflexible—Current safety gates (both substantially permanent safety gates and temporary safety gates) are generally formed out of rigid materials (e.g., plastic, wood, metal, etc.). These materials make the safety gates substantially rigid, and that rigidity creates significant limitations and complications. More particularly, rigid safety gates have no "give", making them difficult for adults to pass by. To pass by a rigid safety gate, an adult must either (a) "step over" the safety gate, or (b) have a door formed in the safety gate, or (c) remove the safety gate (and then set the safety gate back up again). Stepping over a rigid safety gate is awkward, often resulting in (i) a "banged up" shin as the person's leg strikes the rigid safety gate, and/or (ii) the safety gate "crashing down", and/or (iii) worse—a person falling over while attempting to step over the safety gate. Providing a door in the safety gate in order to allow an adult to pass by the safety gate generally requires a more complex safety gate design, and also generally requires that the safety gate be constructed out of substantially rigid materials. Removing the safety gate in order to allow an adult to pass by the opening is impractical with permanent safety gates, and removing temporary safety gates to allow an adult to pass by the opening is generally inconvenient and requires free hands and space (something which is not always readily available). In addition, after the temporary safety gate has been taken down and the person passes through the doorway or hallway or walkway, the safety gate must then be set back in place again.

2. Structurally Large—The average size of "smaller" rigid safety gates is 23" H (high)×28" W (wide). Temporary rigid safety gates generally take up 4.47 square feet of storage space (i.e., 23"×28"=4.47 square feet), are bulky, and are often difficult to maneuver.

Thus there is a need for a new and improved safety gate for pets and small children which is temporary, flexible, folds up to a manageable size and provides an easy way for adults to pass by the safety gate without needing to move the entire safety gate.

There is also a need for a new and improved "smart" safety gate for pets and small children which includes a monitoring system for determining when the safety gate is properly installed and closed, and/or when the safety gate is improperly installed and/or becomes dislodged, and/or when the safety gate is not closed, and/or when excessive force is being placed on the safety gate, and which includes an electronic interface which aggregates data on the state of the safety gate and wirelessly communicates that data to "smart" devices (e.g., a smartphone, a smartwatch, a tablet, a computer, a television, etc.) which may be seen by pet owners and/or parents.

Additionally, there is a need for a universal gate safety monitoring system for retrofit to existing safety gates to provide pet owners and/or parents with vital, real-time information regarding significant changes to the state of the safety gate. This universal gate safety monitoring system would also include a monitoring system for determining when the safety gate is properly installed and closed, and/or when the safety gate is improperly installed and/or becomes dislodged, and/or when the safety gate is not closed, and/or when excessive force is being placed on the safety gate, and would also include an electronic interface which aggregates data on the state of the safety gate and wirelessly communicates that data to "smart" devices (e.g., a smartphone, a smartwatch, a tablet, a computer, a television, etc.) which may be seen by pet owners and/or parents.

SUMMARY OF THE INVENTION

These and other objects are addressed by the provision and use of a new and improved safety gate for pets and small children that is temporary, flexible, folds up to a manageable size and provides an easy way for adults to pass by the safety gate without needing to move the entire safety gate.

More particularly, in accordance with the present invention, there is provided a new and improved safety gate which is designed to be positioned in an opening such as a doorway or hallway or walkway. The new and improved safety gate generally comprises a collapsible frame and a flexible barrier.

The collapsible frame acts as a support structure for the flexible barrier, holding the flexible barrier extending across the opening which is to be closed off. The collapsible frame is designed to make a pressure fit against an adjoining architectural structure, and is designed to be folded up (i.e., collapsed and condensed) to a manageable size when not in use.

The flexible barrier is intended to be set across the collapsible frame when the opening is to be closed off, and disconnected from the collapsible frame when an adult needs to pass by the safety gate.

In use, the collapsible frame is erected across an opening such as a doorway or hallway or walkway, with the collapsible frame making a pressure fit against an adjoining architectural structure. Then the flexible barrier is set across the collapsible frame so as to close off the opening. When an adult needs to pass by the safety gate, one end of the flexible barrier is disconnected from the collapsible frame so that the adult can pass through the opening. After the adult has passed through the opening, the flexible barrier is re-set across the collapsible frame so as to once again close off the opening. When the safety gate is no longer needed in that location, the flexible barrier is released and the collapsible frame is taken down, whereupon the safety gate may be moved to another location or placed into storage.

In one form of the invention, there is provided a safety gate for preventing pets and small children from passing through an opening, the safety gate comprising:

a collapsible frame for selective disposition in the opening, the collapsible frame comprising:

a resizable base having a first end and a second end, the resizable base being configured so that the distance between the first end and the second end is adjustable; and first and second arms adjustably secured to the first and second ends of the resizable base, respectively, so as to be re-configurable between (i) a collapsed configuration wherein the first and second arms extend substantially parallel to one another and substantially parallel to the resizable base, and (ii) an expanded configuration wherein the first and second arms extend upright from the resizable base so that the collapsible frame comprises a substantially U-shaped configuration defining a space between the resizable base and the first and second arms; and a flexible barrier for adjustable mounting to the collapsible frame so as to prevent a pet or small child from passing through the space between the resizable base and the first and second arms.

In another form of the invention, there is provided a method for preventing pets and small children from passing through an opening, the method comprising:

providing a safety gate, the safety gate comprising:

a collapsible frame for selective disposition in the opening, the collapsible frame comprising:

a resizable base having a first end and a second end, the resizable base being configured so that the distance between the first end and the second end is adjustable; and first and second arms adjustably secured to the first and second ends of the resizable base, respectively, so as to be re-configurable between (i) a collapsed configuration wherein the first and second arms extend substantially parallel to one another and substantially parallel to the resizable base, and (ii) an expanded configuration wherein the first and second arms extend upright from the resizable base so that the collapsible frame comprises a substantially U-shaped configuration defining a space between the resizable base and the first and second arms; and a flexible barrier for adjustable mounting to the collapsible frame so as to prevent a pet or small child from passing through the space between the resizable base and the first and second arms;

positioning the collapsible frame across the opening in its expanded configuration so that the resizable base extends along the bottom of the opening and the first and second arms extend along opposing sides of the opening, with the first and second arms applying an outward force to opposing sides of the opening; and positioning the flexible barrier on the collapsible frame so as to prevent a pet or small child from passing through the space between the resizable base and the first and second arms.

In accordance with the present invention, there is also provided a novel "smart" safety gate for pets and small children which includes a monitoring system for determining when the safety gate is properly installed and closed, and/or when the safety gate is improperly installed and/or becomes dislodged, and/or when the safety gate is not closed, and/or when excessive force is being placed on the safety gate, and which includes an electronic interface which aggregates data on the state of the safety gate and wirelessly communicates that data to "smart" devices (e.g., a smartphone, a smartwatch, a tablet, a computer, a television, etc.) which may be seen by pet owners and/or parents.

Additionally, there is also provided a universal gate safety monitoring system for retrofit to existing safety gates to provide pet owners and/or parents with vital, real-time information regarding significant changes to the state of the safety gate. This universal gate safety monitoring system also includes a monitoring system for determining when the safety gate is properly installed and closed, and/or when the safety gate is improperly installed and/or becomes dislodged, and/or when the safety gate is not closed, and/or when excessive force is being placed on the safety gate, and also includes an electronic interface that aggregates data on the state of the safety gate and wirelessly communicates that data to "smart" devices (e.g., a smartphone, a smartwatch, a tablet, a computer, a television, etc.) which may be seen by pet owners and/or parents.

In another form of the invention, there is provided a safety gate for preventing pets and small children from passing through an opening, the safety gate comprising:
 a frame for selective disposition in the opening, the frame defining a passageway;
 a cross-member for adjustable mounting to the frame so as to prevent a pet or small child from passing through the passageway;
 a sensor mounted to the frame for sensing data relating to the state of the safety gate; and
 a wireless communication system for transmitting data from the sensor to a smart device.

In another form of the invention, there is provided a method for detecting a change in the status of a safety gate disposed within an opening, the method comprising:
 providing a safety gate for preventing pets and small children from passing through the opening, the safety gate comprising:
  a frame for selective disposition in the opening, the frame defining a passageway;
  a cross-member for adjustable mounting to the frame so as to prevent a pet or small child from passing through the passageway;
  a sensor mounted to the frame for sensing data relating to the state of the safety gate; and
  a wireless communication system for transmitting data from the sensor to a smart device;
 disposing the safety gate in the opening, such that the sensor generates data concerning the status of the safety gate; and
 wirelessly communicating data from the sensor to the smart device.

In another form of the invention, there is provided a novel pressure-fit safety gate with non-folding arms which may be positioned in an opening such as a doorway or hallway or walkway so as to close off the opening to pets and/or small children. The pressure-fit safety gate with non-folding arms generally comprises a U-shaped frame and a retractable flexible barrier. The U-shaped frame acts as a support structure for the flexible barrier, holding the flexible barrier as the barrier extends across the opening of the doorway or hallway or walkway. The U-shaped frame is designed to make a pressure fit against an adjoining architectural structure, and is designed to be reconfigured to a manageable size when not in use. The U-shaped frame generally comprises three separate components: a horizontal adjustable base member and two upright vertical arms. The flexible barrier is intended to be set across the U-shaped frame when the opening is to be closed off, and can be selectively detached from the U-shaped frame when an adult needs to pass through the opening. The pressure-fit safety gate with non-folding arms is intended to be temporary in nature and thus able to be in any doorway, walkway, etc.

In one form of the invention, there is provided a safety gate for preventing pets and small children from passing through an opening, the safety gate comprising:
 a frame for selective disposition in the opening, the frame comprising:
  a resizable horizontal base having a first end, a second end, and a longitudinal axis extending therebetween, the resizable horizontal base being configured so that a distance extending between the first end and the second end is adjustable; and
  first and second upright arms, each of the first and second upright arms comprising a horizontal portion and a vertical portion, wherein the horizontal portion and the vertical portion are fixed to one another so that the first and second upright arms each has a generally L-shaped configuration;
  the first and second upright arms being formed as separate components from one another, and as separate components from the resizable horizontal base, such that the frame can be stored with the resizable horizontal base and the vertical portions of the first and second upright arms extending parallel to one another; and
  the first and second upright arms being selectively connectable to the first and second ends, respectively, of the resizable horizontal base, such that the frame can be assembled into a generally U-shaped configuration; and
 a flexible barrier for mounting to the frame so as to prevent a pet or small child from passing through the space between the resizable horizontal base and the first and second upright arms.

In another form of the invention, there is provided a method for preventing pets and small children from passing through an opening, the method comprising:
 providing a safety gate, the safety gate comprising:
  a frame for selective disposition in the opening, the frame comprising:
   a resizable horizontal base having a first end, and a second end, and a longitudinal axis extending therebetween, the resizable horizontal base being configured so that a distance extending between the first end and the second end is adjustable; and
   first and second upright arms, each of the first and second upright arms comprising a horizontal portion and a vertical portion, wherein the horizontal portion and the vertical portion are fixed to one another so that the first and second upright arms each has a generally L-shaped configuration;
   the first and second upright arms being formed as separate components from one another, and as separate components from the resizable horizontal base, such that the frame can be stored with the resizable horizontal base and the vertical portions of the first and second upright arms extending parallel to one another; and
   the first and second upright arms being selectively connectable to the first and second ends, respectively, of the resizable horizontal base, such that the frame can be assembled into a generally U-shaped configuration; and
  a flexible barrier for mounting to the frame so as to prevent a pet or small child from passing through the space between the resizable horizontal base and the first and second upright arms;

connecting the first and second upright arms to the first and second ends, respectively, of the resizable horizontal base so as to assemble the frame into a generally U-shaped configuration;

positioning the frame across the opening so that the resizable horizontal base extends along the bottom of the opening and the first and second upright arms extend along opposing sides of the opening, with the first and second upright arms applying an outward force to opposing sides of the opening; and positioning the flexible barrier on the frame so as to prevent a pet or small child from passing through the space between the resizable horizontal base and the first and second upright arms.

In another form of the invention, there is provided a safety gate for preventing pets and small children from passing through an opening, the safety gate comprising:

a frame for selective disposition in the opening, the frame defining a passageway;

a flexible barrier for adjustable mounting to the frame so as to prevent a pet or small child from passing through the passageway; and spring-biased bumpers mounted to the frame for engaging an adjacent structure when the frame is disposed in the opening.

In another form of the invention, there is provided a safety gate for preventing pets and small children from passing through an opening, the safety gate comprising:

a frame for selective disposition in the opening, the frame comprising a resizable horizontal base, and first and second upright arms connectable to the resizable horizontal base so as to form a generally U-shaped configuration defining a passageway, wherein the first and second upright arms yieldably flare outwardly relative to one another;

a flexible barrier for adjustable mounting to the frame so as to prevent a pet or small child from passing through the passageway; and a level to indicate when the first and second upright arms have engaged an adjacent structure with sufficient force to cause the first and second upright arms to flex inwardly a pre-determined amount.

In another form of the invention, there is provided a safety gate for preventing pets and small children from passing through an opening, the safety gate comprising:

a frame for selective disposition in the opening, the frame defining a passageway;

a flexible barrier for adjustable mounting to the frame so as to prevent a pet or small child from passing through the passageway;

a spring-biased spool for spooling the flexible barrier onto the frame; and a lock for selectively locking the spring-biased spool against movement.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein:

FIGS. 1-4 are schematic views showing a new and improved safety gate formed in accordance with the present invention, wherein the safety gate is shown erected in a doorframe so as to close off the lower portion of the opening of the doorway to passage by pets and small children;

FIGS. 8-17 are schematic views showing the collapsible frame of the safety gate of FIGS. 1-7 in further detail;

FIGS. 22-28 are schematic views showing another form of the collapsible frame of the safety gate of FIGS. 1-7;

FIGS. 29-35 are schematic views showing still another form of the collapsible frame of the safety gate of FIGS. 1-7;

FIGS. 65-72 are schematic views showing a novel "smart" safety gate for pets and small children which includes a monitoring system for determining when the safety gate is properly installed and closed, and/or when the safety gate is improperly installed and/or becomes dislodged, and/or when the safety gate is not closed, and/or when excessive force is being placed on the safety gate, and which includes an electronic interface which aggregates data on the state of the safety gate and wirelessly communicates that data to "smart" devices (e.g., a smartphone, a smartwatch, a tablet, a computer, a television, etc.) which may be seen by pet owners and/or parents;

DETAILED DESCRIPTION OF THE PREFERRED EMBODIMENTS

Figure 1:
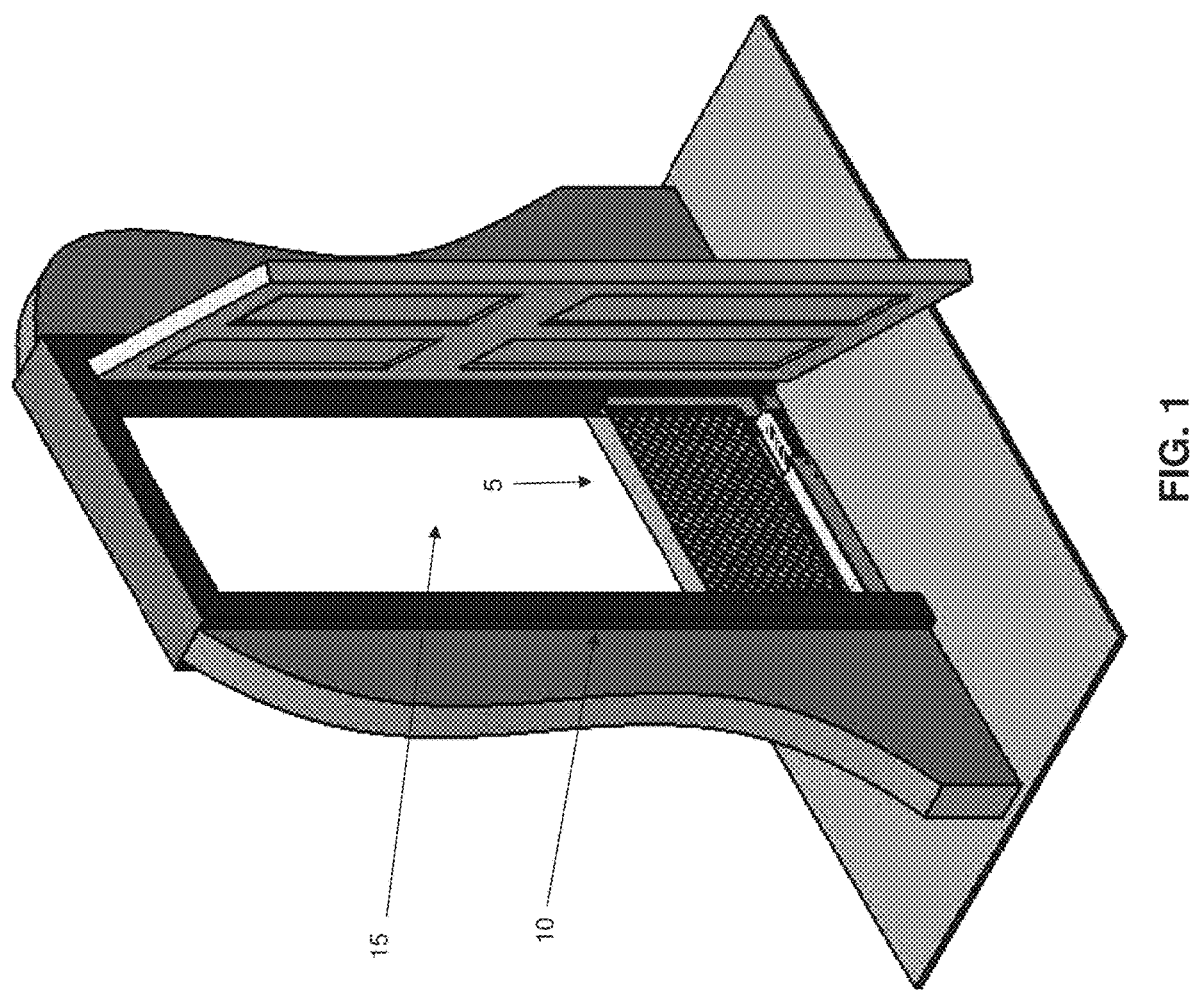
Figure 3:
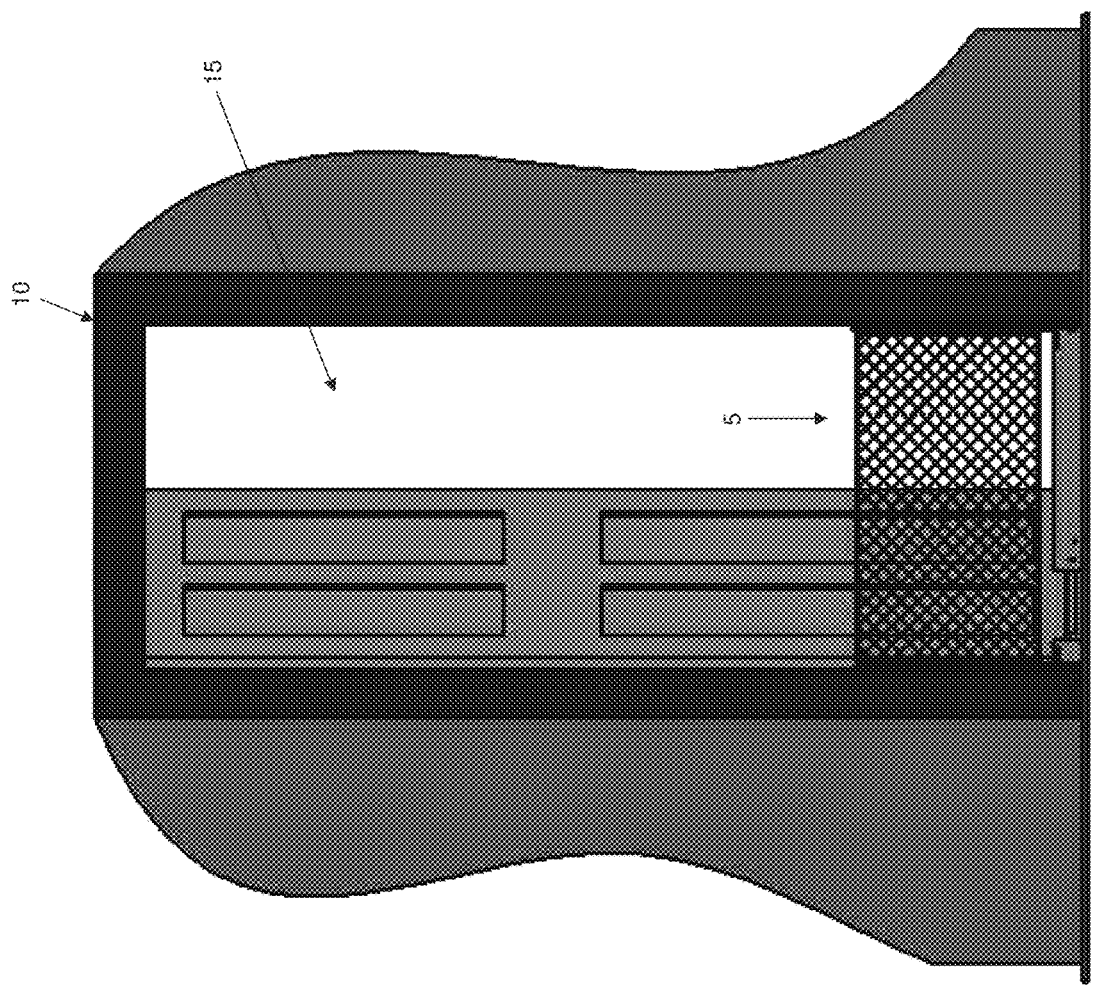
Figure 4:
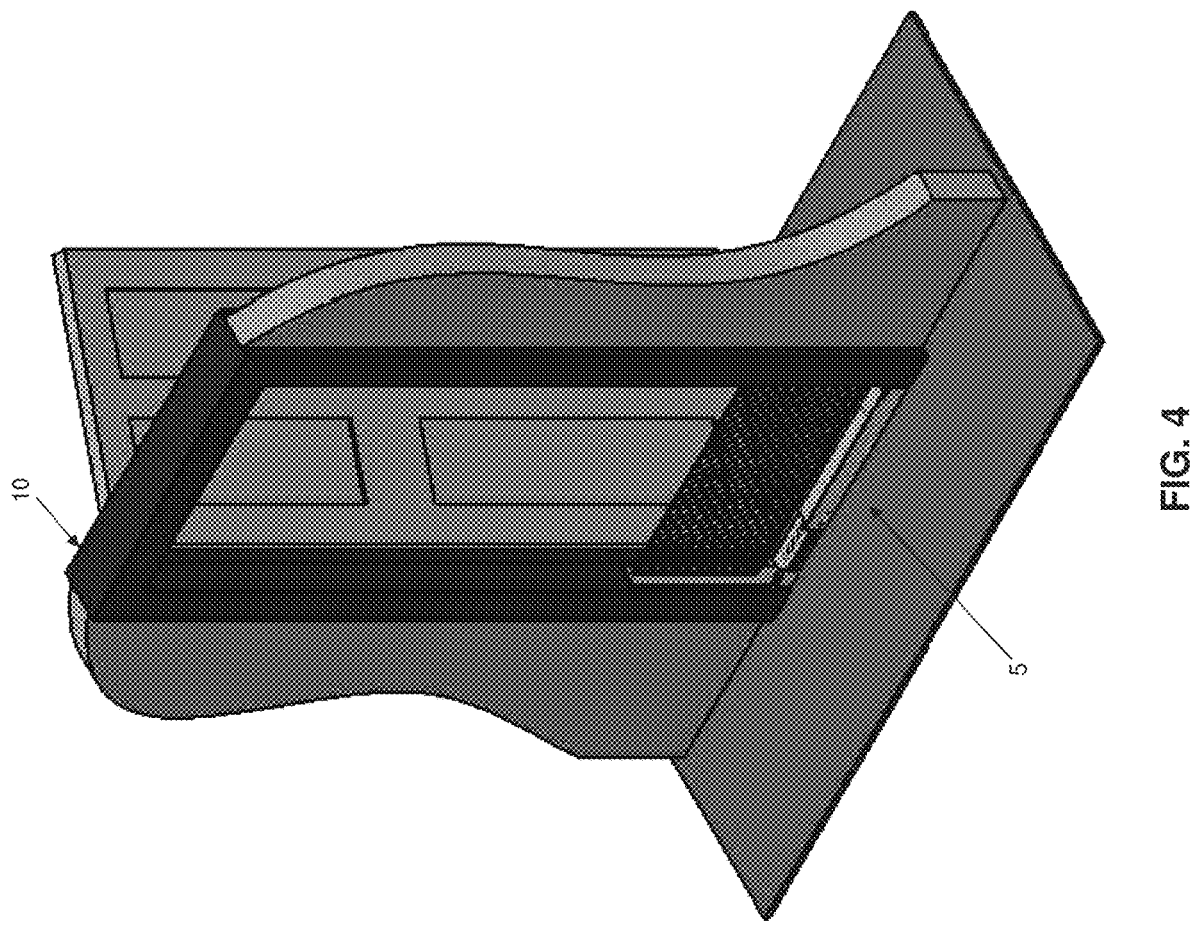
Figure 5:
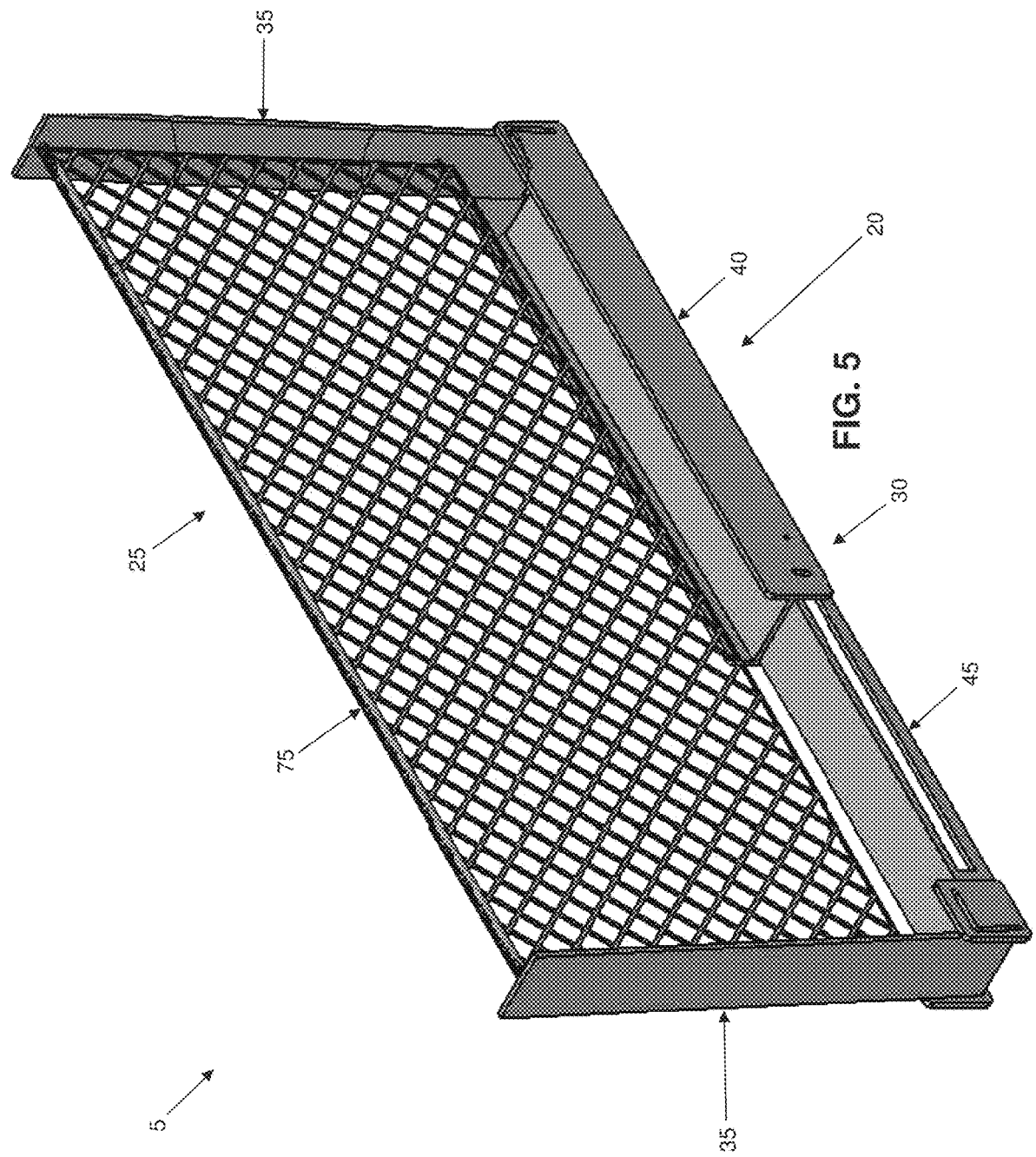
FIGS. 5-7 are schematic views showing the safety gate of FIGS. 1-4 in further detail.
Figure 6:
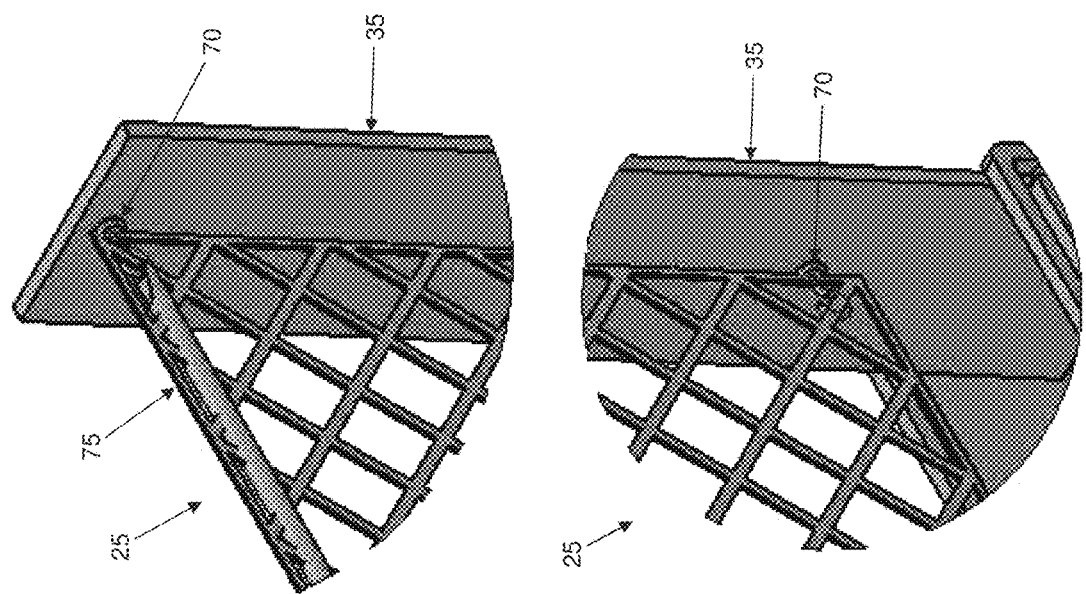
Figure 7:
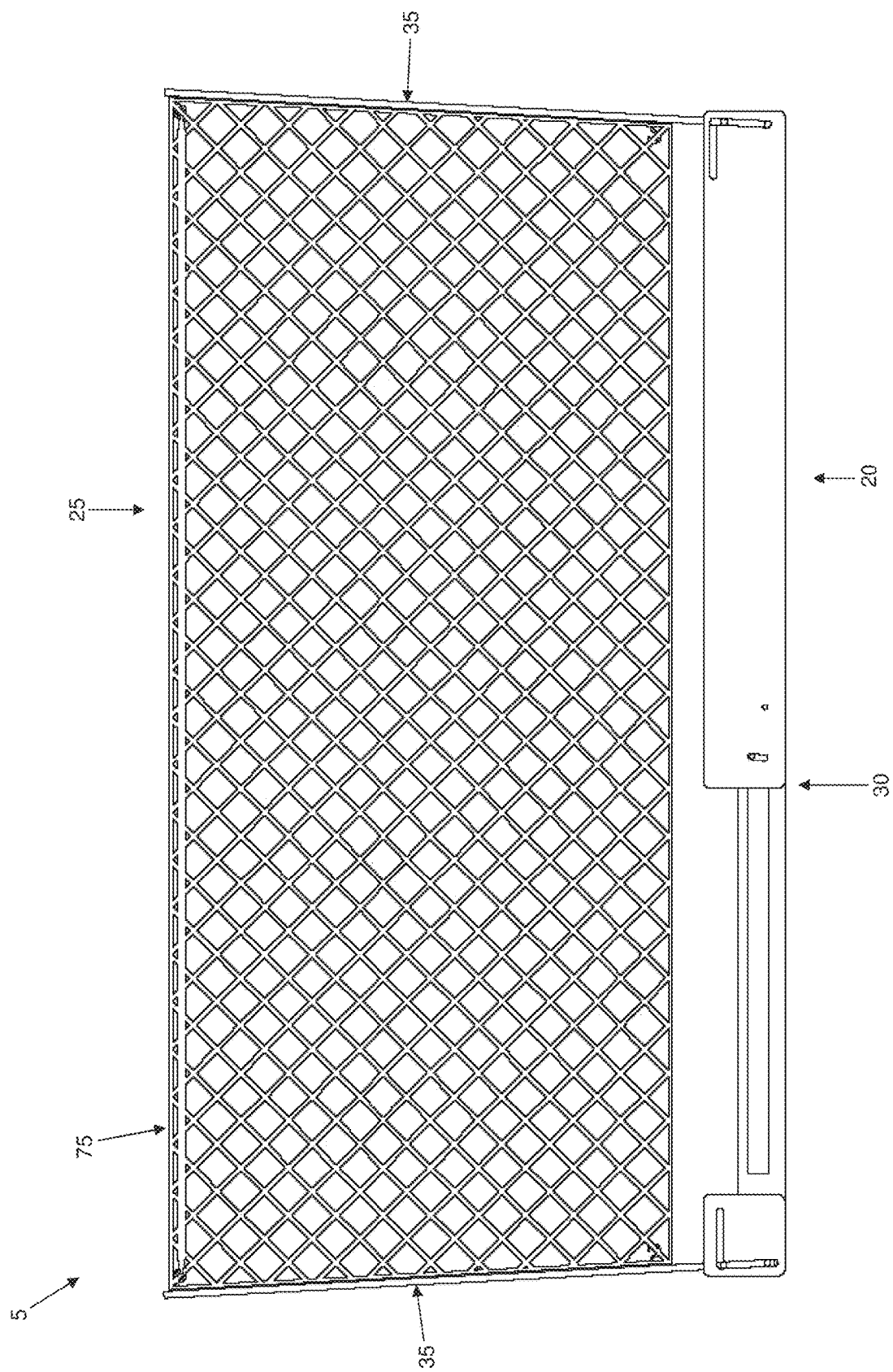
Figure 11:
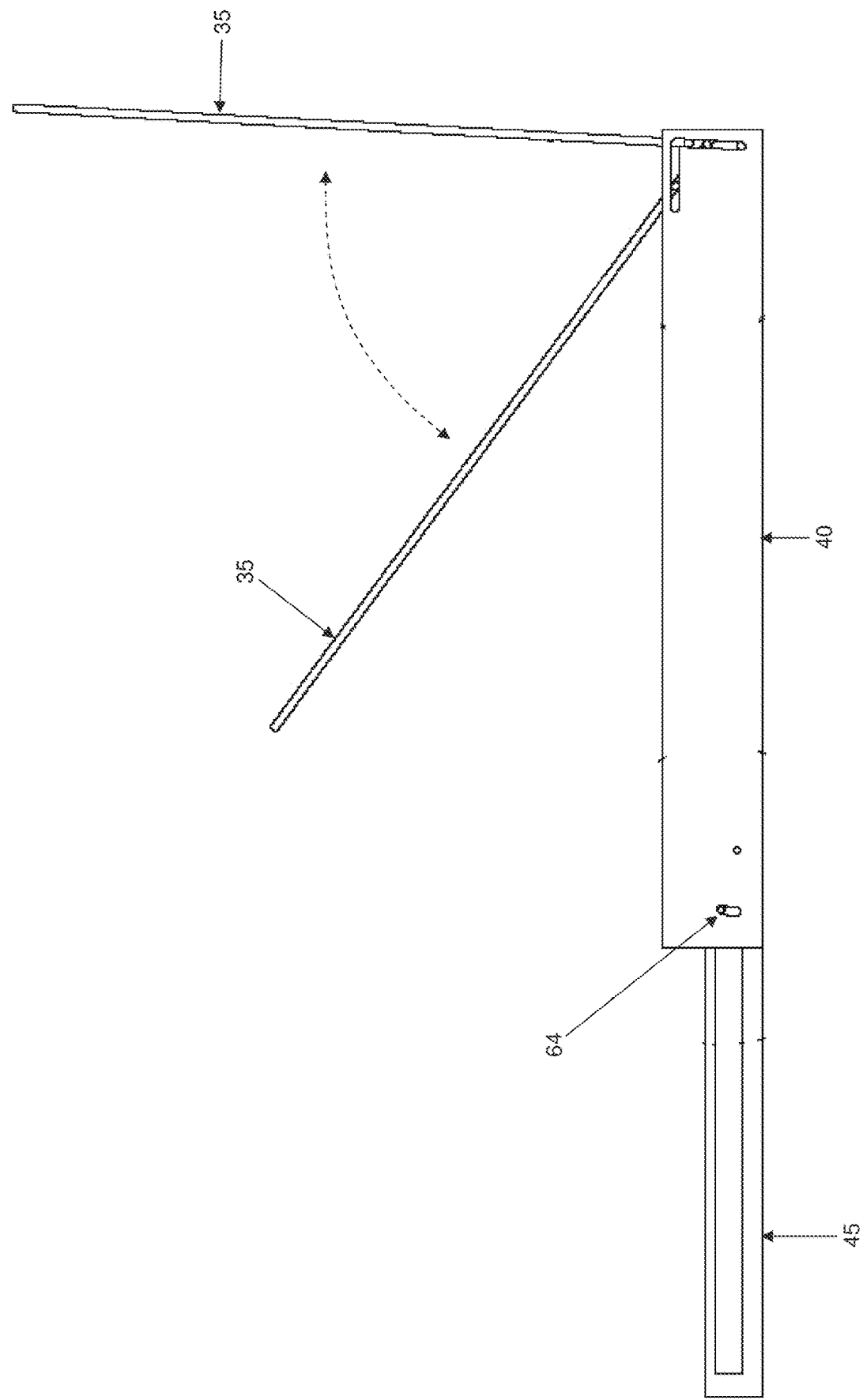
Figure 13:
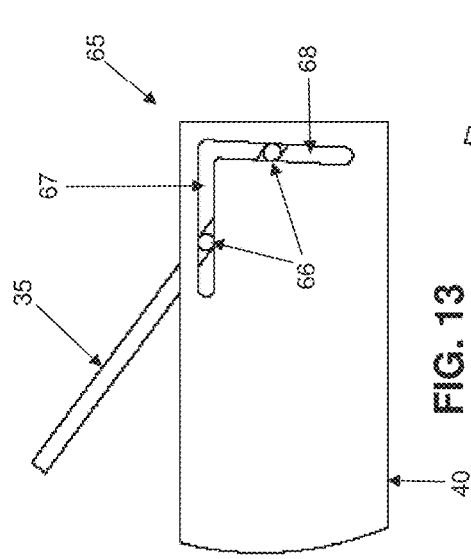
Figure 14:
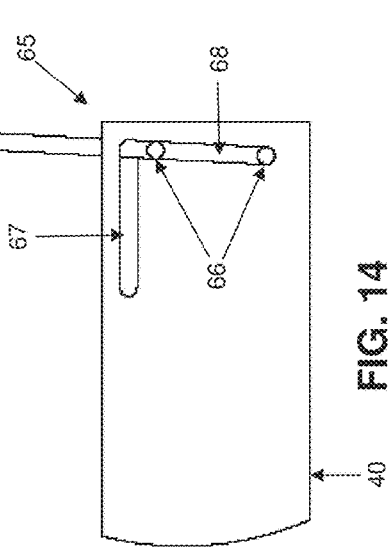
Figure 12:
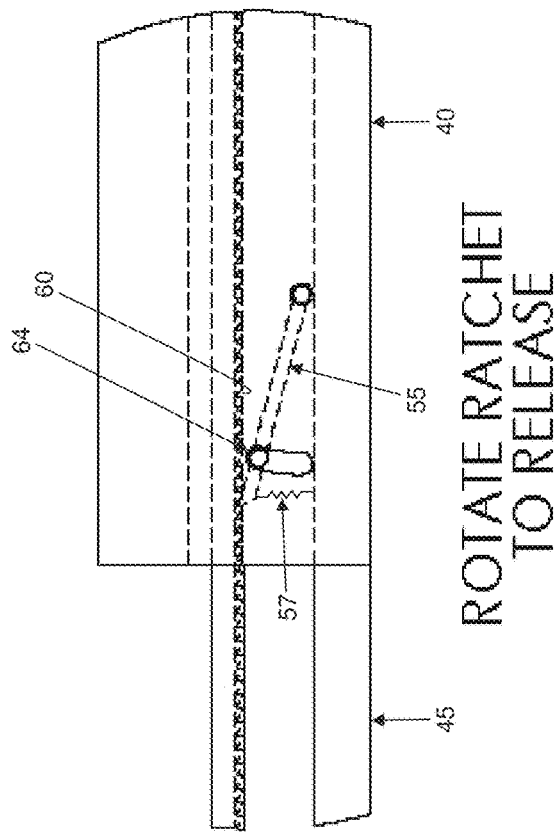

The New and Improved Safety Gate in General

The present invention comprises the provision and use of a new and improved safety gate which may be positioned in an opening such as a doorway or hallway or walkway so as to close off the opening to pets and/or small children. The safety gate generally comprises a collapsible frame and a flexible barrier. The collapsible frame acts as a support structure for the flexible barrier, holding the flexible barrier as the barrier extends across the opening of the doorway or hallway or walkway. The collapsible frame is designed to make a pressure fit against an adjoining architectural structure, and is designed to be folded up (i.e., collapsed and condensed) to a manageable size when not in use. The flexible barrier is intended to be set across the collapsible frame when the opening is to be closed off, and can be selectively detached from the collapsible frame when an adult needs to pass through the opening. The safety gate is intended to be temporary in nature and thus able to be can be erected in any doorway, walkway, etc.

Safety Gate Having a Flexible Barrier Manually "Hung" on the Collapsible Frame In one preferred form of the invention, the safety gate is constructed so that the flexible barrier is manually "hung" on the collapsible frame.

More particularly, and looking now at FIGS. 1-4, there is shown a new and improved safety gate 5 erected in a doorframe 10 so as to close off the lower portion of the opening 15 of the doorway. Safety gate 5 is releasably secured in doorframe 10 using a pressure fit so as to provide a barrier to prevent a pet or small child from passing through opening 15 (e.g., so as to prevent a pet or small child from passing from one room to another room). Safety gate 5 is also capable of closing off other openings, e.g., in a hallway or walkway, so as to restrict access by a pet or small child.

Looking next at FIGS. 5-8, safety gate 5 is shown in greater detail. Safety gate 5 generally comprises a collapsible frame 20 and a flexible barrier 25.

The Collapsible Frame

FIGS. 5-17 show one preferred construction for collapsible frame 20. In this form of the invention, collapsible frame 20 comprises a resizable base 30 and a pair of hinged arms 35.

Resizable base 30 comprises two base members 40, 45 which are telescopically extendable relative to one another so as to accommodate an array of different doorway (or hallway or walkway) widths. Base members 40, 45 are able to slide freely in one direction (i.e., in an opening direction) but are prevented from returning in the other direction (i.e., in a closing direction) by a latch mechanism 50. In the embodiment shown in FIGS. 5-17, latch mechanism 50 comprises a pivot plate 55 which is spring-biased (i.e., by a spring 57, FIG. 12) into engagement with a ribbed rack 60. To release latch mechanism 50, a finger tab 64 is used to push pivot plate 55 against the power of spring 57, whereby to allow pivot plate 55 to disengage from ribbed rack 60.

Hinged arms 35 pivot upwards from resting positions parallel to resizable base 30, pivoting on hinges 65. Each of the hinges 65 is formed by two pins 66 which ride in two slots 67, 68. When hinged arms 35 are fully erect, they lock into place by means of pins 66 residing in slots 68. Hinged arms 35 can be released from their locked erect positions by pulling upwards on the hinged arms and then folding the hinged arms back down on resizable base 30, with pins 66 moving into slots 67.

Note that when hinged arms 35 are in their erect positions, the hinged arms preferably yieldably angle outward slightly at their upper ends so as to ensure secure engagement of the hinged arms with the vertical walls of the doorway (or hallway or walkway). In other words, hinged arms 35 diverge outwardly as they extend away from resizable base 30, and hinged arms 35 are resilient so that they can be urged inwardly towards one another. In one preferred form of the invention, resizable base 30 and hinged arms 35 are substantially straight members, and the outward angling of hinged arms 35 is provided by setting the final disposition of hinged arms 35 with resizable base 30 at an angle slightly greater than 90 degrees. Additionally and/or alternatively, if desired, hinged arms 35 may have an outward arc along their length. Note that hinged arms 35 preferably comprise some flexibility, so that their outward flare can yield as necessary in order to establish a robust pressure fit with the vertical walls of the doorway (or other hallway or walkway).

Note also that hinged arms 35 include fasteners 70 (FIG. 6) to which flexible barrier 25 may be releasably secured (i.e., so that flexible barrier 25 may be manually "hung" on collapsible frame 20).

Figure 15:
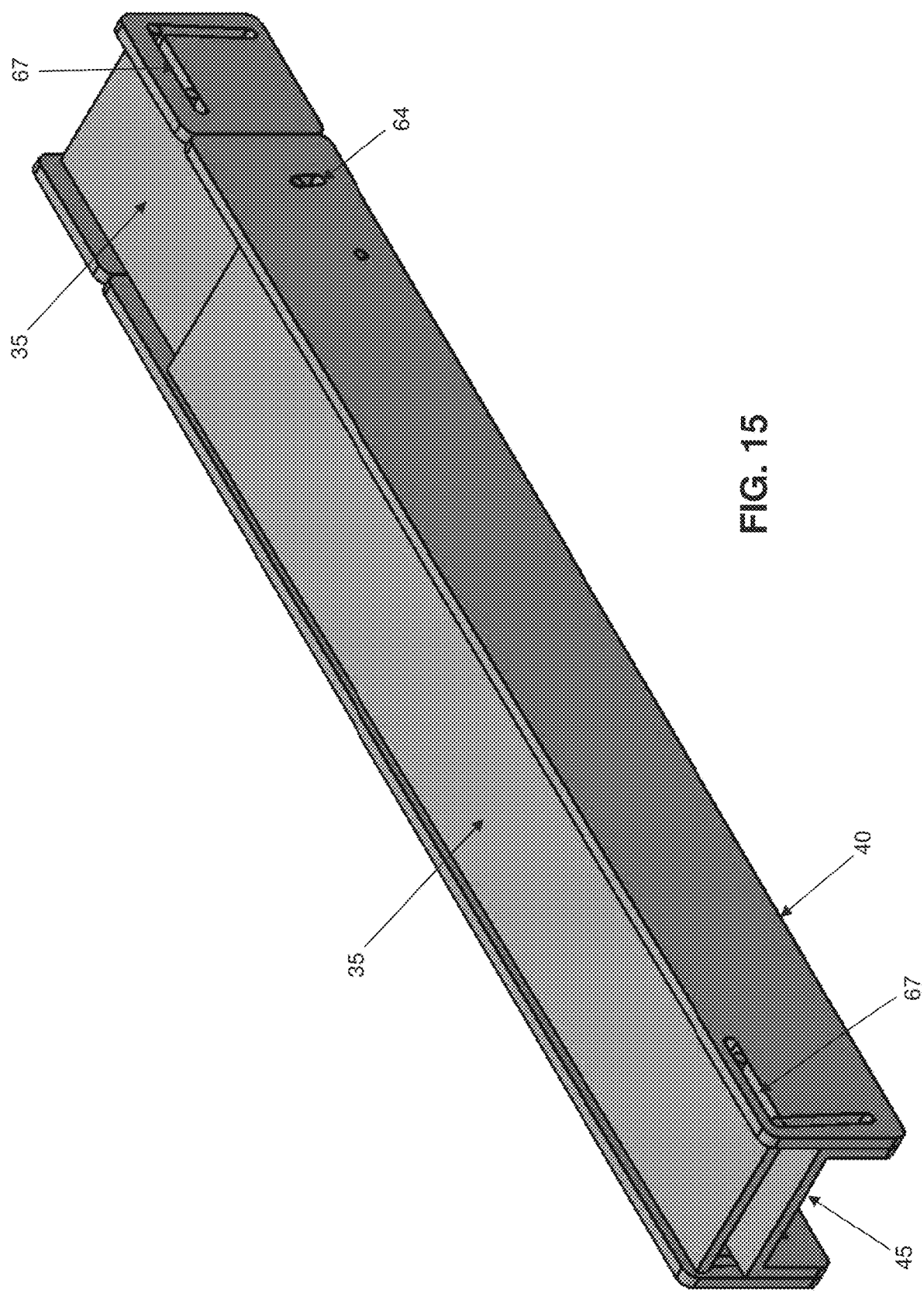
Figure 16:
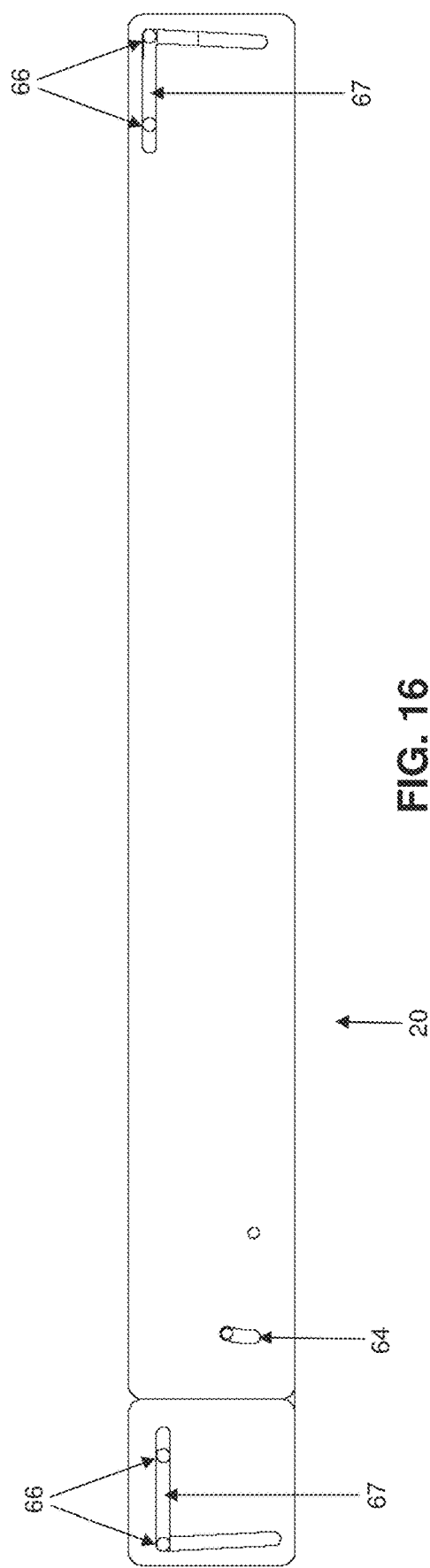
Figure 17:
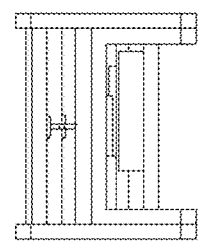

And note that resizable base 30 and hinged arms 35 may be folded up to a compact condition for easy transport and storage, i.e., with resizable base 30 reduced in size and with hinged arms 35 extending parallel to resizable base 30 (FIGS. 15-17).

The Flexible Barrier

Figure 18:
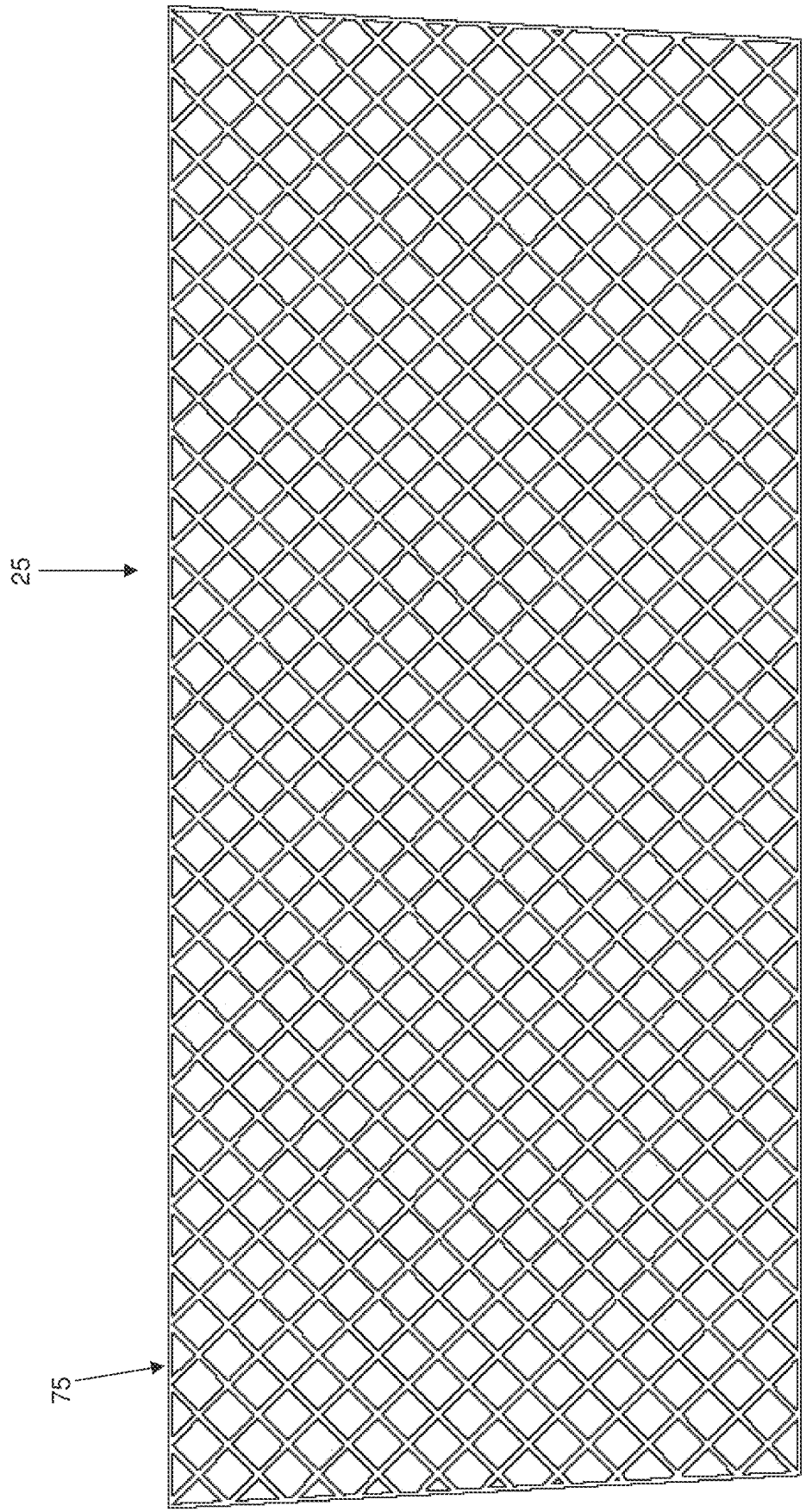
FIGS. 18 and 19 are schematic views showing the flexible barrier of the safety gate of FIGS. 1-7 in further detail.
Figure 19:
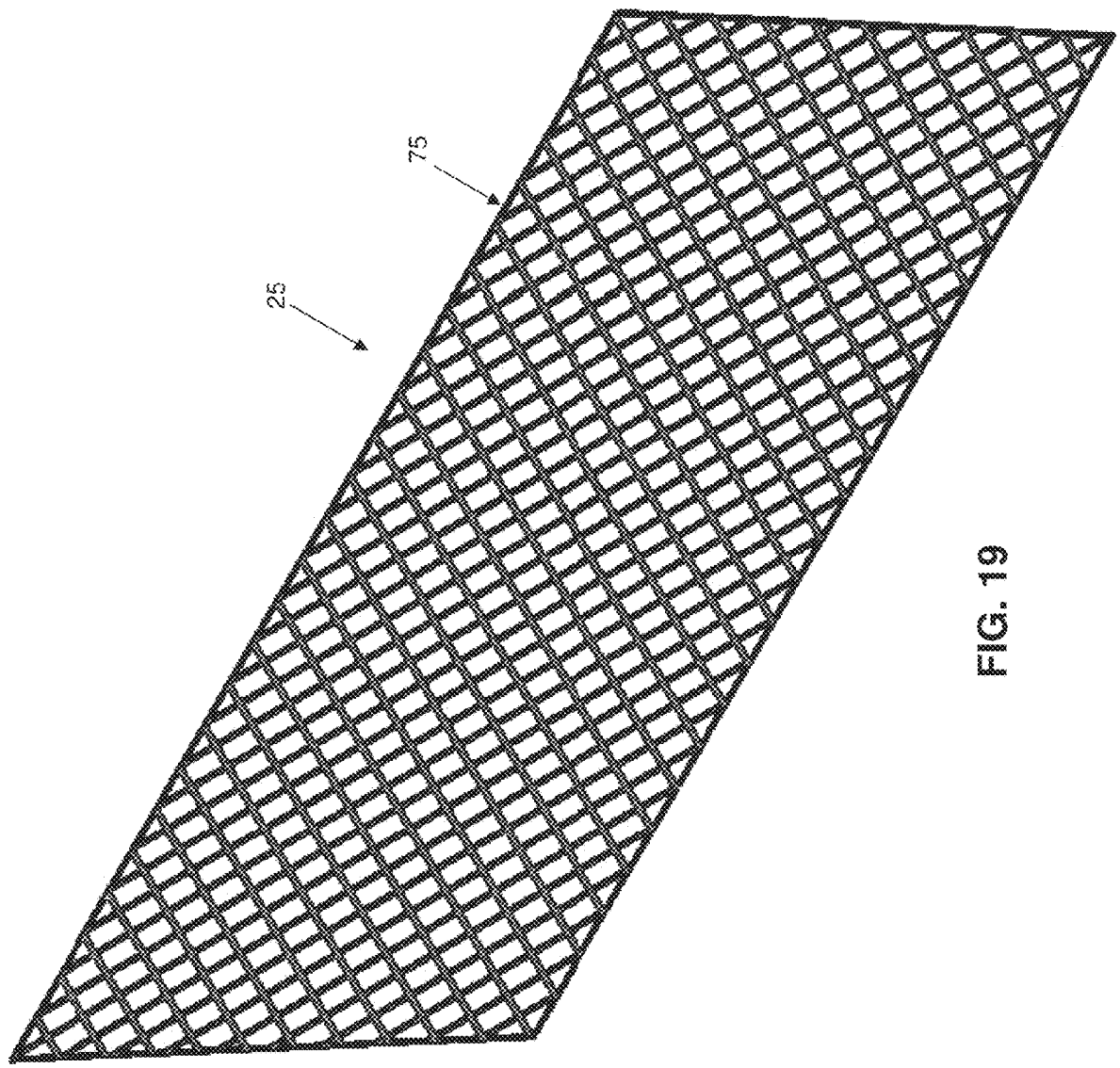

FIGS. 18 and 19 show one preferred construction for flexible barrier 25. Flexible barrier 25 is relatively soft and pliable and, if desired, may be elastic (i.e., resilient) in nature. In one form of the invention, the entire flexible barrier 25 may be elastic in nature; in another form of the invention, the top portion of flexible barrier 25 may be elastic in nature and the remainder of the flexible barrier may be relatively inelastic; and in still another form of the invention, the entire flexible barrier 25 may be relatively inelastic. In one preferred form of the invention, flexible barrier 25 is formed as a woven structure (e.g., as a woven net) using flexible filaments so that flexible barrier 25 can be stretched to some extent.

Flexible barrier 25 is attached to collapsible frame 20 after collapsible frame 20 has been set in a doorway (or hallway or walkway), with resizable base 30 appropriately sized and locked in position, and with hinged arms 35 locked in their upright position. Flexible barrier 25 is then erected between the two hinged arms 35, with flexible barrier 25 being releasably secured to fasteners 70 (FIG. 6), i.e., so that flexible barrier 25 may be manually "hung" on collapsible frame 20.

Use of Safety Gate 5

Safety gate 5 may be used to prevent pets and small children from passing through an opening and into restricted areas.

More particularly, safety gate 5 can be erected in a desired opening by setting up collapsible frame 20 in the opening so that the collapsible frame makes a pressure fit against an adjoining architectural structure, and then stringing flexible barrier 25 between the two hinged arms 35 of collapsible frame 25 (i.e., by manually hanging flexible barrier 25 on collapsible frame 20).

In one preferred method of use, collapsible frame 20 has its two hinged arms 35 set in their erect positions, with the upper ends of the two arms yieldably diverging from one another. Resizable base 30 is then set in opening 15 and base members 40, 45 are telescoped apart so that the outer ends of base members 40, 45 securely engage doorframe 10, and so that the two hinged arms 35 securely engage doorframe 10. As this occurs, the two hinged arms 35 press outwardly against doorframe 10, with the two hinged arms yielding as needed, so as to ensure that collapsible frame 20 makes a secure, binding fit with doorframe 10 (i.e., so that collapsible frame 20 makes a pressure fit against doorframe 10). Then flexible barrier 25 is manually hung on collapsible frame 20 using fasteners 70.

To allow an adult to pass through the safety gate, an adult can unlatch one of the top two corners of the flexible barrier, walk through the safety gate, and then re-attach the detached corner of the flexible barrier.

When safety gate 5 is no longer needed in that location, the safety gate may be taken down and folded up to a manageable size for easy transportation and storage.

More particularly, in one preferred method of disassembly, flexible barrier 25 is detached from hinged arms 35, latch mechanism 50 is released and base members 40, 45 are telescoped inward, preferably to the most minimal distance. As base members 40, 45 telescope inwardly, the force securing the two hinged arms 35 against the adjoining architectural structure is disengaged (i.e., the pressure fit of collapsible frame 20 against the doorframe is released). Then hinged arms 35 are pulled upward and then folded down parallel to base members 40, 45. With safety gate 5 in its collapsed condition, the safety gate may then be easily transported and stored.

Note that at no time is safety gate 5 permanently fastened to wall structures.

Thus it will be seen that the present invention provides a self-contained safety gate 5 which is (i) collapsible to a linear configuration which is easily transported and stored, and (ii) erectable to a substantially U-shaped configuration which is pressure-mounted against the surfaces of an adjoining architectural structure, with the pressure-mounted safety gate being locked in place against the adjoining architectural structure until the latch mechanism in the resizable base is released.

Elastic Strap or Cord at the Top of the Flexible Barrier

Figure 21:
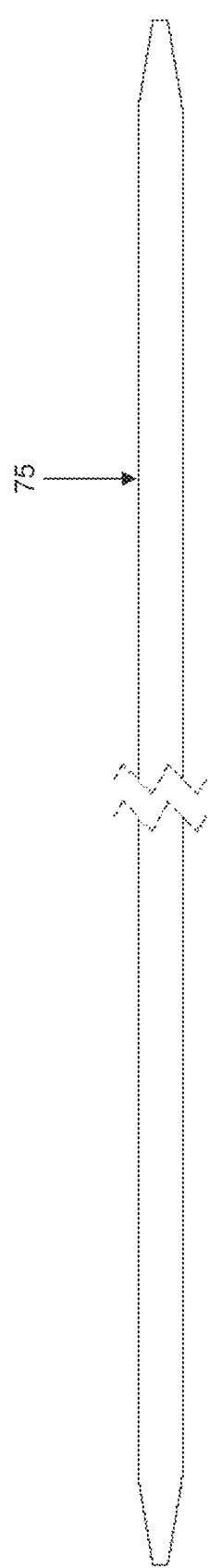
FIGS. 20 and 21 are schematic views showing an elastic strap or cord which may be added at the top of the flexible barrier of the safety gate of FIGS. 1-7.
Figure 20:
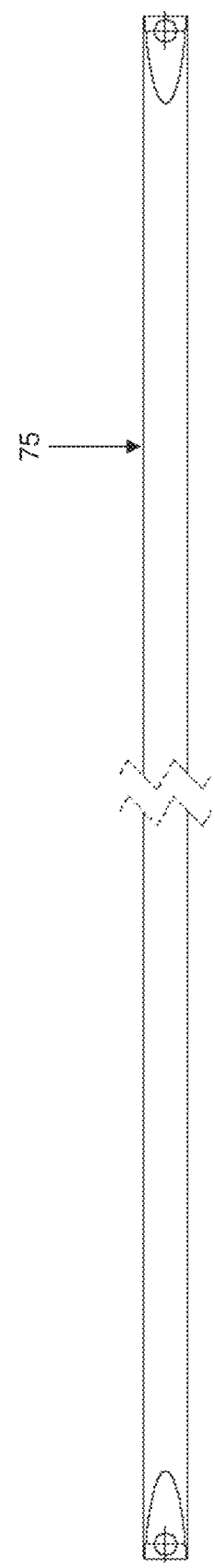
Figure 23:
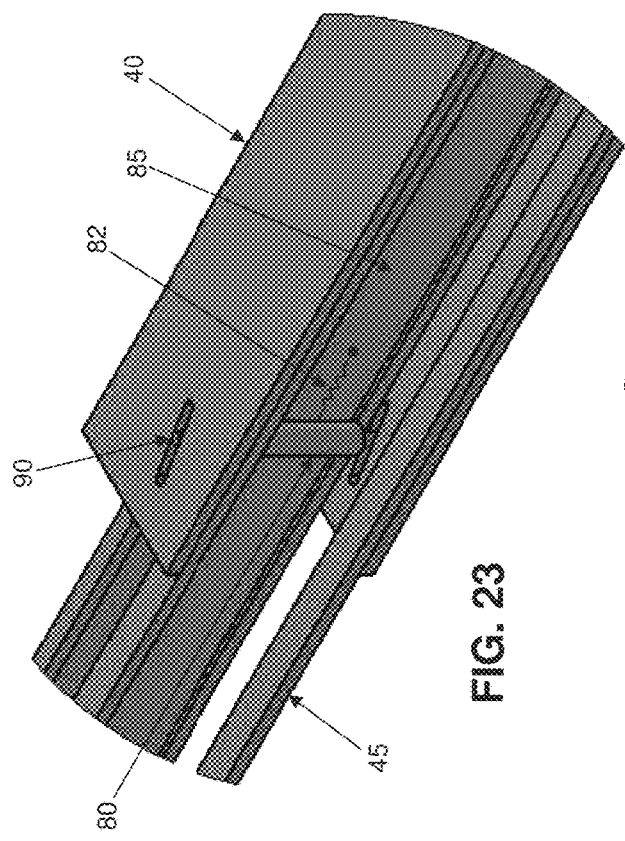
Figure 24:
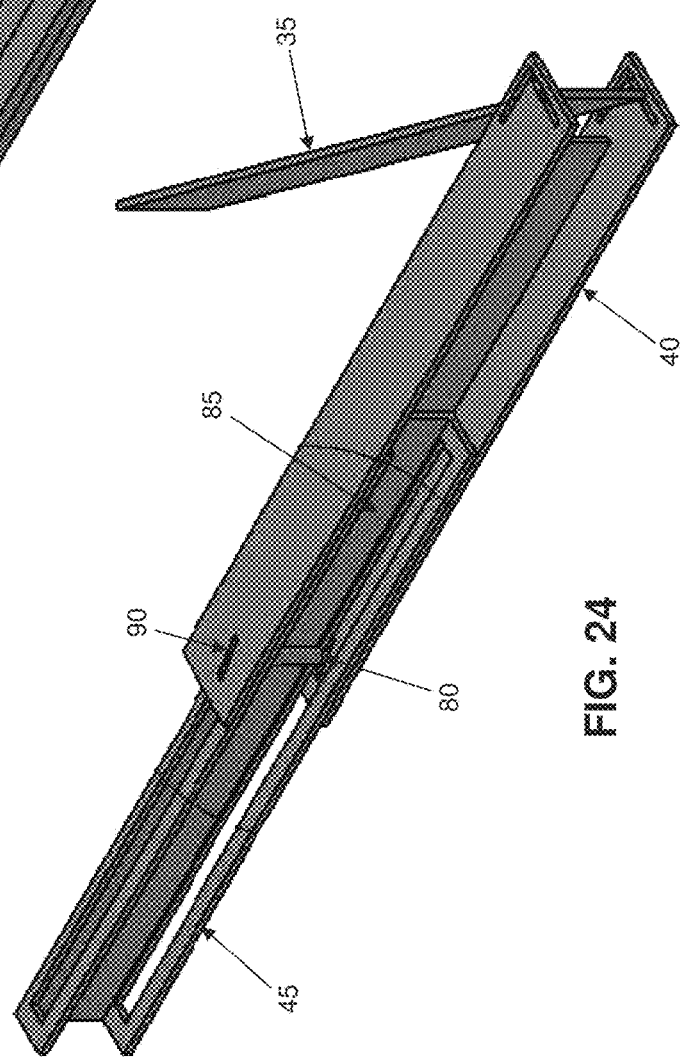
Figure 25:
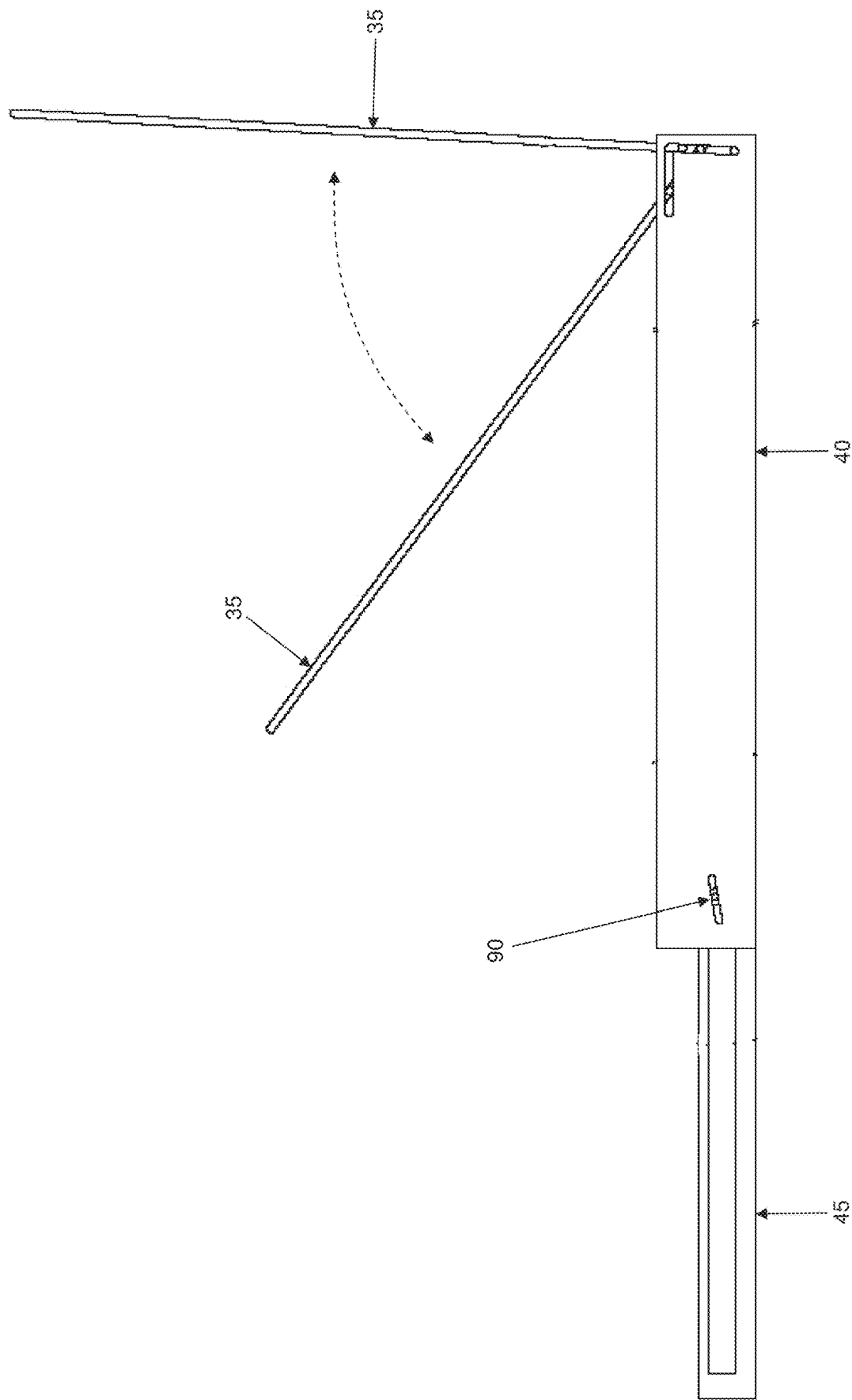
Figure 30:
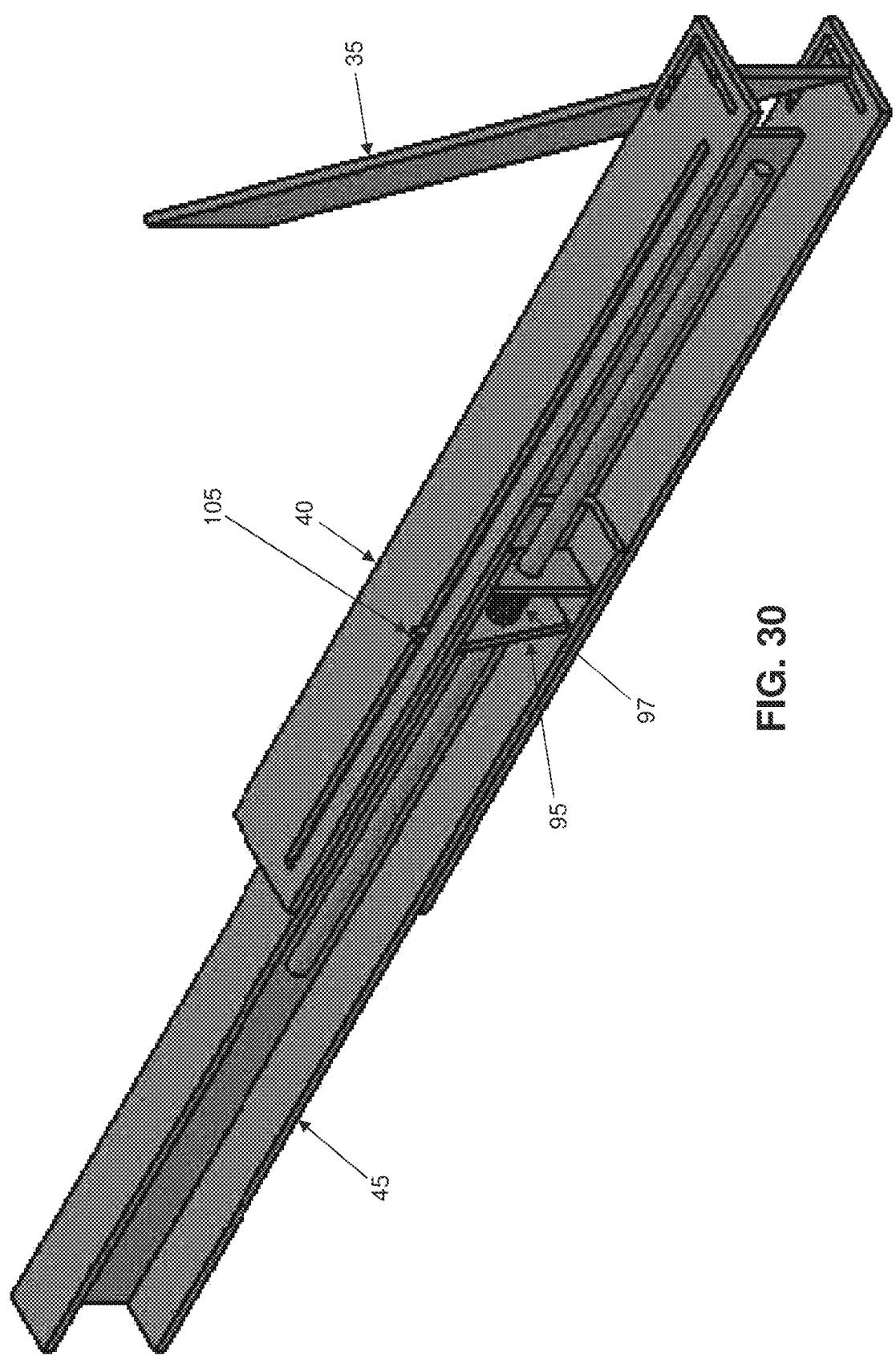
Figure 34:
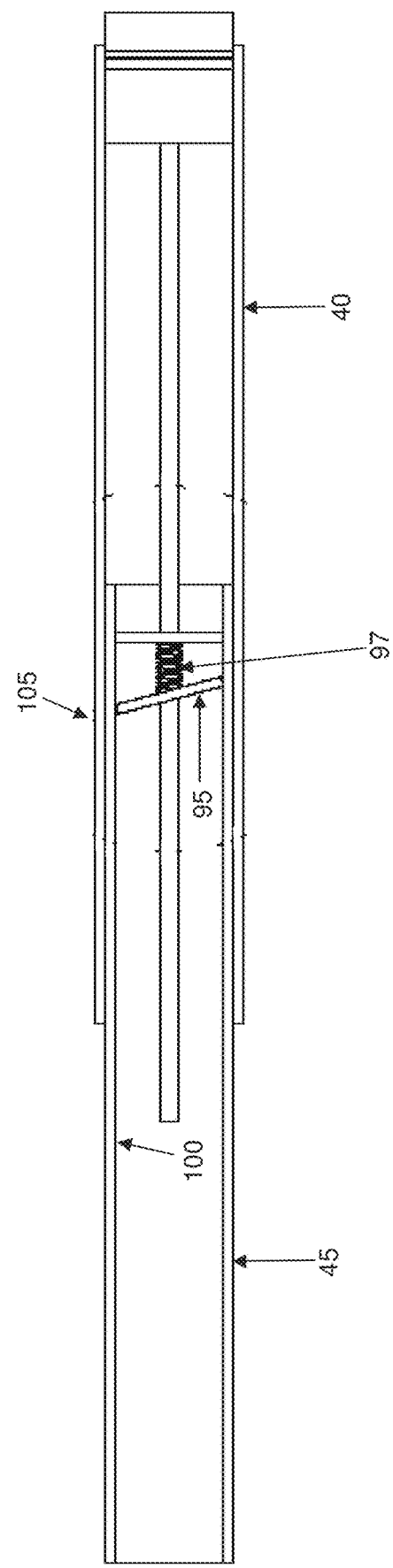
Figure 35:
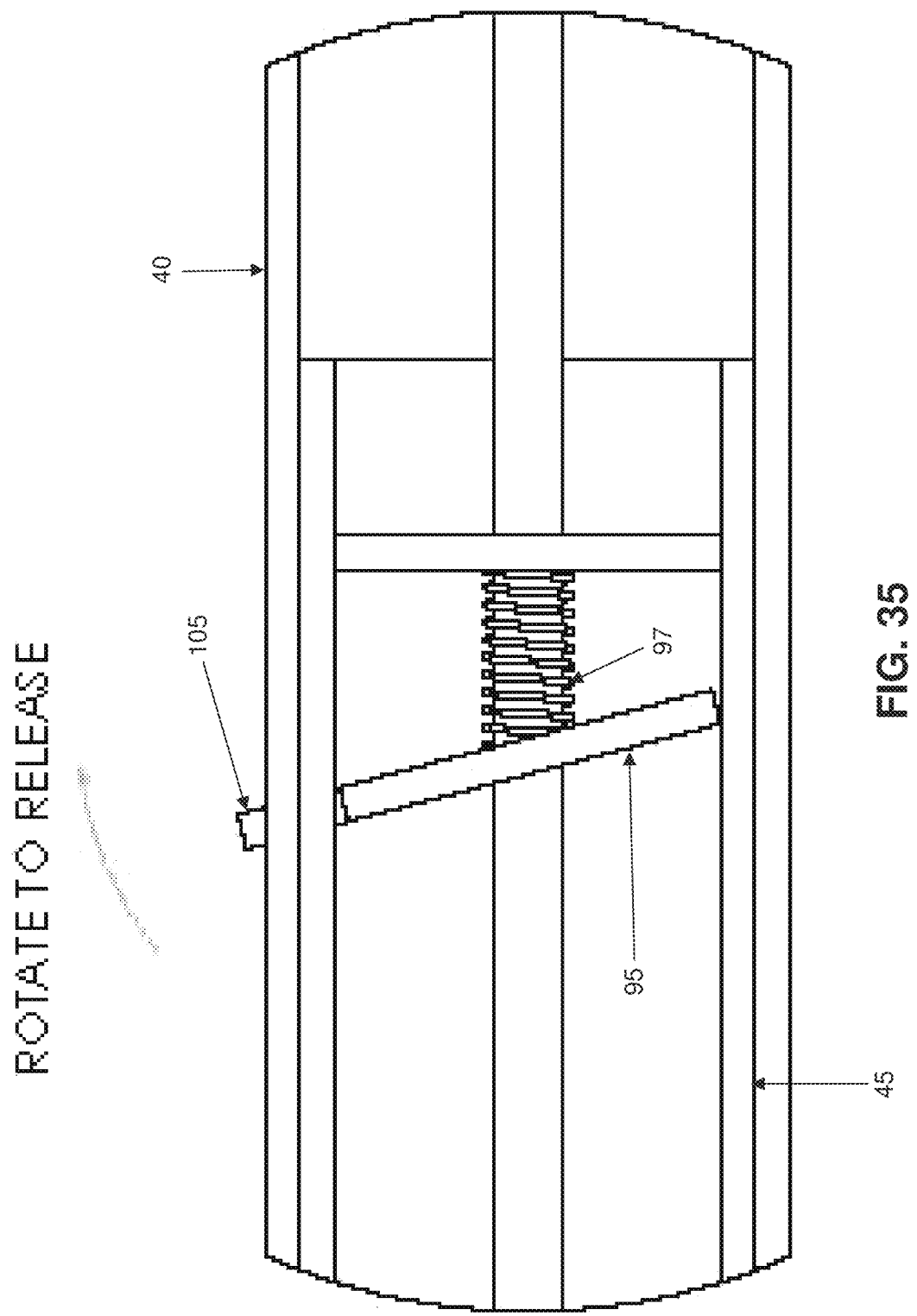

If desired, and looking now at FIGS. 20 and 21, an elastic strap or cord 75 may be (i) passed through, or otherwise connected to, the top end of flexible barrier 25, and (ii) connected to the two hinged arms 35 of collapsible frame 20 at the top two corners of the safety gate (e.g., at fasteners 70). See also FIGS. 5, 6, 7, 18 and 19, where flexible barrier 25 has an elastic strap or cord 75 attached to the top end of flexible barrier 25. Elastic strap or cord 75 provides increased support to help hold up the top end of flexible barrier 25.

In one form of the invention, the entire flexible barrier may be elastic in nature, and elastic strap or cord 75 may provide additional support to help hold up the top end of flexible barrier 25. In another form of the invention, only elastic strap or cord 75 is elastic and the remainder of the flexible barrier may be relatively inelastic.

Alternative Latch Mechanisms

It is also possible to utilize different latch mechanisms for resizable base 30 of collapsible frame 20 of safety gate 5.

Thus, for example, and looking now at FIGS. 22-28, the latch mechanism may comprise a locking pin 80 which is spring-biased by a spring 82 (FIG. 23) into engagement with a friction rack 85. To release the latch mechanism, a finger tab 90 is used to push locking pin 80 against the power of spring 82, whereby to allow locking pin 80 to disengage from friction rack 85.

Furthermore, and looking now at FIGS. 29-35, the latch mechanism may comprise a locking plate 95 which is spring-biased by a spring 97 (FIG. 30) into engagement with a wall 100 of base member 45 of collapsible frame 20. To release the latch mechanism, a finger tab 105 is used to push locking plate 95 against the power of spring 97, whereby to allow locking plate 95 to disengage from wall 100 of base member 95.

Advantages of the Safety Gate Having a Flexible Barrier Manually "Hung" on the Collapsible Frame The present invention provides numerous advantages over prior art safety gates. For one thing, the present invention provides a flexible safety gate which is pressure-mounted to adjacent architectural structures, thus enabling the safety gate to be temporary in nature. And the present invention provides the ability to pass through the safety gate by unlatching one end of the flexible barrier from a hinged arm while a person passes through the safety gate. Also, the present invention provides a safety gate which has a flexible horizontal top "crossbar" instead of a rigid horizontal top "crossbar". Furthermore, the present invention provides a self-contained safety gate that is easily stowed and transported.

Safety Gate with Flexible Barrier Spooled on Collapsible Frame

In another preferred form of the invention, the safety gate can have its flexible barrier spooled into one hinged arm of its collapsible frame, with the flexible barrier being drawn across the opening of the collapsible frame when the safety gate is to provide its barrier function, and with the flexible barrier being spooled back into one hinged arm of the collapsible frame when the safety gate is to be opened for passage.

Figure 36:
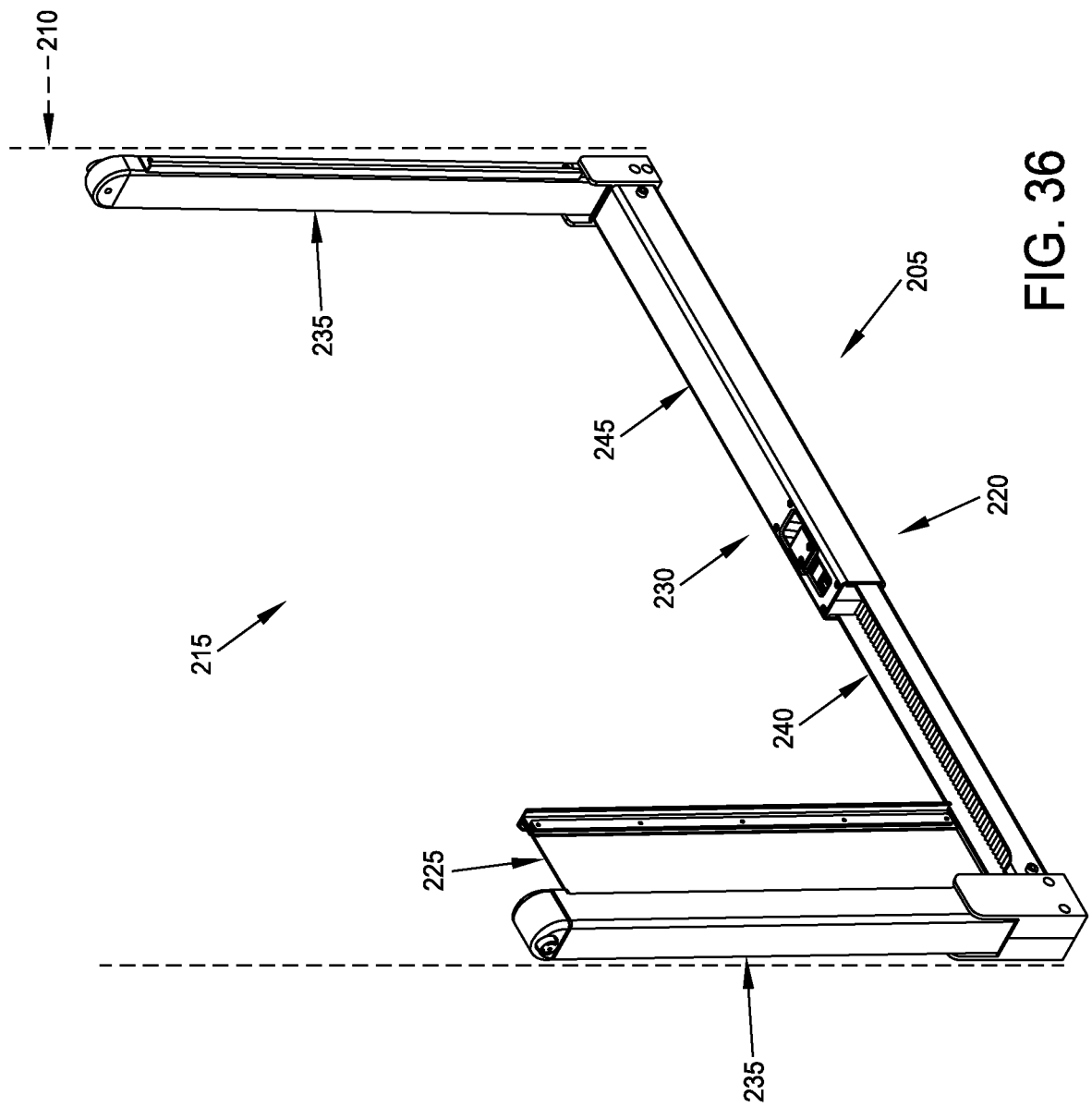
FIGS. 36-38 are schematic views showing another safety gate formed in accordance with the present invention.
Figure 37:
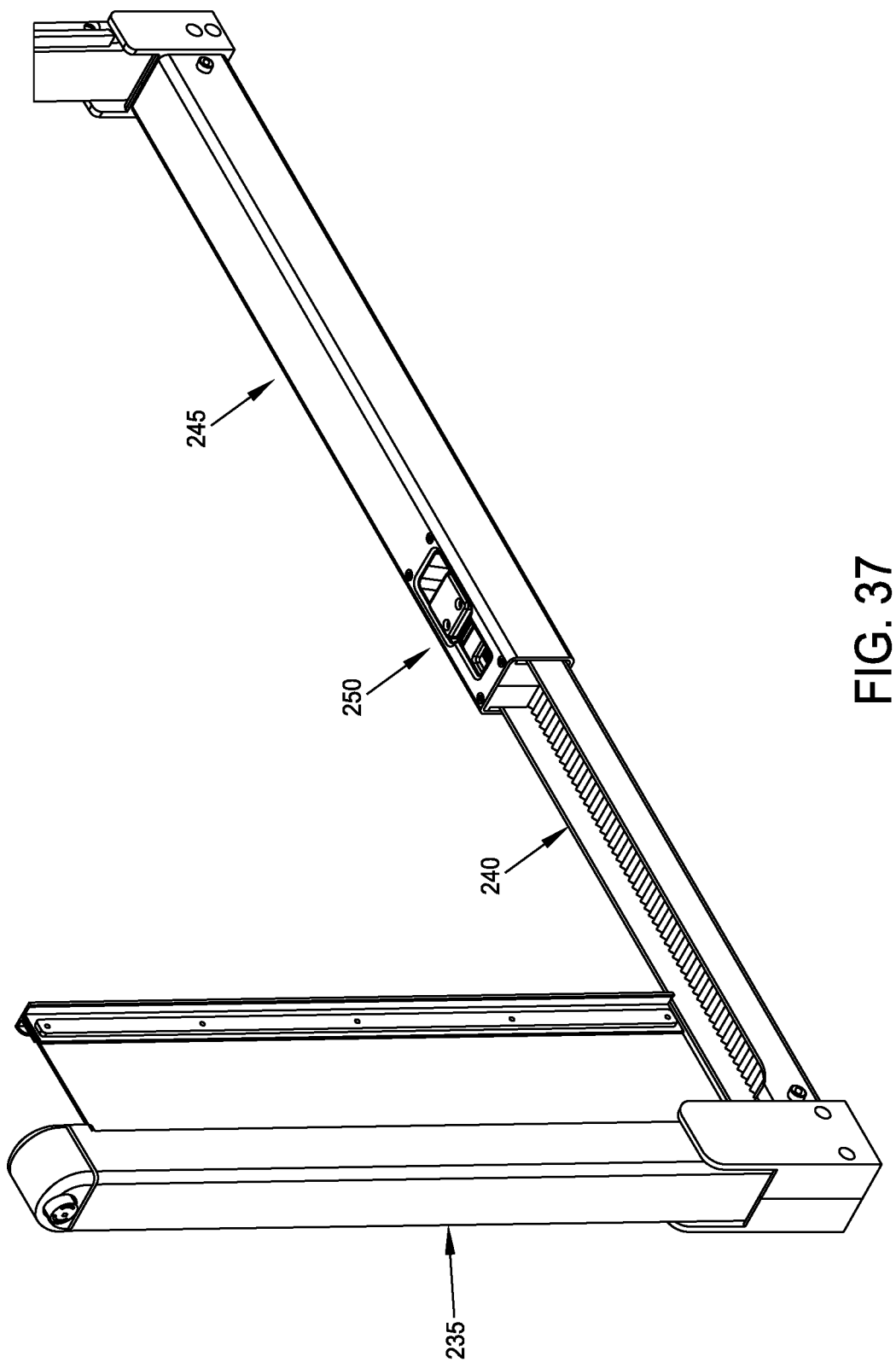
Figure 38:
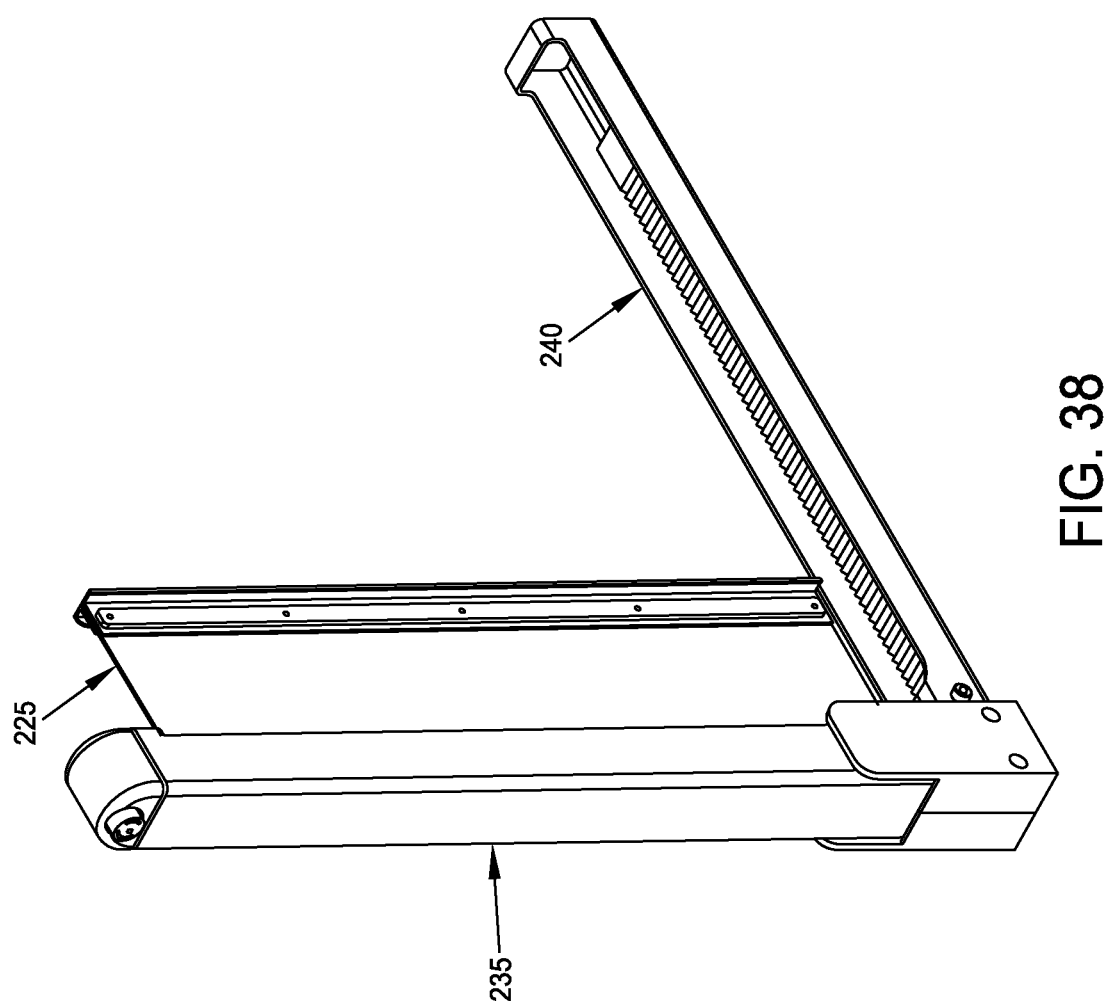
Figure 39:
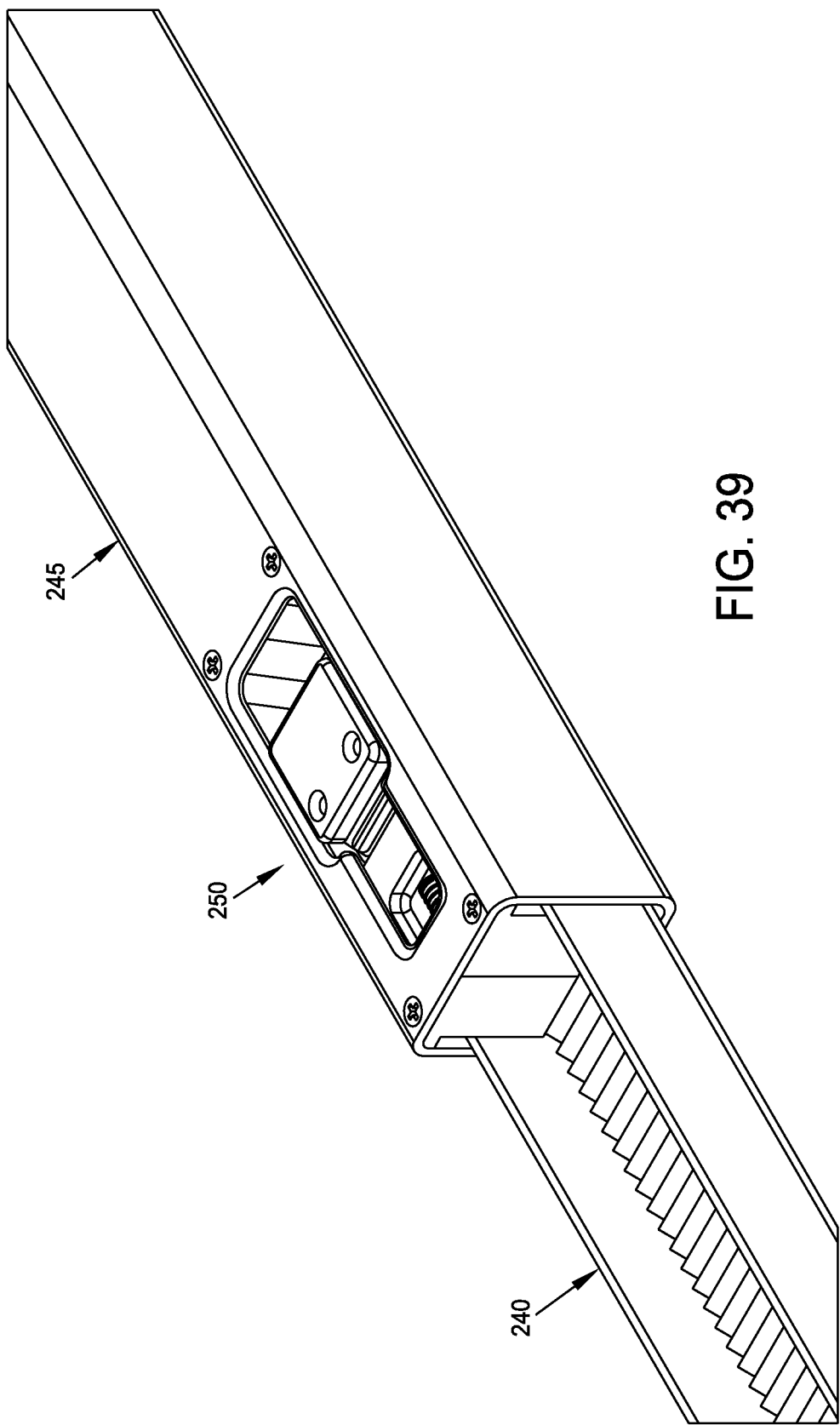
FIGS. 39-46 are schematic views showing further details of the collapsible frame of the safety gate of FIGS. 36-38.
Figure 40:
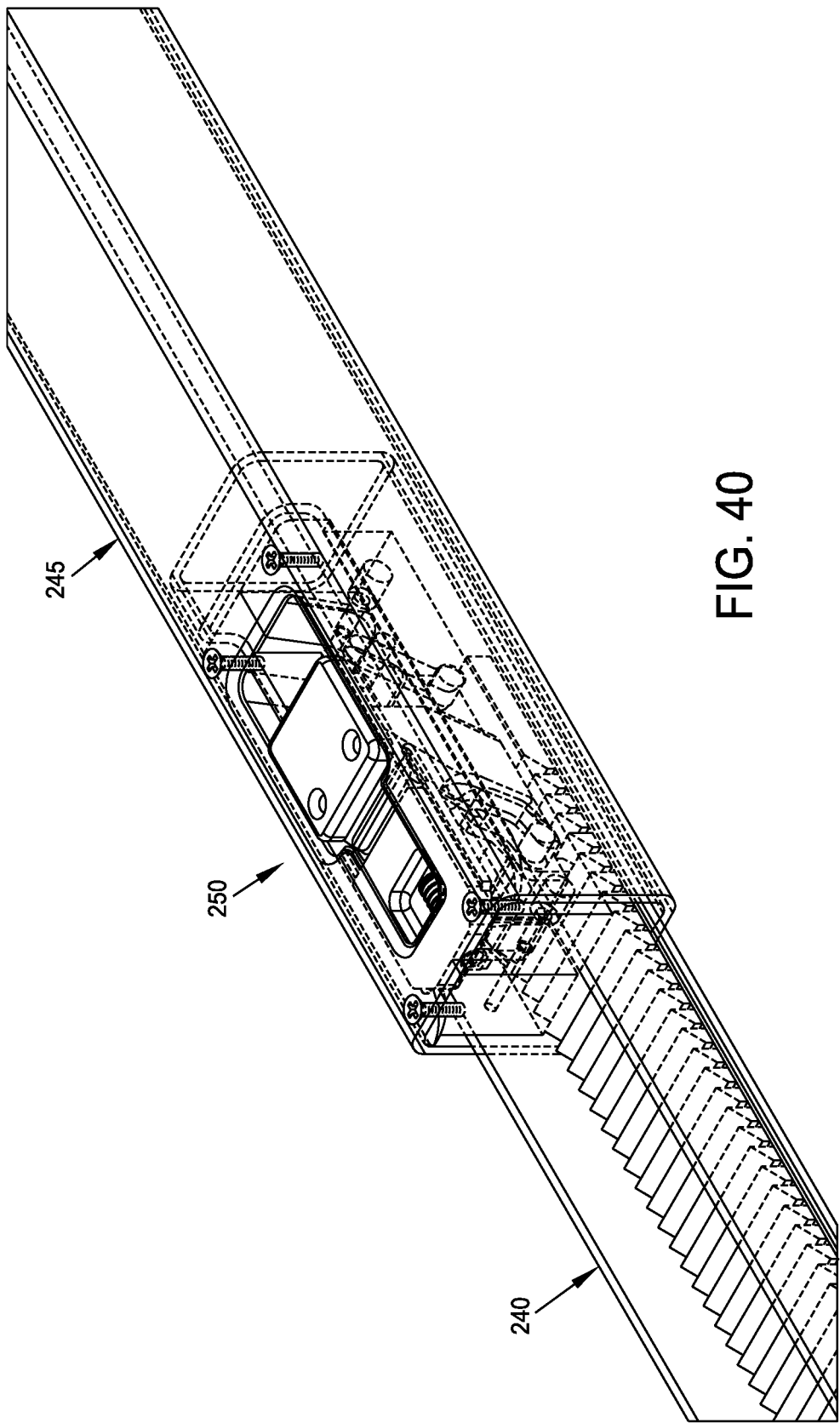
Figure 41:
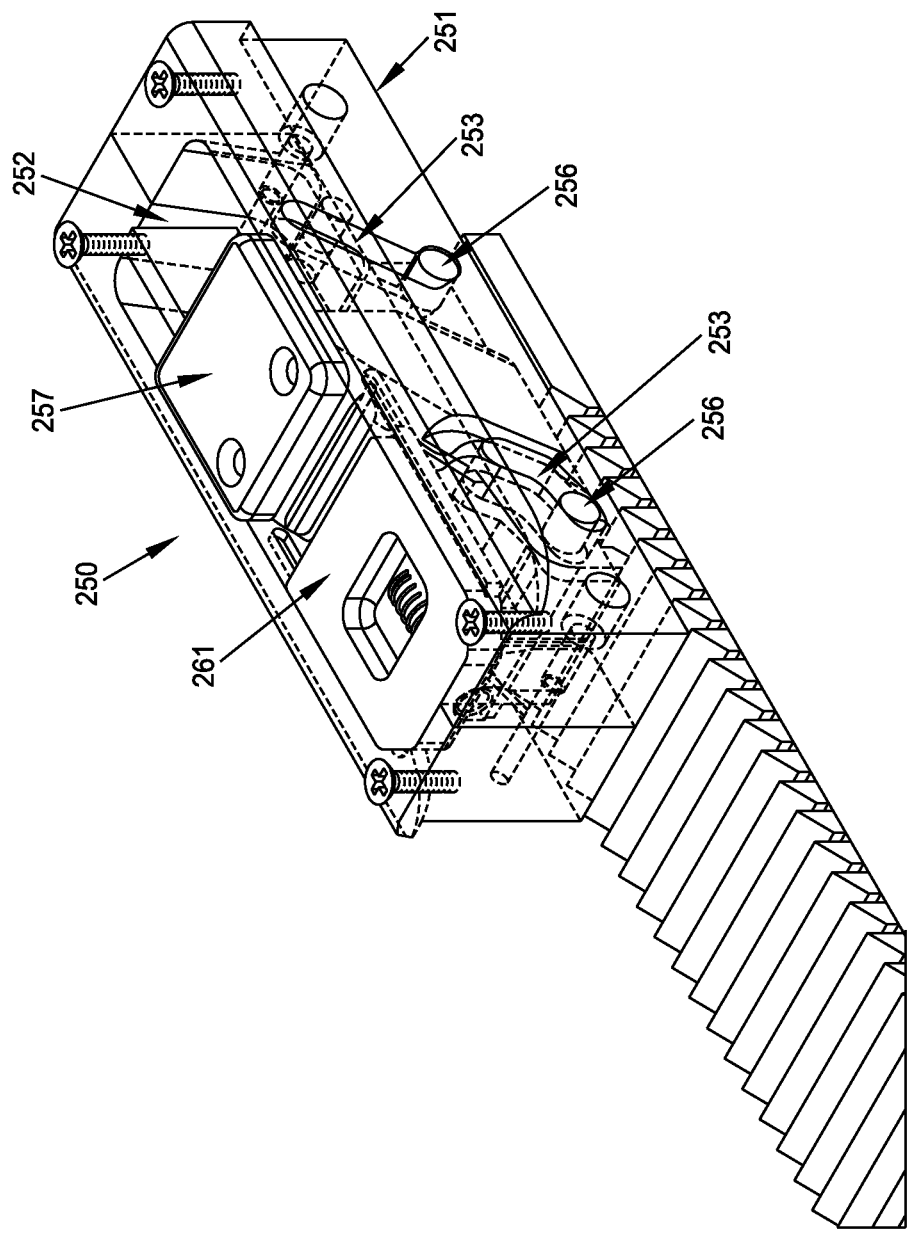
Figure 42:
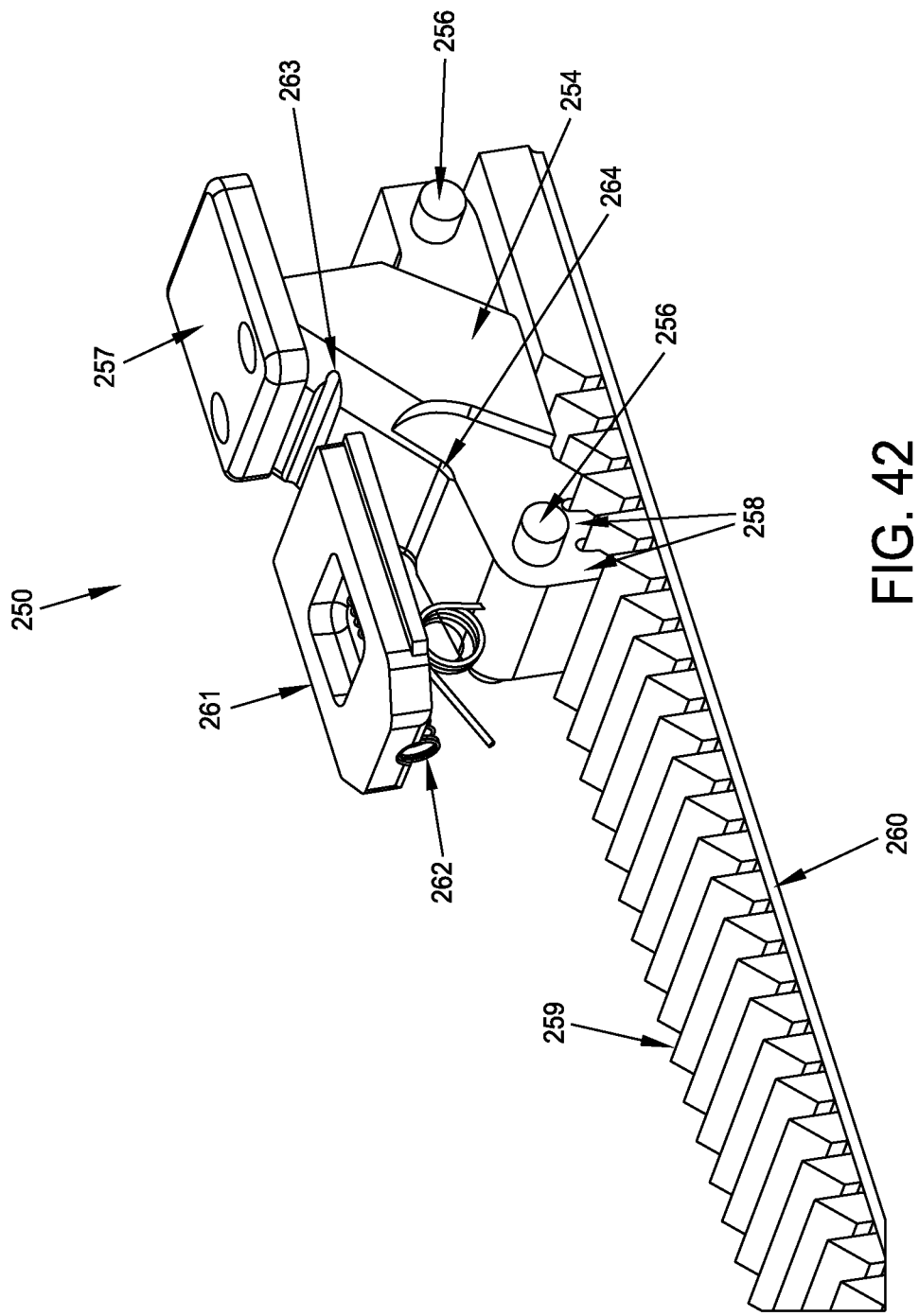
Figure 43:
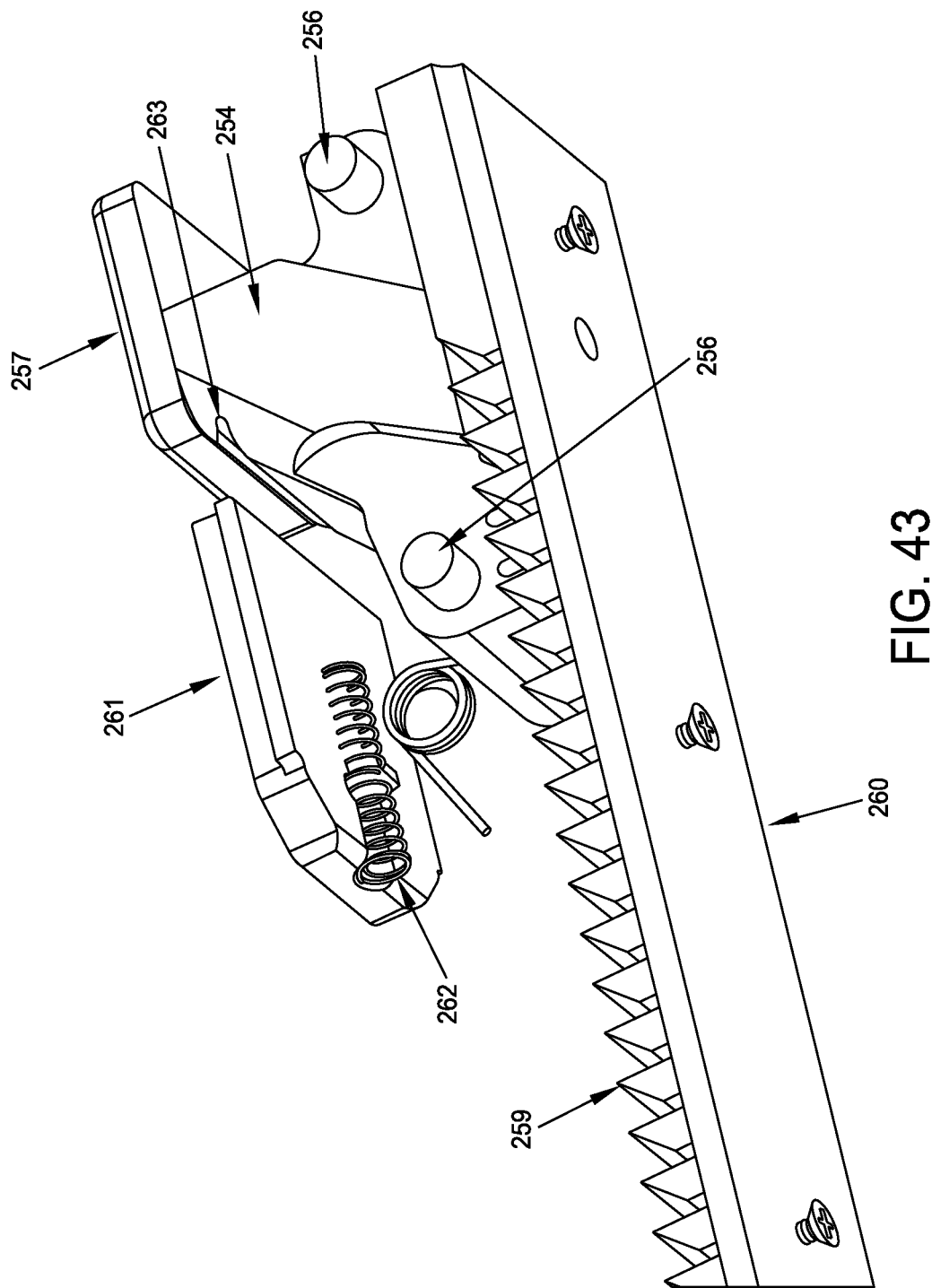

More particularly, and looking now at FIGS. 36 and 37, there is shown a safety gate 205 erected in a doorframe 210 so as to close off the lower portion of the opening 215 of the doorway. Safety gate 205 is releasably secured in doorframe 210 using a pressure fit so as to provide a barrier to prevent a pet or small child from passing through the opening of the doorway (e.g., so as to prevent a pet or small child from passing from one room to another room). Safety gate 205 is also capable of closing off other openings, e.g., in a hallway or walkway, so as to restrict access by a pet or small child.

Safety gate 205 generally comprises a collapsible frame 220 and a flexible barrier 225.

The Collapsible Frame

FIGS. 36-60 show one preferred construction for collapsible frame 220. In this form of the invention, collapsible frame 220 comprises a resizable base 230 and a pair of hinged arms 235.

Resizable base 230 comprises two base members 240, 245 which are telescopically extendable relative to one another so as to accommodate an array of different doorway (or hallway or walkway) widths. Base members 240, 245 are able to slide freely in one direction (i.e., in an opening direction) but are prevented from returning in the other direction (i.e., in a closing direction) by a latch mechanism 250.

As seen in greater detail in FIGS. 39-43, latch mechanism 250 comprises a housing 251 having a recess 252 and slots 253 formed therein. A grip 254 is slidably disposed within recess 252 of housing 251. More particularly, grip 254 comprises a pair of pins 256 which ride along slots 253 of housing 251. Grip 254 comprises a finger tab 257 for urging grip 254 along slots 253, and teeth 258 for selectively engaging teeth 259 of a ribbed rack 260, whereby to lock base members 240, 245 of resizable base 230 in position relative to one another.

A lock 261 is provided to selectively lock grip 254 in (i) an "engaged" position wherein teeth 258 of grip 254 engage teeth 259 of ribbed rack 260 (and hence lock base members 240, 245 of resizable base 230 in position relative to one another), or (ii) a "disengaged" position wherein teeth 258 of grip 254 are disengaged from teeth 259 of ribbed rack 260 (and hence allow base members 240, 245 of resizable base 230 to move relative to one another). More particularly, lock 261 is spring-biased against grip 254 by a spring 262, and grip 254 comprises a groove 263 for receiving lock 261 when latch mechanism 250 is in its "engaged" position, and a groove 264 for receiving lock 261 when latch mechanism 250 is in its "disengaged" position. Note that when lock 261 is seated in groove 263 or groove 264, grip 254 is prevented from moving within recess 252 of housing 251.

When latch mechanism 250 is in its "engaged" position and is to be released, lock 261 is pulled against the power of spring 262 so as to withdraw lock 261 from groove 263, and then finger tab 257 is lifted up so as to cause grip 254 to ride along slots 253 and disengage teeth 258 of grip 254 from teeth 259 of ribbed rack 260. Latch mechanism 250 may then be maintained in this "disengaged" position by releasing the force on lock 261 so that spring 262 seats lock 261 in groove 264.

When latch mechanism 250 is in its "disengaged" position and is to be re-set in its "engaged" position, lock 261 is pulled against the power of spring 262 so as to withdraw lock 261 from groove 264, and then finger tab 257 is pushed down so as to cause grip 254 to ride along slots 253 and securely engage teeth 258 of grip 254 with teeth 259 of ribbed rack 260. Latch mechanism 250 may then be maintained in this "engaged" position by releasing the force on lock 261 so that spring 262 seats lock 261 in groove 263.

Figure 44:
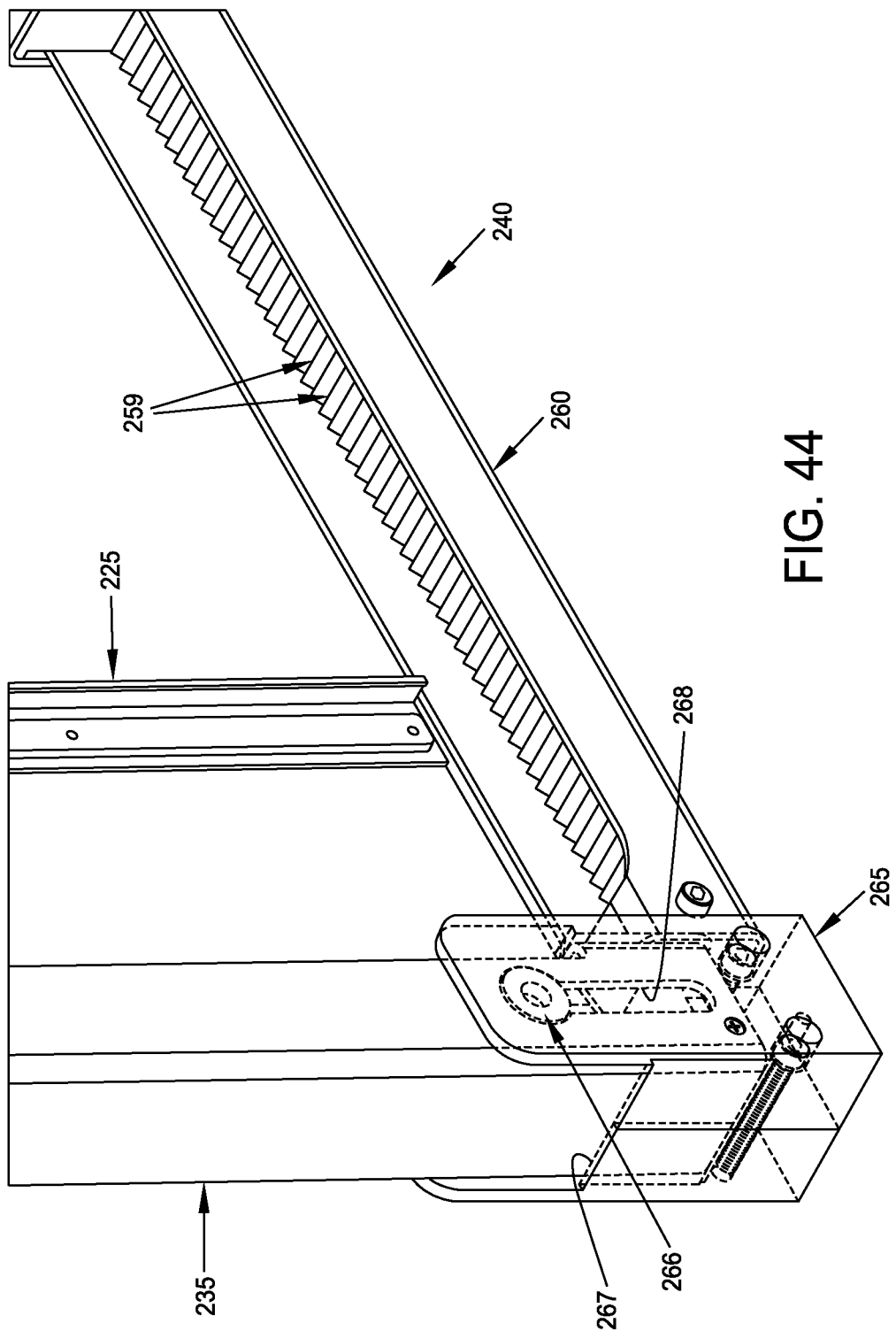
Figure 45:
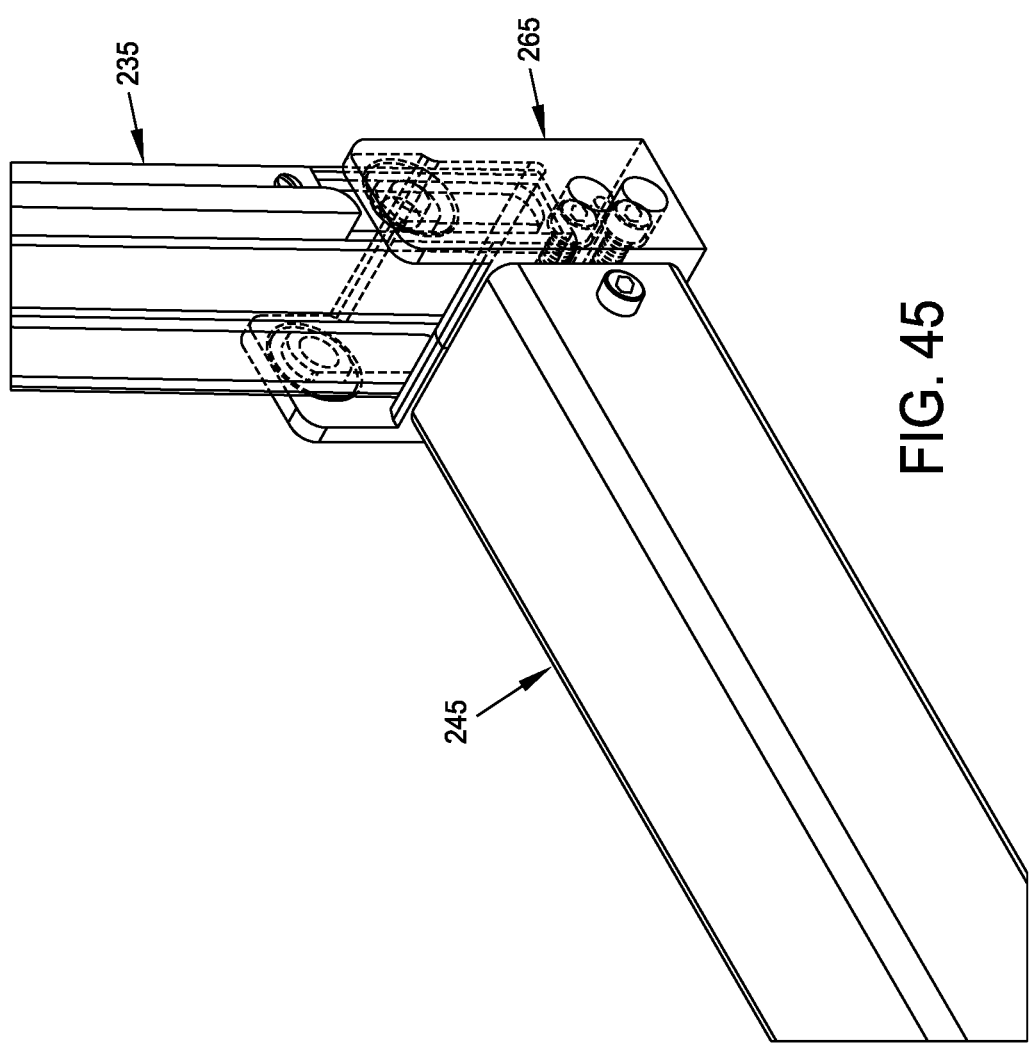
Figure 46:
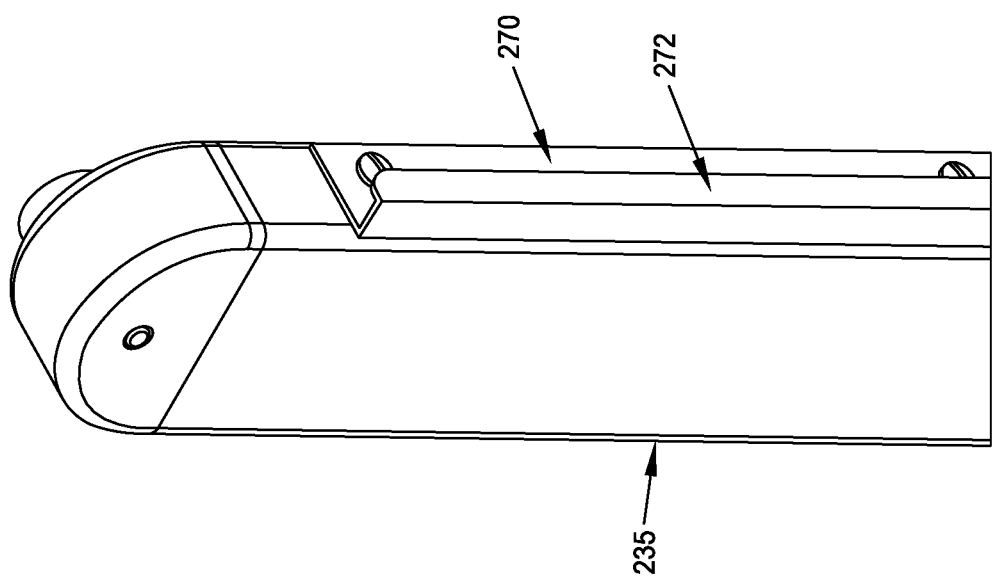
Figure 47:
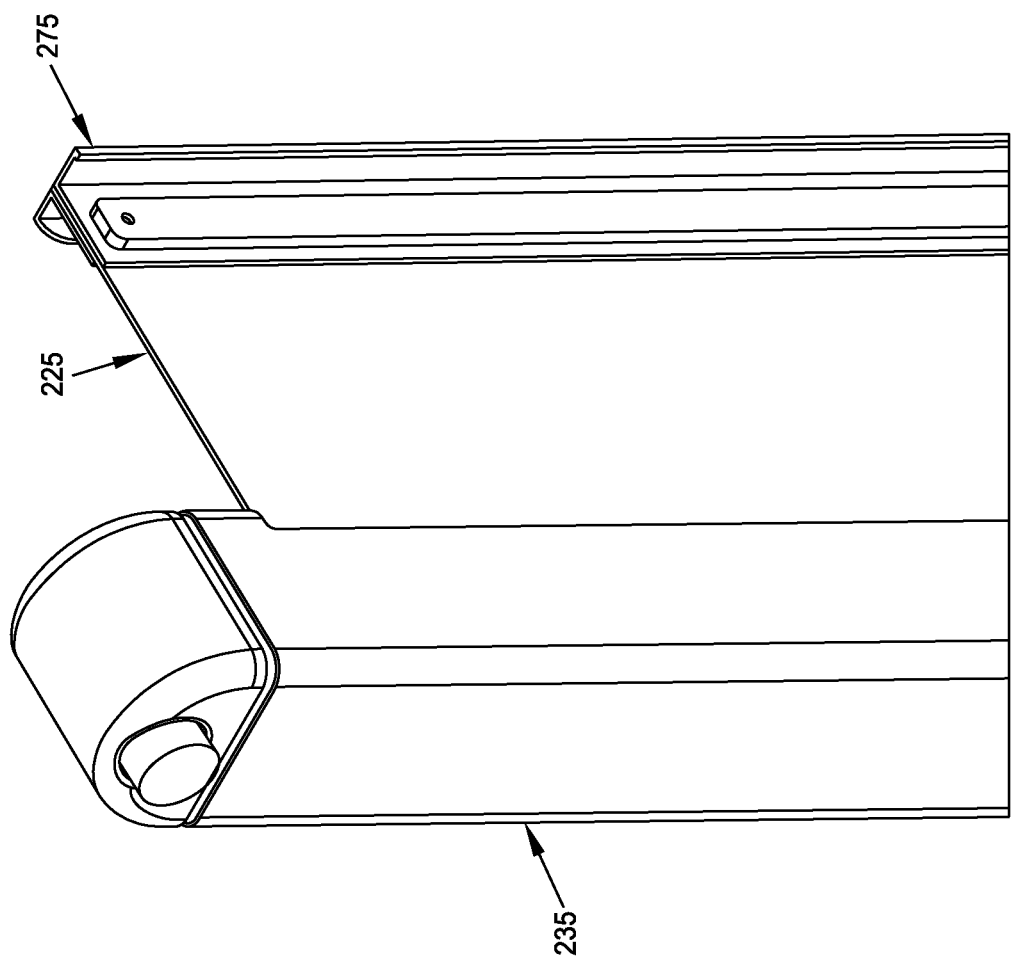
FIG. 47 is a schematic view showing further details of the flexible barrier of the safety gate of FIGS. 36-38.
Figure 48:
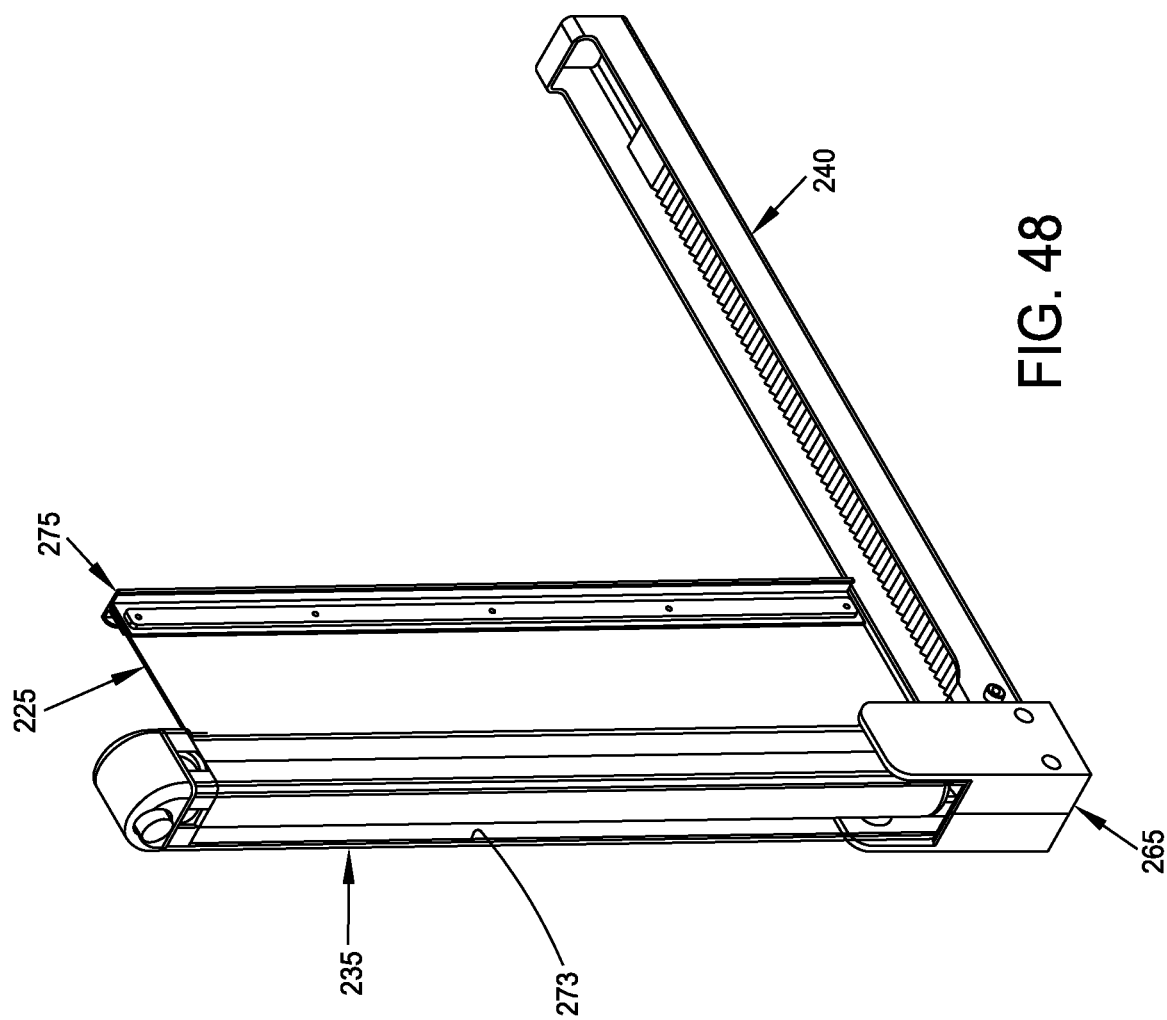
FIGS. 48-60 are schematic views showing further details of the spring-biased spool for spooling the flexible barrier into one arm of the collapsible frame of the safety gate of FIGS. 36-38.
Figure 49:
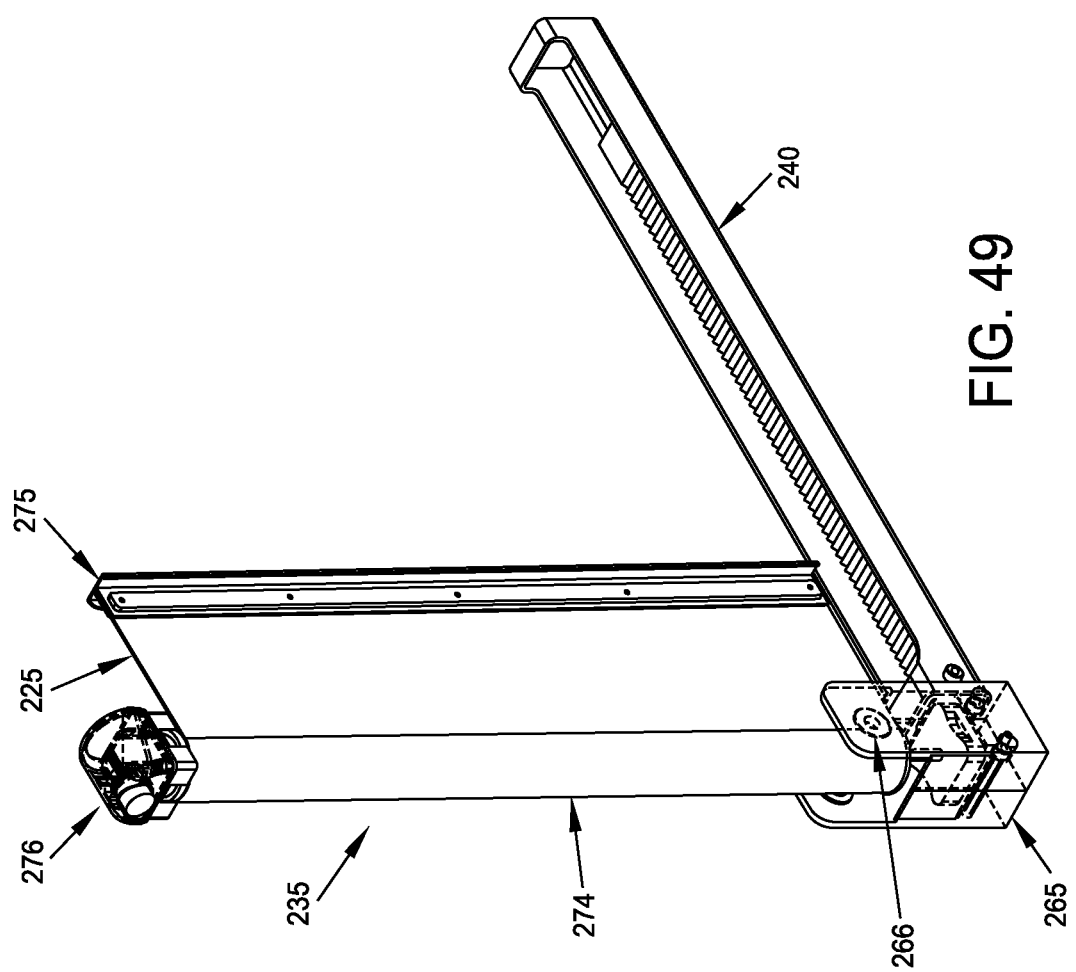
Figure 50:
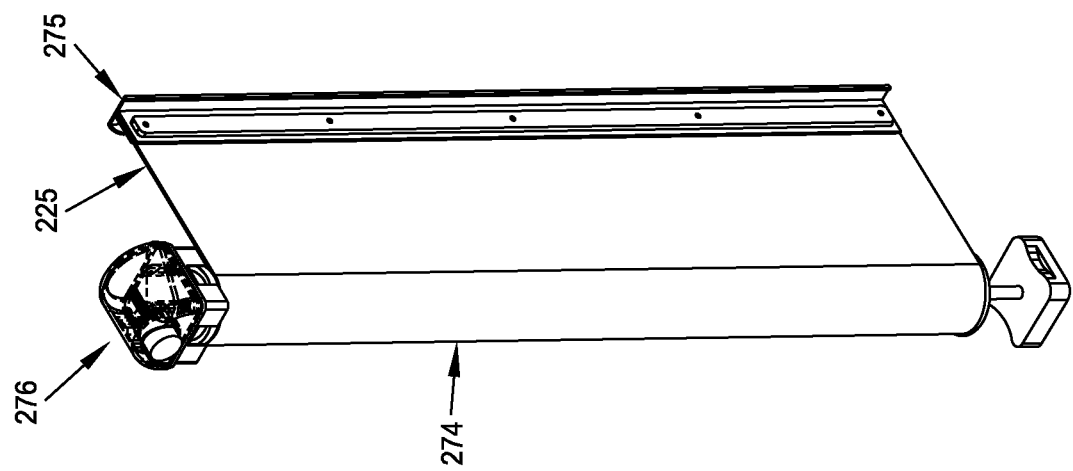
Figure 51:
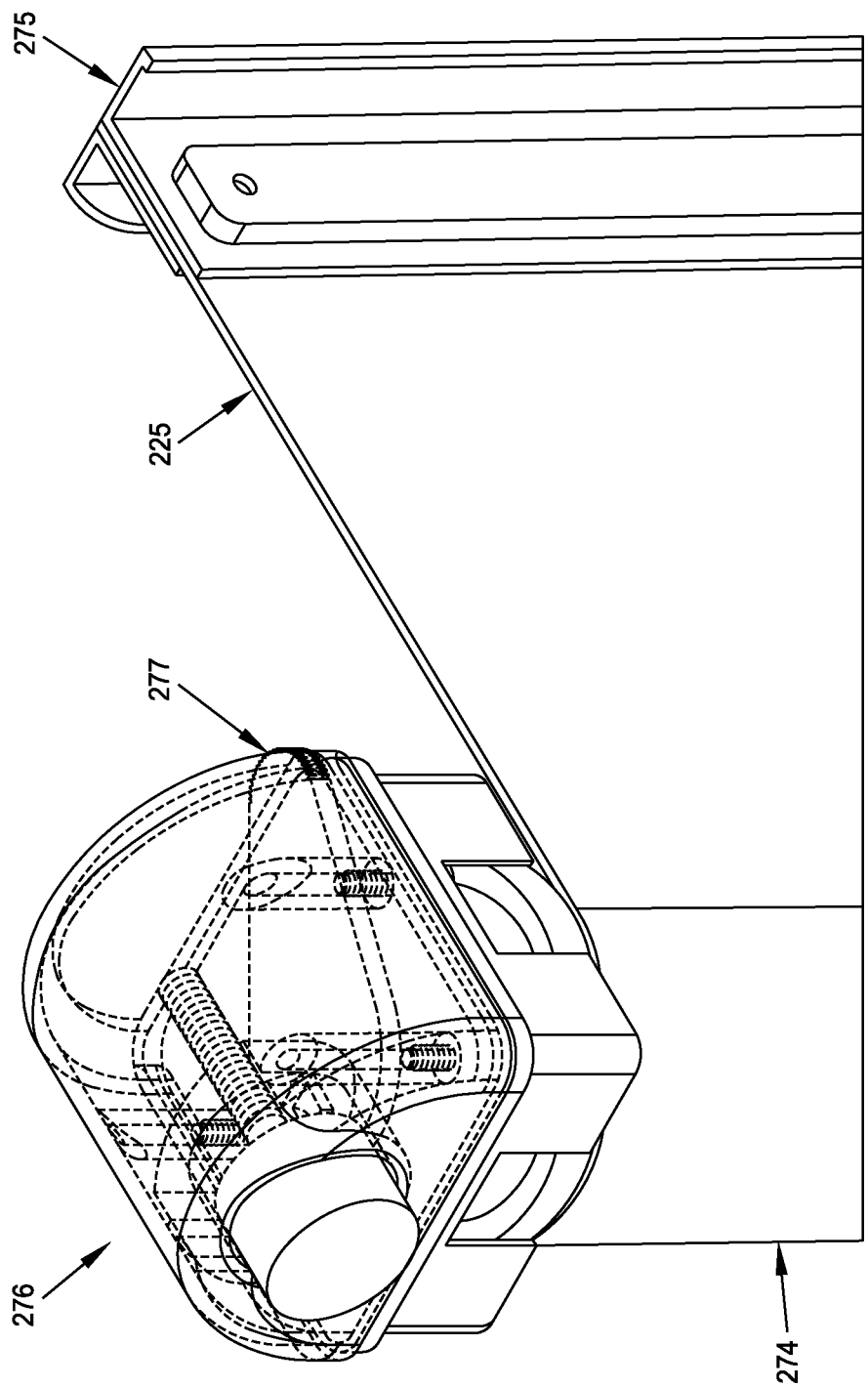
Figure 52:
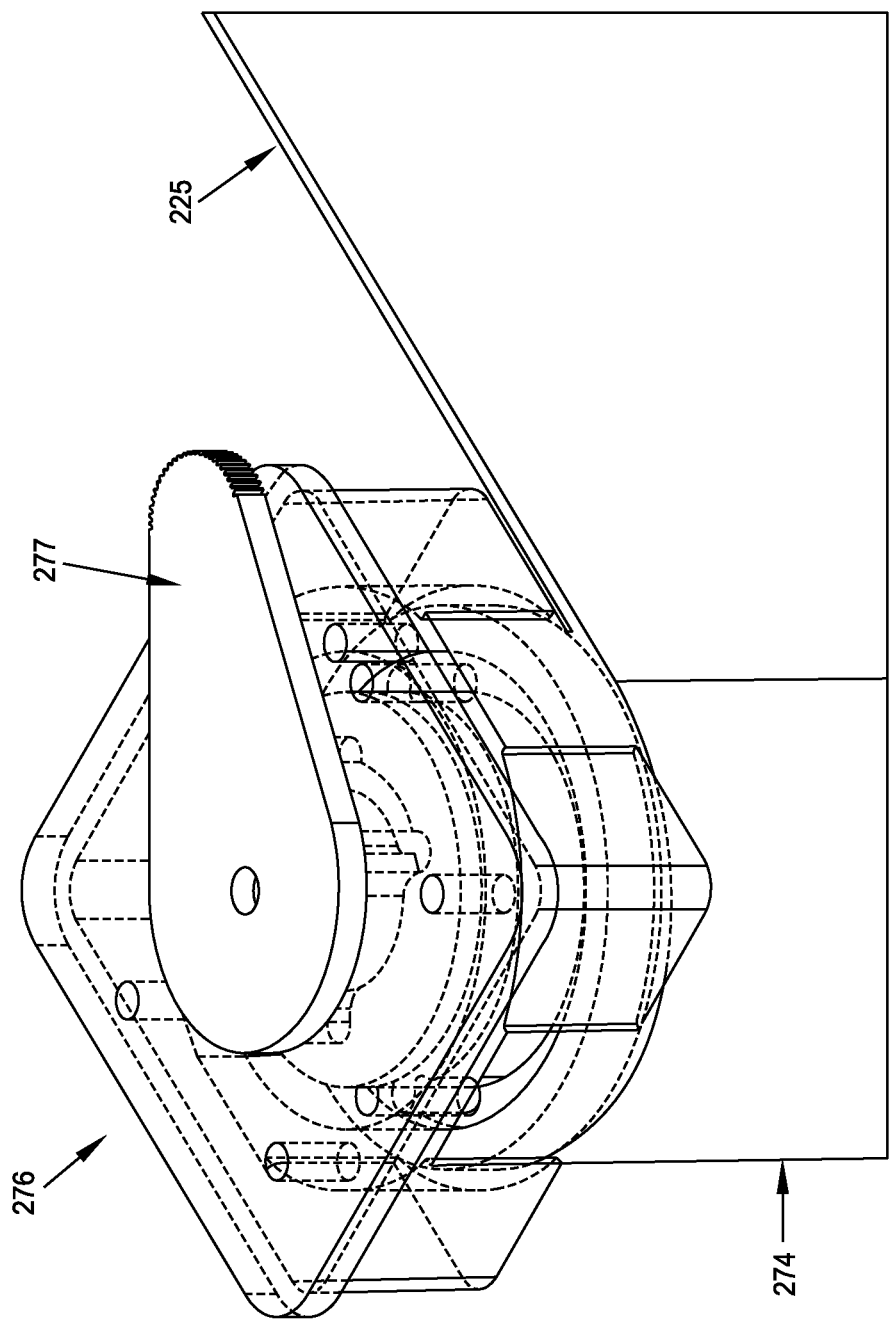
Figure 53:
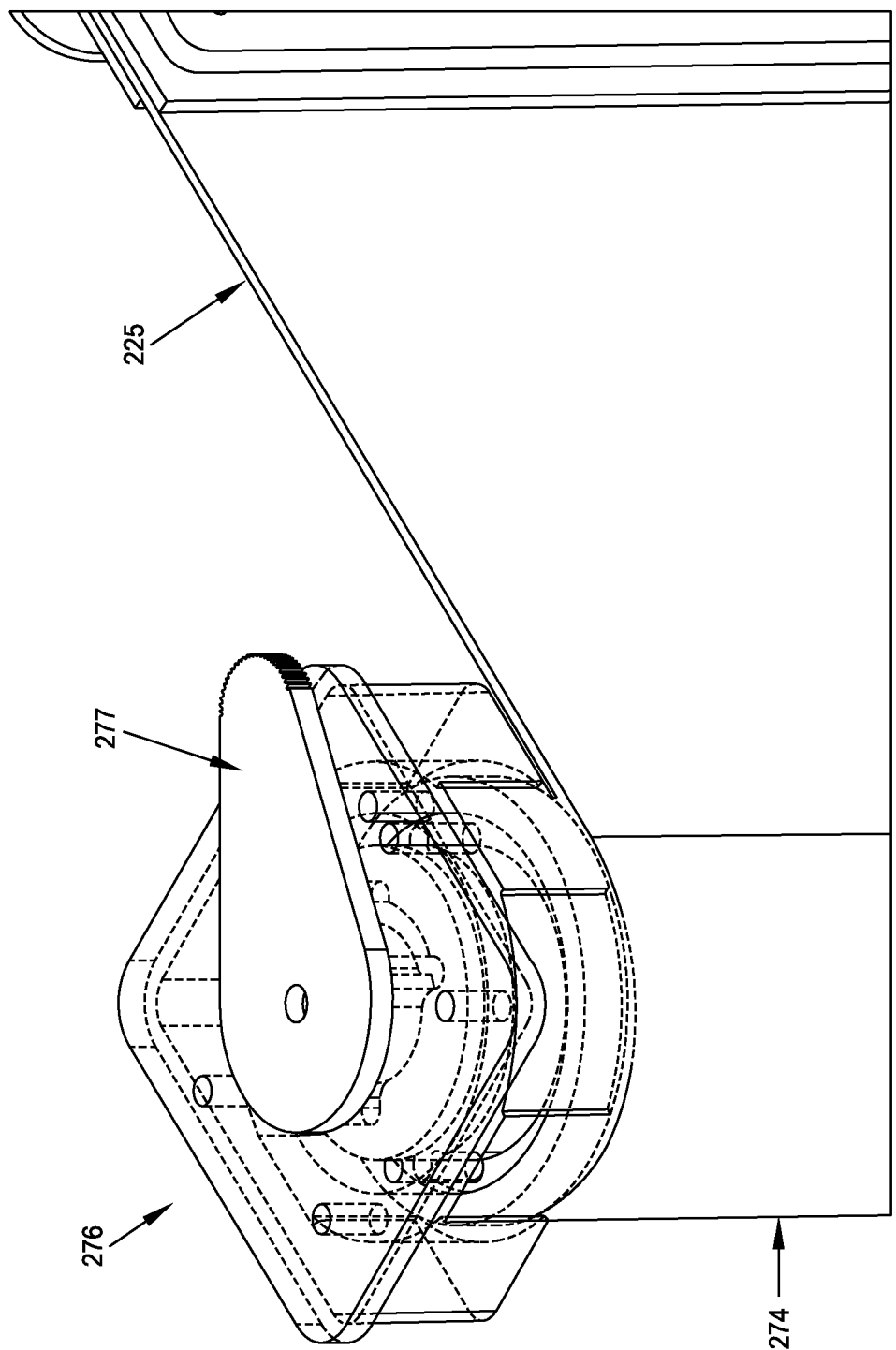
Figure 54:
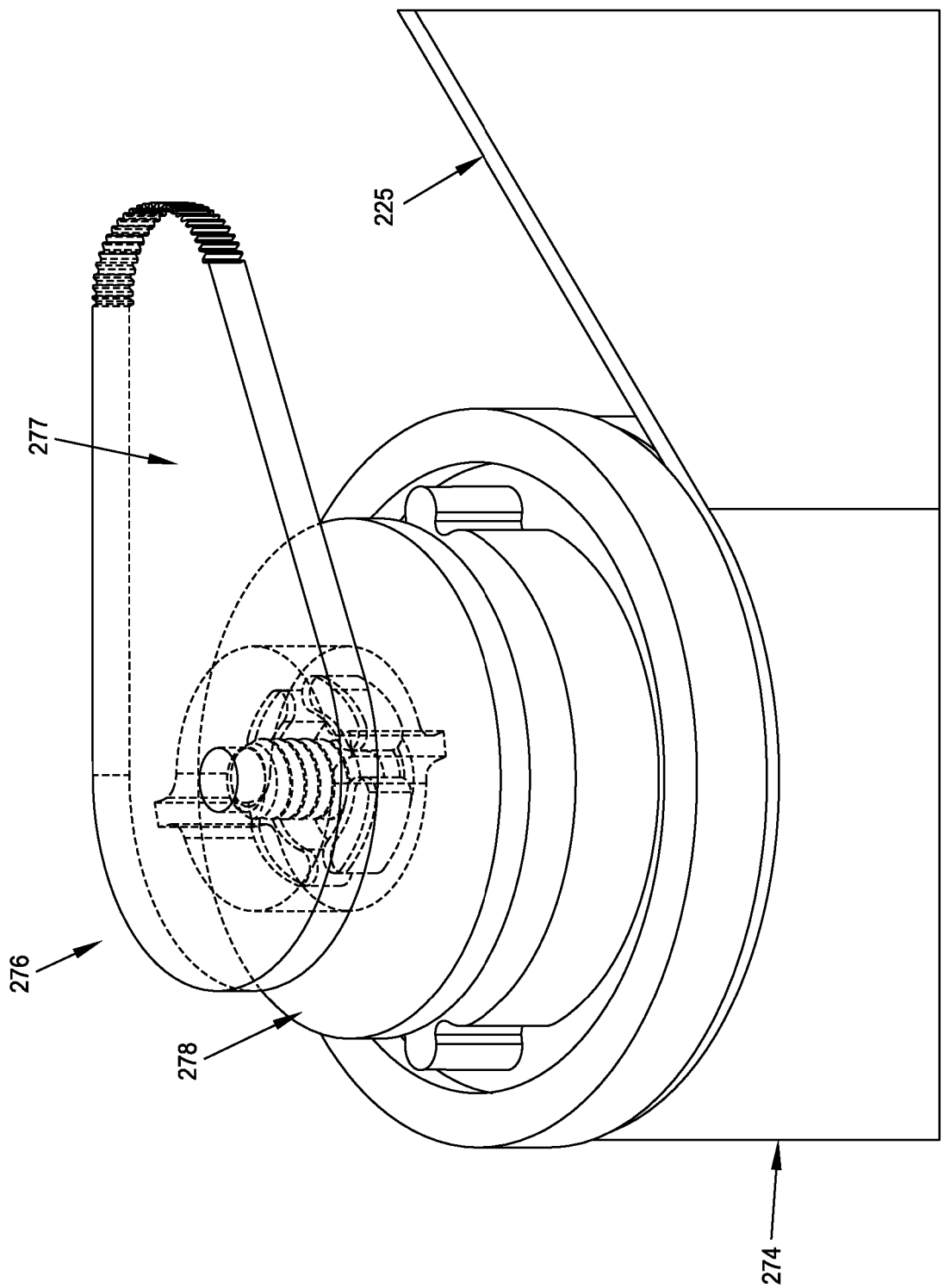
Figure 55:
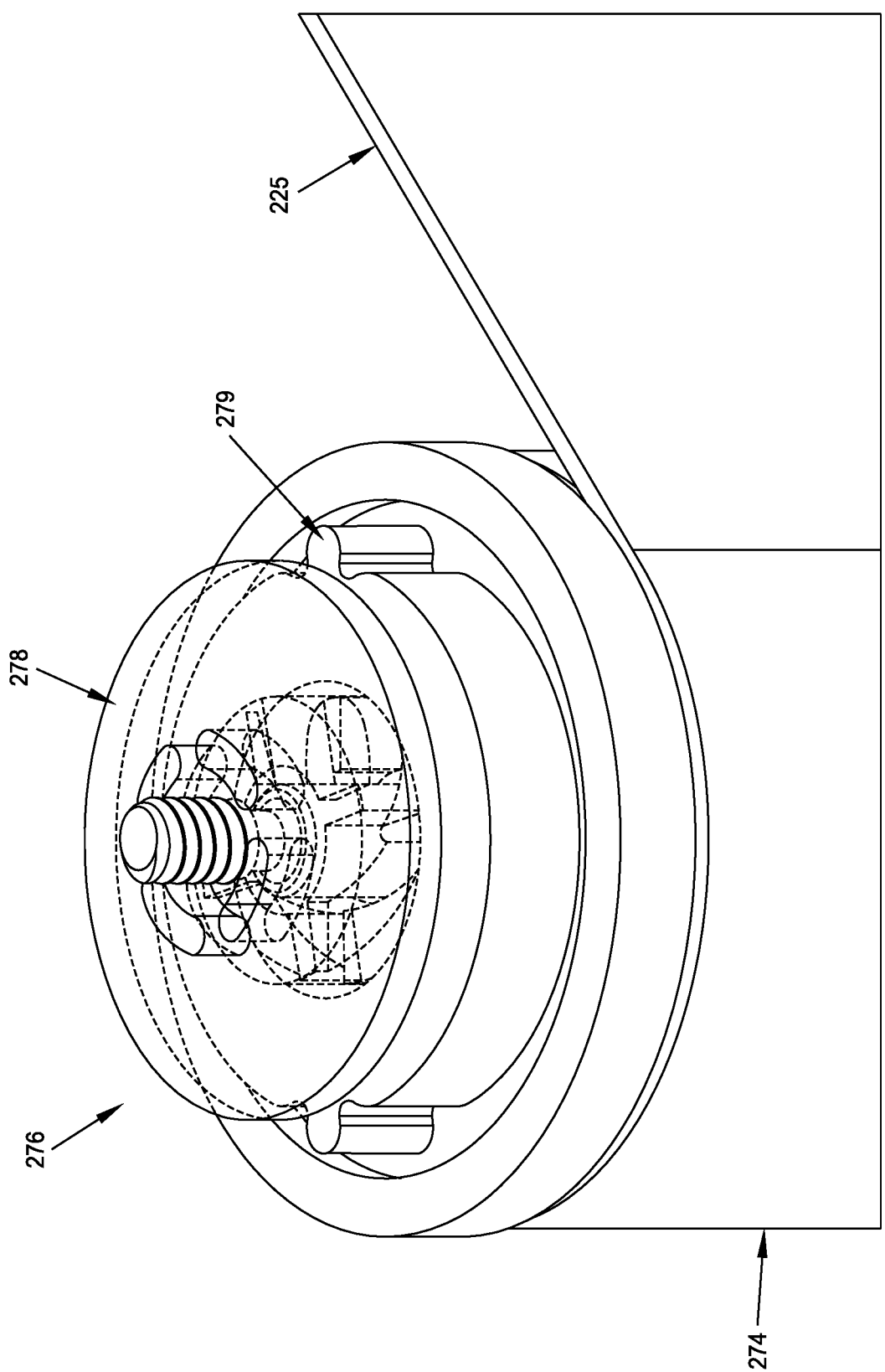
Figure 56:
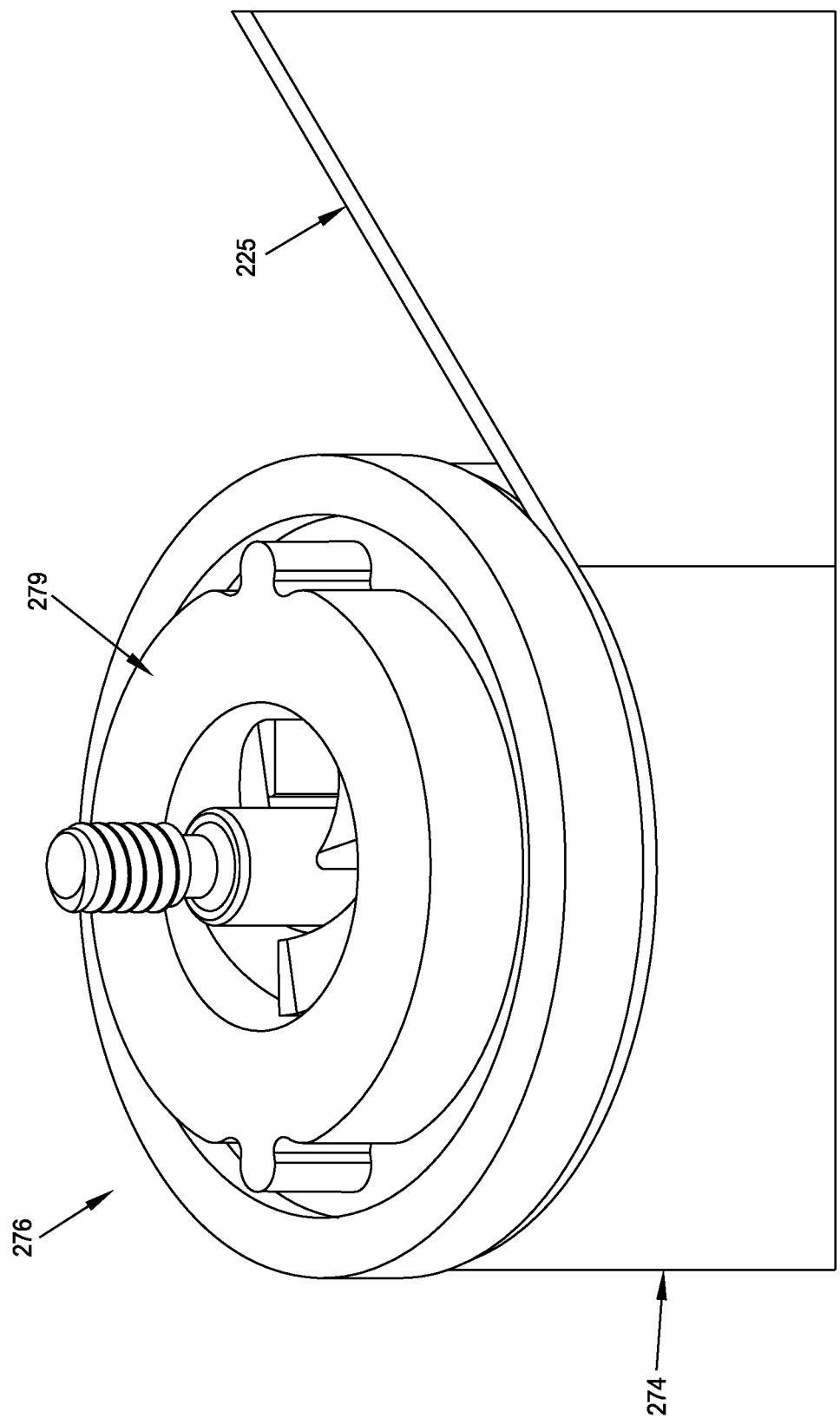
Figure 57:
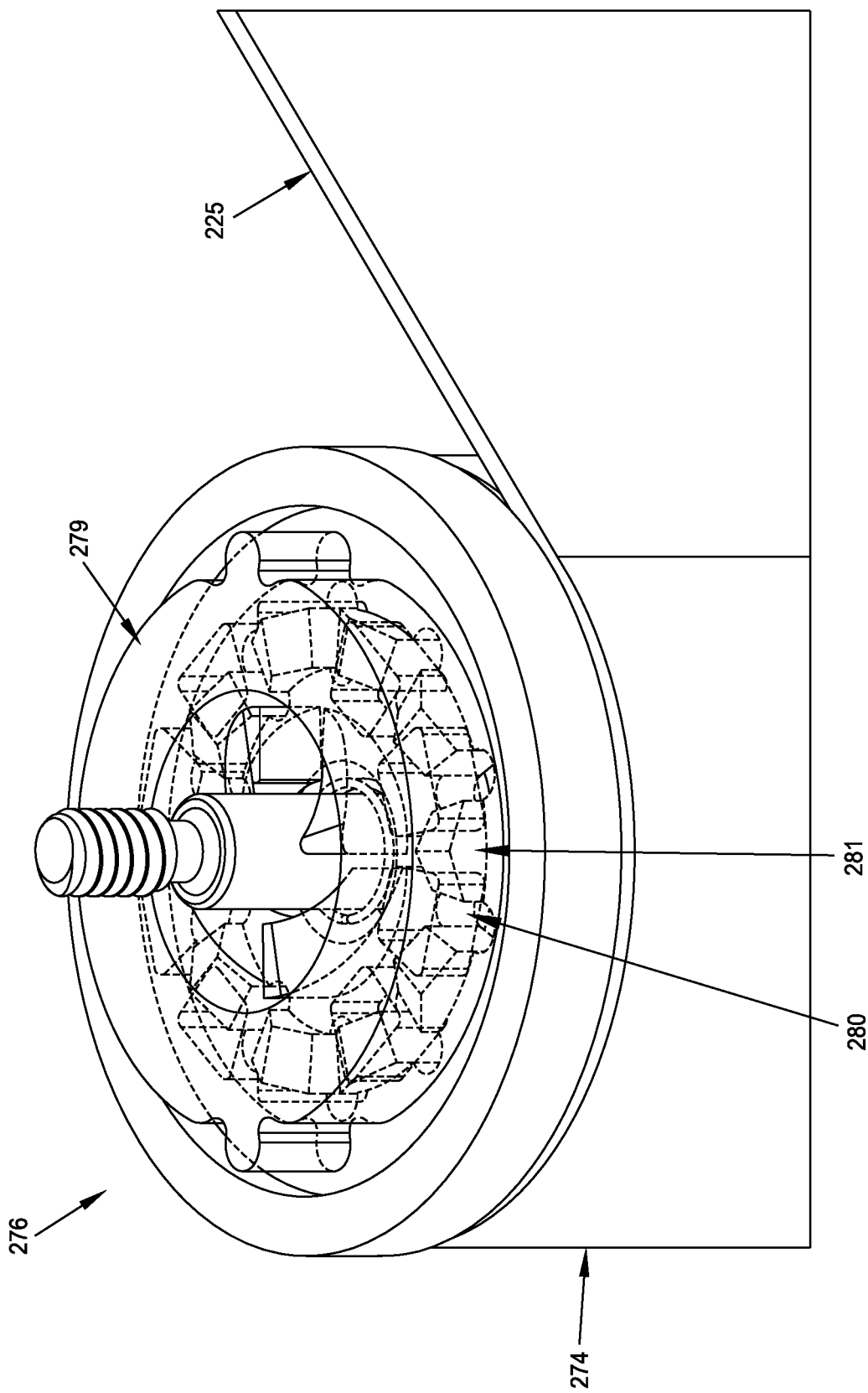
Figure 58:
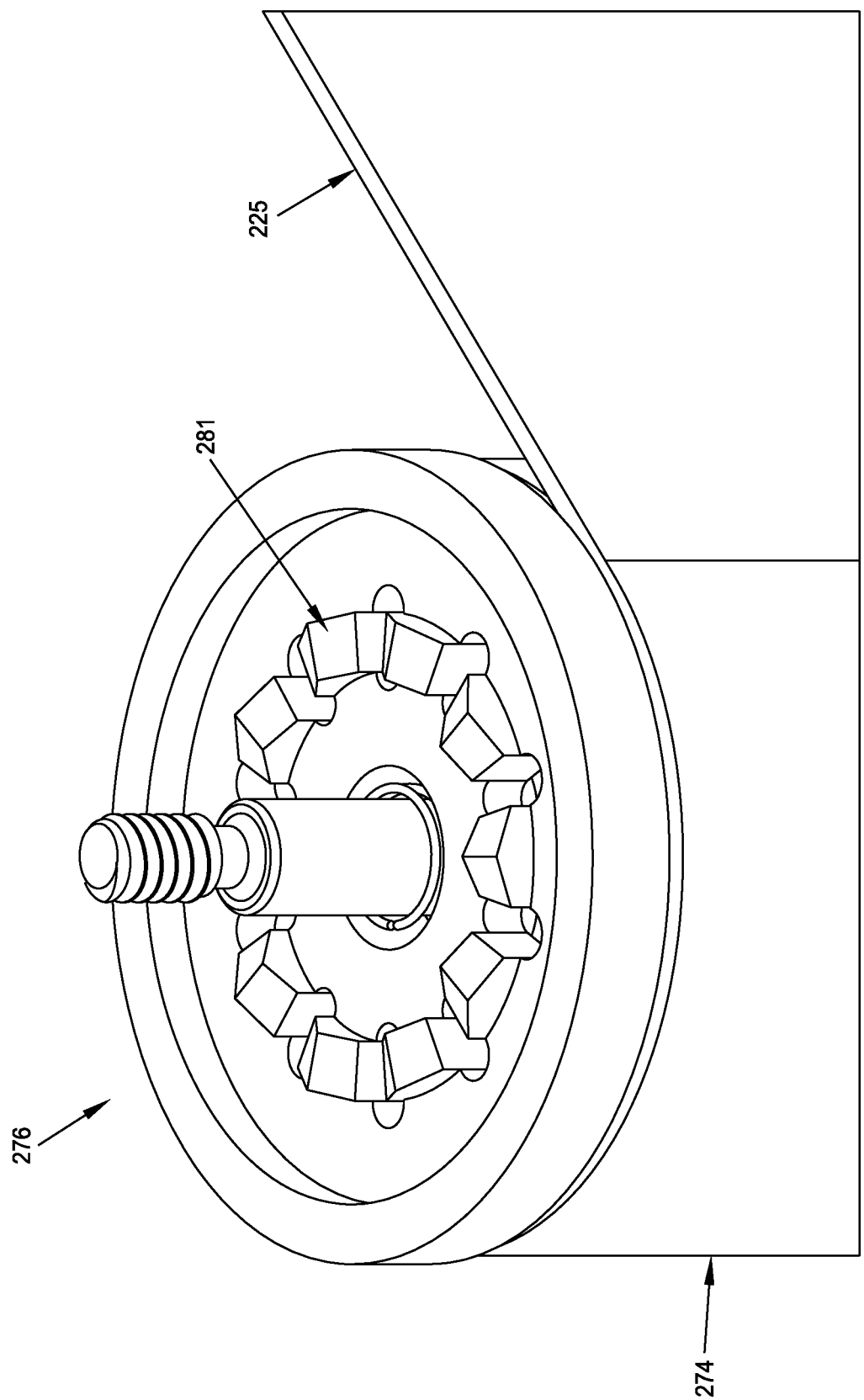
Figure 59:
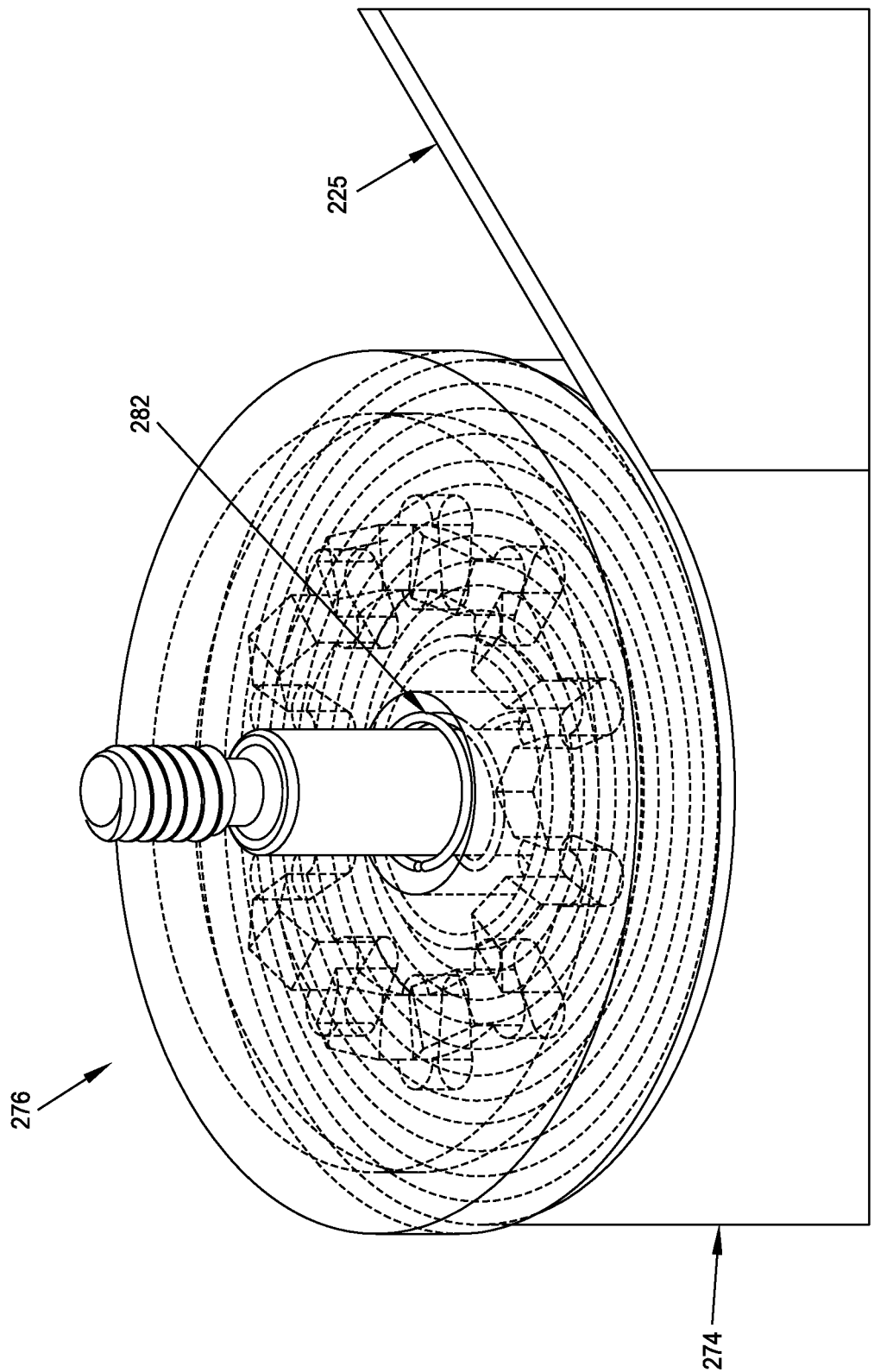
Figure 60:
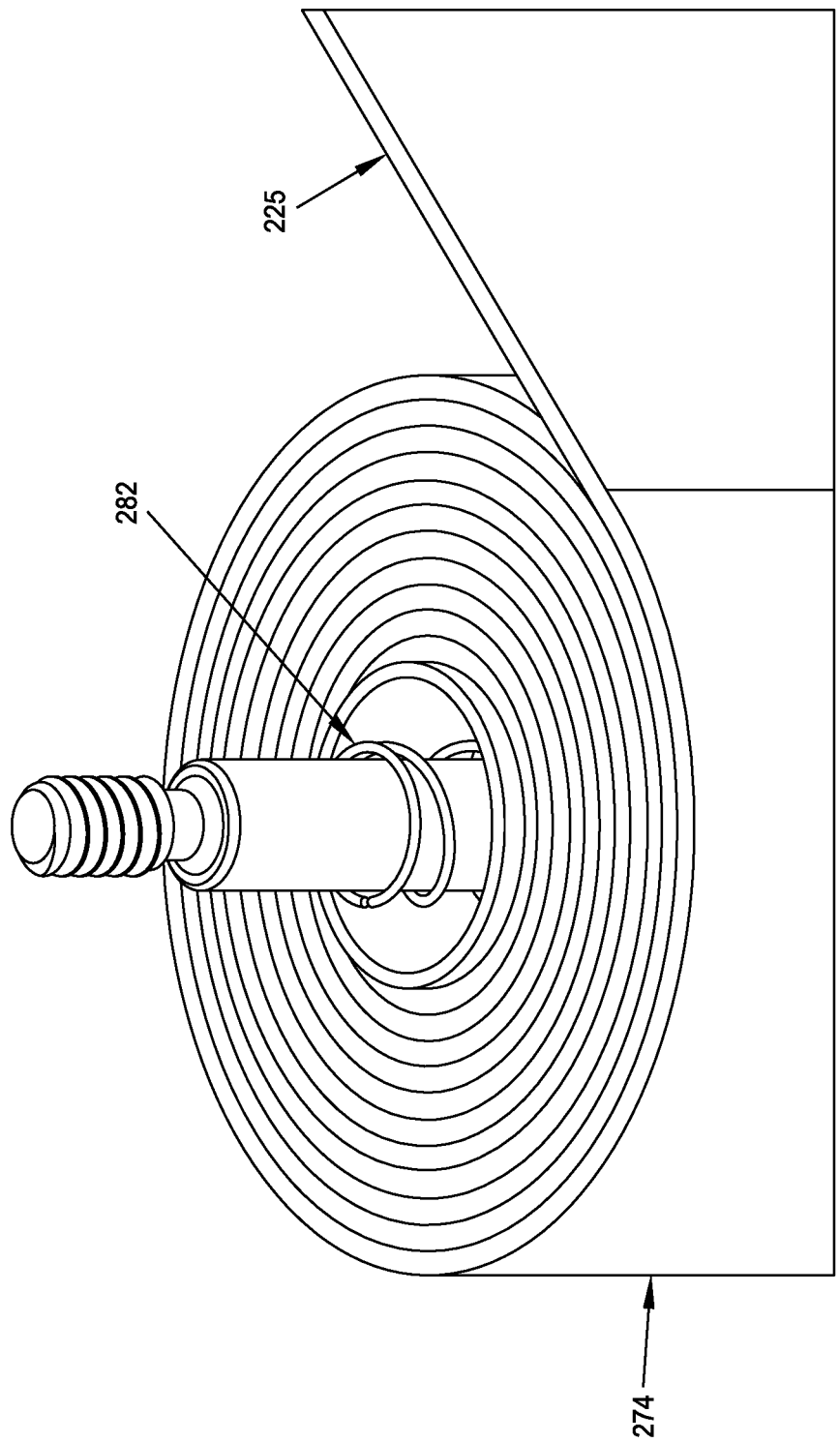
Figure 62:
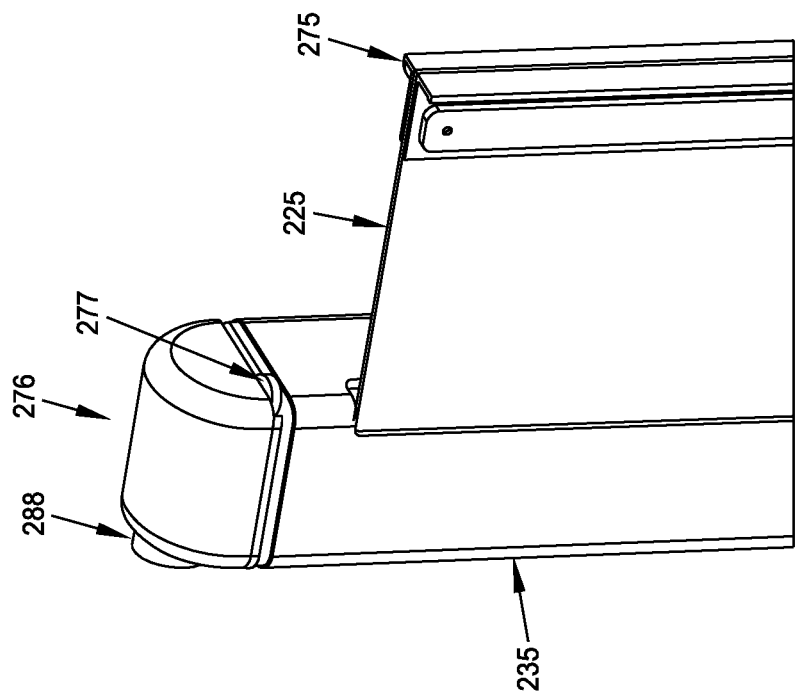
FIGS. 61-64 are schematic views showing adjustable bumpers which may be provided on the upper portions of the hinged arms of the collapsible frame of the safety gate of FIGS. 36-38.
Figure 61:
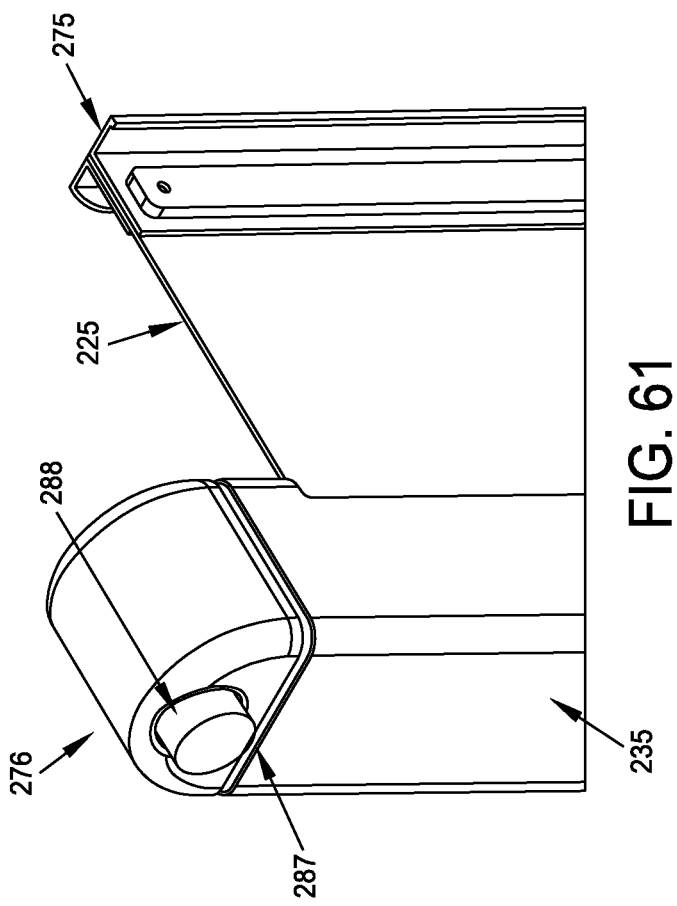
Figure 64:
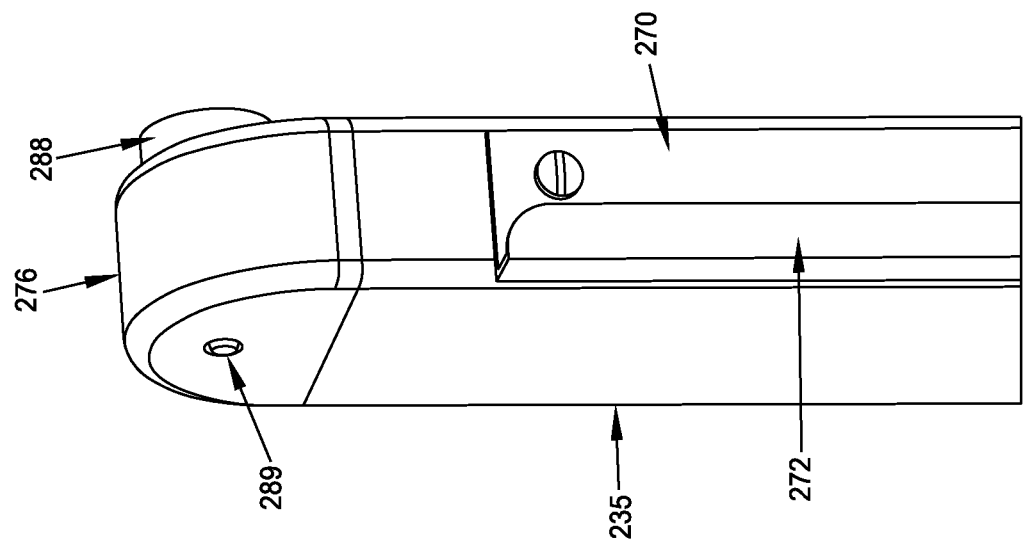
Figure 63:
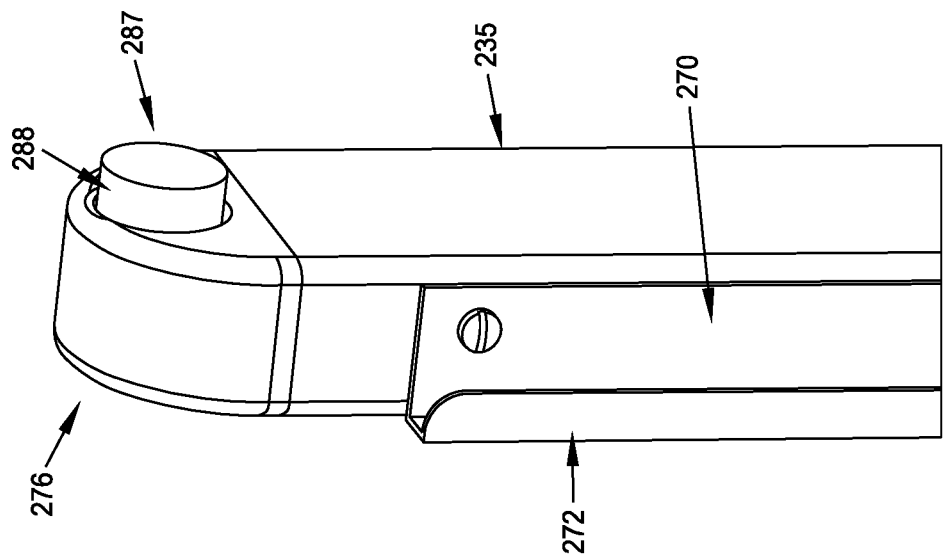
Figure 65:
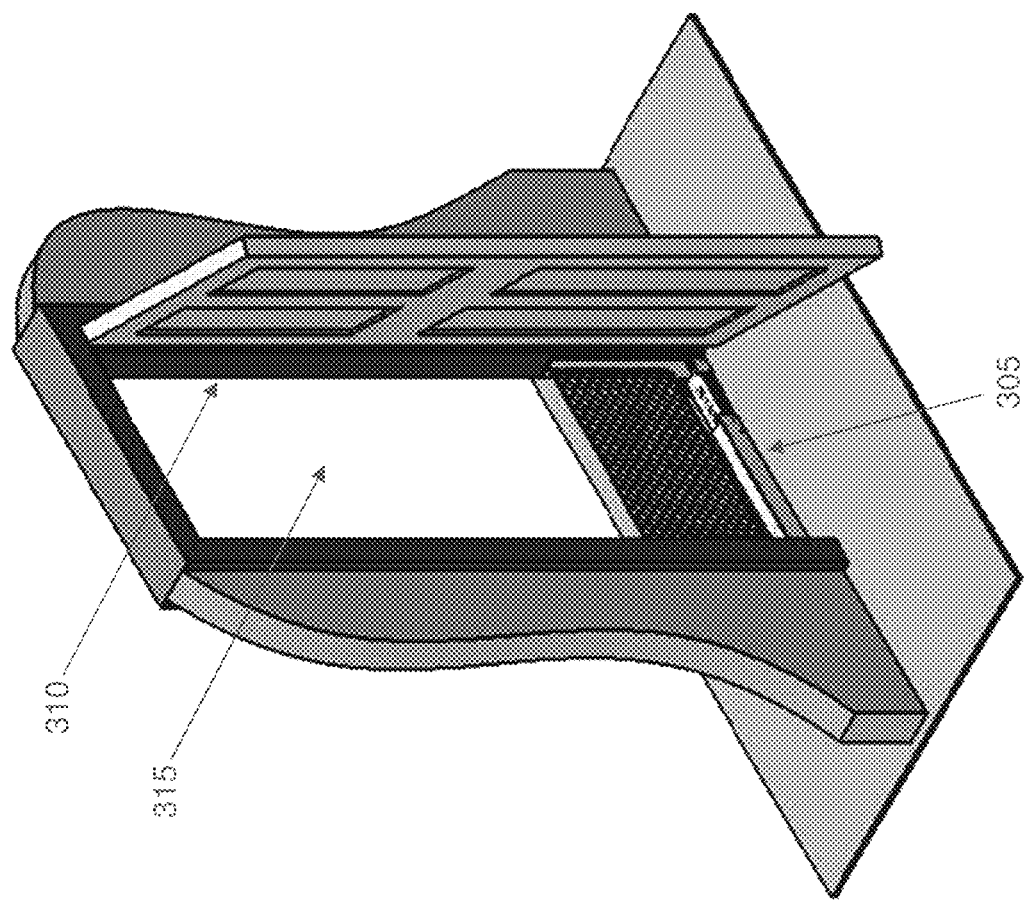
Figure 67:
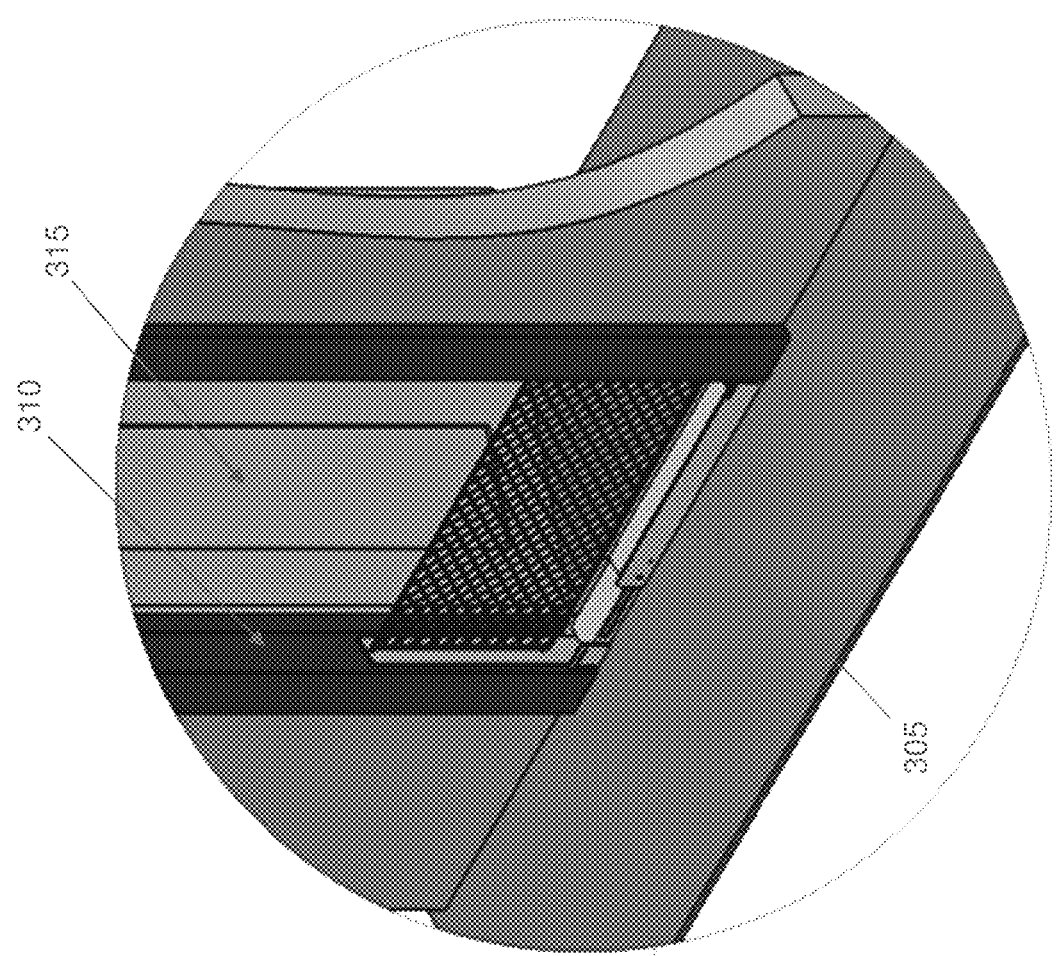
Figure 66:
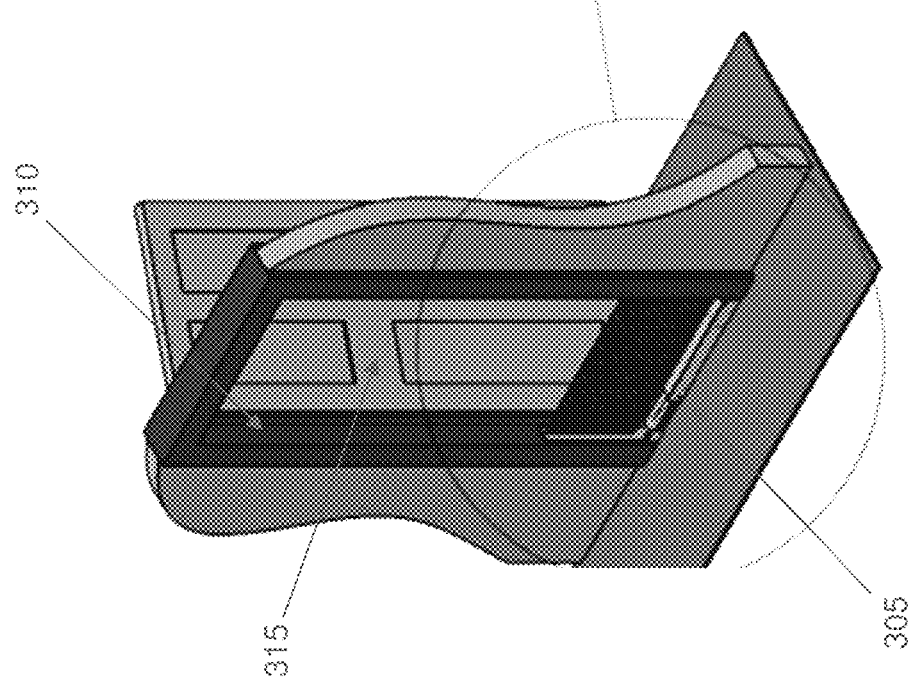

Looking now at FIGS. 44 and 45, hinged arms 235 pivot upwards from resting positions parallel to resizable base 230, pivoting on hinges 265 which are mounted to the ends of locking base members 240, 245. Hinges 265 each comprise two pins 266 which are fixed to the upper portion of each hinge 265, and a cavity 267 for receiving the end of each hinged arm 235. More particularly, pins 266 are received in a pair of diametrically-opposed slots 268 formed on the ends of each hinged arm 235 where each hinged arm 235 is mounted to a hinge 265. When hinged arms 235 are fully erect, they lock into place by sliding the ends of each hinged arm 235 on pins 266 (i.e., so that pins 266 run along slots 268 formed in each hinged arm 235) and so that the ends of each hinged arm are received in cavity 267 of each hinge 265. Hinged arms 235 can be released from their locked erect positions by pulling upwards on the hinged arms so that pins 266 ride along slots 268 and so that the ends of hinged arms 235 each exit cavity 267 of each hinge 265, and then folding the hinged arms back down on resizable base 230.

Note that when hinged arms 235 are in their erect positions, the hinged arms preferably yieldably angle outward slightly at their upper ends so as to ensure secure engagement of the hinged arms with the vertical walls of the doorway (or hallway or walkway). In other words, hinged arms 235 diverge outwardly as they extend away from resizable base 230, and hinged arms 235 are resilient so that they can be urged inwardly towards one another. In one preferred form of the invention, resizable base 230 and hinged arms 235 are substantially straight members, and the outward angling of hinged arms 235 is provided by setting the final disposition of hinged arms 235 with resizable base 230 at an angle slightly greater than 90 degrees. Additionally and/or alternatively, if desired, hinged arms 235 may have an outward arc along their length. Note that hinged arms 235 preferably comprise some flexibility, so that their outward flare can yield as necessary in order to establish a robust pressure fit with the vertical walls of the doorway (or other hallway or walkway).

Note also that one of the hinged arms 235 includes a fastener 270 to which flexible barrier 225 may be releasably secured. In a preferred form of the present invention, fastener 270 comprises a hook-shaped clasp 272 which extends along substantially the entire length of one of the hinged arms 235. See FIG. 46. Clasp 272 is configured to receive and retain the free end of flexible barrier 225, as will hereinafter be discussed in further detail.

And note that resizable base 230 and hinged arms 235 may be folded up to a compact condition for easy transport and storage, i.e., with resizable base 230 reduced in size and with hinged arms 235 extending parallel to resizable base 230.

The Flexible Barrier

Flexible barrier 225 comprises a flexible material which is capable of preventing a pet or small child from passing by safety gate 205. By way of example but not limitation, flexible barrier 225 may comprise a woven mesh or screen which is preferably inelastic or nominally elastic.

In this form of the invention, and looking next at FIGS. 47-60, flexible barrier 225 is preferably stowed within one of the hinged arms 235 of collapsible frame 270 (i.e., the collapsible arm 235 opposite the collapsible arm to which fastener 270 is mounted) until needed.

More particularly, in this form of the invention, one of collapsible arms 235 comprises a cavity 273 having a spool 274 longitudinally disposed therein (i.e., parallel to the longitudinal axis of the collapsible arm 235). Spool 274 is preferably spring-biased so as to "take up" (and stow) flexible barrier 225 within the collapsible arm when desired (e.g., in a manner similar to how a window shade takes up the excess portion of the shade on a spring-biased spool). The free end of flexible barrier 225 comprises a clasp 275 for engagement with clasp 272 of collapsible arm 235. Note that the particular configurations of clasp 272 (on a hinged arm 235) and clasp 275 (on flexible barrier 225) may vary in type and location—the important thing is that the configurations of clasp 272 and clasp 275 be coordinated with one another so that clasp 272 and clasp 275 may selectively lock together or unlock from one another as needed.

In one form of the invention, flexible barrier 225 can be pulled out of spool 274 and remain under retractive tension as flexible barrier 225 is brought across to the opposing collapsible arm 235 and is releasably secured to clasp 272 of that collapsible arm 235.

In another form of the invention, a lock mechanism can be provided to lock spool 274 against movement when flexible barrier 225 has been brought across to the opposing collapsible arm 235 and has been releasably secured to clasp 272 of that collapsible arm 235. More particularly, in this form of the invention, a lock mechanism 276 is preferably disposed on the free end of the collapsible arm 235 which houses locking spool 274 for selectively locking spool 274 in a locked condition.

In one preferred form of the invention, lock mechanism 276 comprises a lever 277 mounted to a rotatable cam 278 which cams against a locking plate 279 mounted to the end of spool 274. Locking plate 279 has teeth 280 which can engage teeth 281 on spool 274. Locking plate 279 is normally spring-biased away from spool 274 by a spring 282, so that teeth 280 on locking plate 279 normally do not engage teeth 281 of spool 274 and spring-biased spool 274 is free to apply tension to flexible barrier 225. However, when lever 277 is rotated, cam 278 rotates, whereby to cam locking plate 279 downward (i.e., perpendicular to the axis of rotation of lever 277) and thereby cause teeth 280 (on locking plate 279) to engage teeth 281 (of spool 274), whereby to lock spool 274 against rotation. When lever 277 is rotated in the opposite direction, cam 278 disengages locking plate 279, thereby allowing locking plate 279 to move upward (i.e., under the power of a spring), whereby to allow spool 274 to rotate (i.e., to retract flexible barrier 225).

Note that it is generally preferred to provide a lock mechanism (e.g., the lock mechanism 276 discussed above) for spool 274, since this will prevent pets and small children from leaning against flexible barrier 225 and pulling a greater length of the flexible barrier off spool 274—in the absence of such a lock mechanism, the spring bias on spool 274 must be set fairly high in order to prevent a pet or small child from pulling more of the flexible barrier off spool 274. Such a high spring bias could impede normal deployment of flexible barrier 225 from spool 274.

Flexible barrier 225 is attached to collapsible frame 220 after collapsible frame 220 has been set in the doorway (or hallway or walkway), with resizable base 230 appropriately sized and locked in position, and with hinged arms 235 locked in their upright position. Flexible barrier 225 is then erected between the two hinged arms 235, with flexible barrier 225 being releasably secured to fastener 270 on the opposing hinged arm 235. More particularly, flexible barrier 225 is attached to collapsible frame 220 such that flexible barrier 225 extends across the opening between hinged arms 235 by pulling flexible barrier 225 out of spool 274 and across the gap between collapsible arms 235, and then releasably connecting clasp 275 of flexible barrier 225 with clasp 272 of the opposing collapsible arm 235. In other words, in this form of the invention, flexible barrier 225 of safety gate 225 is effectively spooled out of one hinged arm 235 on collapsible frame 220 until the appropriate length of flexible barrier 225 has been dispensed.

Use of Safety Gate 205

Safety gate 205 may be used by pet owners and parents of small children to prevent pets and small children from passing through an opening and into restricted areas.

More particularly, safety gate 205 can be erected in a desired opening by setting up collapsible frame 220 in the opening so that the collapsible frame makes a pressure fit against an adjoining architectural structure, and then extending flexible barrier 225 between the two hinged arms 235 of collapsible frame 225 (i.e., by manually drawing flexible barrier 225 across to the opposing side of collapsible frame 220).

In one preferred method of use, collapsible frame 220 has its two hinged arms 235 set in their erect positions, with the upper ends of the two arms yieldably diverging from one another. Resizable base 230 is then set in opening 215, latch mechanism 250 is set in its "disengaged" position so that base members 240, 245 are free to move relative to one another, and then base members 240, 245 are telescoped apart so that the outer ends of base members 240, 245 securely engage doorframe 210, and so that the two hinged arms 235 securely engage doorframe 210. As this occurs, the two hinged arms 235 press outwardly against doorframe 210, with the two hinged arms yielding as needed, so as to ensure that collapsible frame 220 makes a secure, binding fit with doorframe 210 (i.e., so that collapsible frame 220 makes a pressure fit against doorframe 210). Then latch mechanism 250 is set in its "engaged" position so that base members 240, 245 are locked against movement relative to one another. Then lever 277 on lock mechanism 276 is unlocked, flexible barrier 225 is drawn along the length of resizable base 230, and flexible barrier 225 is secured to the opposing hinged arm 235 (e.g., via clasps 275 and 272). Then lever 277 on lock mechanism 276 is locked.

To allow an adult to pass through the gate, a person can unlock lever 277 on lock mechanism 276, and unhook flexible barrier 225 from the opposing hinged arm, whereupon the flexible barrier will automatically retract onto spring-biased spool 274. When the person has passed through the opening, they will re-extend the flexible barrier back to the opposing hinged arm, secure the flexible barrier to the opposing hinged arm via clasps 275 and 272, and re-engage lock mechanism 276 on the spool arm.

When safety gate 205 is no longer needed in that location, the safety gate may be taken down and folded up to a manageable size for easy transportation and storage.

More particularly, in one preferred method of disassembly, lock mechanism 276 on the spool arm is released, flexible barrier 225 is detached from the opposing hinged arm 235, and flexible barrier 225 is retracted into the spool arm. Then latch mechanism 250 is released and base members 240, 245 are telescoped inward, preferably to the most minimal distance. As base members 240, 245 telescope inwardly, the force securing the two hinged arms 235 against the adjoining architectural structure is disengaged (i.e., the pressure fit of collapsible frame 220 against the doorframe is released). When the base members 240, 245 are preferably at their most minimal distance, latch mechanism 250 is then re-engaged so that base members 240, 245 are locked relative to one another (this effectively prevents base members 240, 245 from being able to telescope outwardly when the safety gate is being collapsed and/or thereafter being moved). Once latch mechanism 250 has been re-engaged to lock base members 240, 245 in position relative to one another, hinged arms 235 are pulled upward, and then folded down parallel to base members 240, 245. With safety gate 205 in its collapsed condition, the safety gate may then be easily transported and stored.

Thus it will be seen that the present invention provides a self-contained safety gate 205 which is (i) collapsible to a linear configuration which is easily transported and stored, and (ii) erectable to a substantially U-shaped configuration which is pressure-mounted against the surfaces of an adjoining architectural structure, with the pressure-mounted safety gate being locked in place against the adjoining architectural structure until the latch mechanism in the resizable base is released.

Gate Bumper (Bolsters)

In one preferred form of the invention, and looking now at FIGS. 61-64, adjustable bumpers (bolsters) 287 may be provided on the outside surfaces of the upper ends of hinged arms 235. As a result, when collapsible frame 220 is set in position against adjoining architectural surfaces, adjustable bumpers 287 engage the wall, doorway, surface, etc. that the hinged arms 235 abut against. Adjustable bumpers 287 provide an additional means for ensuring that collapsible frame 220 makes a pressure fit against adjacent architectural surfaces, particularly when the adjacent architectural surfaces do not have a uniform vertical surface (e.g., such as when a wall has base boards, etc.).

In one preferred form of the invention, adjustable bumpers 287 comprise rubber cylinders 288 which are mounted to threaded shafts 289 which extend into hinged arms 235. As a result of this construction, the extent to which adjustable bumpers 287 project out of hinged arms 235 can be adjusted by turning rubber cylinders 288 on their threaded shafts 289.

It should also be appreciated that, if desired, bumpers 287 can be fixed in position relative to hinged arms 235.

It should also be appreciated that, if desired, adjustable bumpers 287 may be provided on the aforementioned hinged arms 35 of safety gate 5.

Advantages of the Safety Gate with Flexible Barrier Spooled on Collapsible Frame The present invention provides numerous advantages over prior art safety gates. For one thing, the present invention provides a flexible safety gate which is pressure-mounted to adjacent architectural structures, thus enabling the safety gate to be temporary in nature. And the present invention provides the ability to pass through the safety gate by unlatching one end of the flexible barrier from a hinged arm while a person passes through the safety gate. Also, the present invention provides a safety gate which has a flexible horizontal top "crossbar" instead of a rigid horizontal top "crossbar". Furthermore, the present invention provides a self-contained safety gate that is easily stowed and transported.

"Smart" Safety Gate and/or Universal Safety Gate Monitoring System

The present invention also provides a novel "smart" safety gate and/or a universal gate safety monitoring system for retrofit to existing safety gates.

More particularly, as discussed above, pet owners and/or parents use safety gates to temporarily restrict the movement of pets and/or young children from one area to another area, e.g., from one room to another room. However, pet owners and/or parents are not always in direct sight of the safety gates. This poses a potential problem—if the safety gate is improperly installed, or becomes dislodged, or is not closed, or if excessive force is being placed on the safety gate, etc., the pets and/or young children may gain access to the area they were intended to be restricted from, e.g., a potentially dangerous area. Unfortunately, conventional safety gates are not equipped with means for detecting when the safety gate is improperly installed, or becomes dislodged, or is not closed, or when excessive force is being placed on the safety gate, etc. and for alerting the parents and/or pet owners when this potentially dangerous condition exists.

Therefore, in accordance with the present invention, there is also provided a new and improved "smart" safety gate which includes a monitoring system (which may comprise, but is not limited to, a pressure sensor, and/or a tension sensor, and/or a motion sensor, and/or a contact sensor, etc.) for determining when the safety gate is properly installed and closed, and/or when the safety gate is improperly installed and/or becomes dislodged, and/or when the safety gate is not closed, and/or when excessive force is being placed on the safety gate, and an electronic interface that aggregates data on the state of the safety gate and wirelessly communicates that data to "smart" devices (e.g., a smartphone, a smartwatch, a tablet, a computer, a television, etc.) which may be seen by pet owners and/or parents.

Furthermore, and also in accordance with the present invention, there is provided a universal gate safety monitoring system for retrofit to existing safety gates to provide pet owners and/or parents with vital, real-time information regarding significant changes to the state of the safety gate. This universal gate safety monitoring system also comprises a monitoring system for determining when the safety gate is properly installed and closed, and/or when the safety gate is improperly installed and/or becomes dislodged and/or when the safety gate is not closed, and/or when excessive force is being placed on the safety gate, and also includes an electronic interface that aggregates data on the state of the safety gate and wirelessly communicates that data to smart devices (e.g., a smartphone, a smartwatch, a tablet, a computer, a television, etc.) which may be seen by pet owners and/or parents.

Looking first at FIGS. 65-68, there is shown a "smart" safety gate 305 erected in a doorframe 310 so as to close off the lower portion of the doorway 315. In these images, "smart" safety gate 305 is shown fully installed so as to prevent a pet or small child from passing through the doorway.

Figure 69:
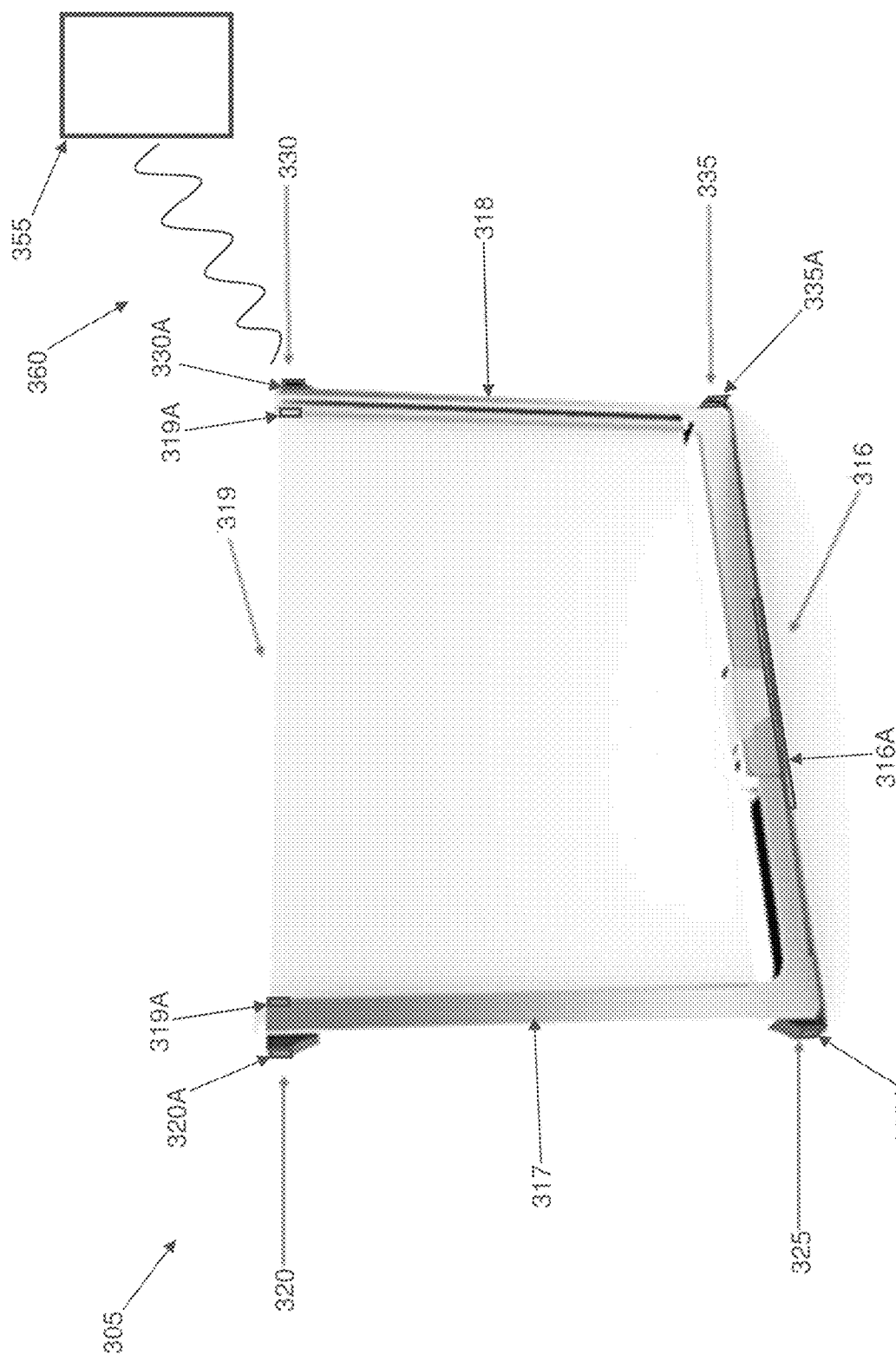

Looking next at FIG. 69, "smart" safety gate 305 generally comprises a base 316, a pair of upstanding, outwardly inclined arms 317, 318, and a deployable cross-member 319 for selectively closing off the region between base 316 and arms 317, 318. In one preferred form of the invention, base 316 and outwardly inclined arms 317, 318 are substantially straight members, and the outward angling of outwardly inclined arms 317, 318 is provided by setting the final disposition of outwardly inclined arms 317, 318 with base 316 at an angle slightly greater than 90 degrees. Additionally and/or alternatively, if desired, outwardly inclined arms 317, 318 may have an outward arc along their length. Note that outwardly inclined arms 317, 318 preferably comprise some flexibility, so that their outward flare can yield as necessary in order to establish a robust pressure fit with the vertical walls of the doorway (or other hallway or walkway). "Smart" safety gate 305 also comprises bumpers 320, 325, 330 and 335. The four bumpers 320, 325, 330 and 335, base 316 and cross-member 319 constitute the "touchpoints" of "smart" safety gate 305 to the surrounding building structure (or, in the case of cross-member 319, the "touchpoints" with the other components of "smart" safety gate 305). These six touchpoints comprise sensors 320A, 325A, 330A, 335A, 316A and 319A which monitor conditions at the six touchpoints (e.g., pressure, tension, motion, etc.), and hence monitor changes to the state of the gate (e.g., whether the safety gate is properly installed and closed, and/or whether the safety gate is improperly installed and/or becomes dislodged, and/or when the safety gate is not closed, and/or when excessive force is being placed on the safety gate, etc.).

In one preferred form of the invention, sensors 320A, 325A, 330A and 335A comprise bumper sensors which monitor pressure (i.e., the pressure exerted by the bumper against doorframe 310); sensor 316A comprises base sensors which monitor pressure (i.e., the pressure exerted by the base against the floor); and sensors 319A comprise tension sensors which monitor tension (i.e., the tension on cross-member 319). Sensors 320A, 325A, 330A, 335A, 316A and 319A preferably also comprise accelerometers of the sort well known in the art of motion sensing so as to also enable these sensors to detect any movement of bumpers 320, 325, 330 and 335, or any movement of base 316, and/or any movement of cross-member 319. It should be appreciated that sensors 320A, 325A, 330A, 335A, 316A and 319A, and/or any other sensors used with "smart" safety gate 305 (and/or with the universal gate safety monitoring system for retrofit to existing safety gates), may comprise various mechanical, electrical, electro-mechanical, optical, opto-electrical, etc. components of the sort well known in the art of sensing. It should be noted that any portion of "smart" safety gate 305 could possess a sensor, however, the six touchpoints identified above (i.e., bumpers 320, 325, 330 and 335, base 316 and cross-member 319) provide a simple and reliable way to monitor the status of the safety gate. These sensors monitor changes in the status of the gate and relay that information (via a wireless communication system 350, e.g., Bluetooth, Wi-Fi, etc.) to a "smart" device 355 (e.g., a smartphone, a smartwatch, a tablet, a computer, a television, etc.) which may be seen by pet owners and/or parents. If there is a change in the status of any of the sensors, wireless communication system 350 sends an immediate alert to the connected smart device 355. It will be appreciated that wireless communication system 350 comprises wireless communication units 320B, 325B, 330B, 335B, 316B and 319B for transmitting data from sensors 320A, 325A, 330A, 335A, 316A and 319A, respectively, to smart device 355. Note that wireless communication system 350 may send the alert, and smart device 355 may receive the alert, as a text message, or as an E-mail, or as an alert displayed by an "app" running on the smart device, or as a notification displayed by the smart device operating system, etc.

Thus it will be seen that the "smart" safety gate comprises a plurality of sensors and a data transmitting system. The sensors are configured to detect a change in the status of the safety gate, and the transmitting system receives data from the sensors and relays that data wirelessly to a "smart" device of a pet owner and/or parent (e.g., a smartphone, a smart watch, a tablet, a computer, a television, etc.). When there is a change in the status of the smart gate, the sensors detect the change and relay that information to the transmitting system which, in turn, relays an alert to the smart device of the pet owner and/or parent. The pet owner and/or parent then receives the alert and is able to check on the safety gate.

Figure 70:
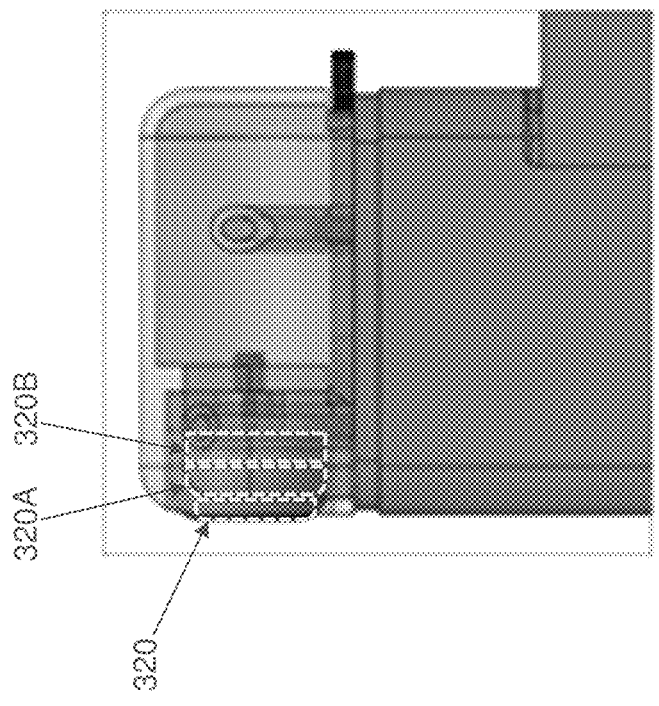
Figure 71:
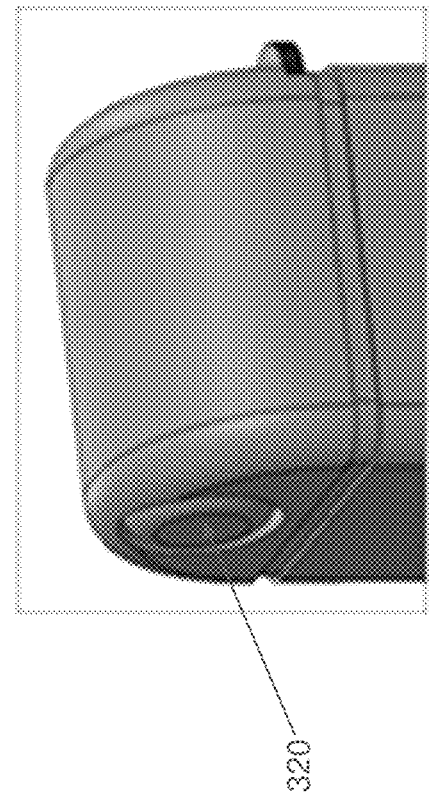

FIGS. 70 and 71 show a close-up of bumper 320, its associated sensor 320A and its associated wireless communication unit 320B.

Figure 72:
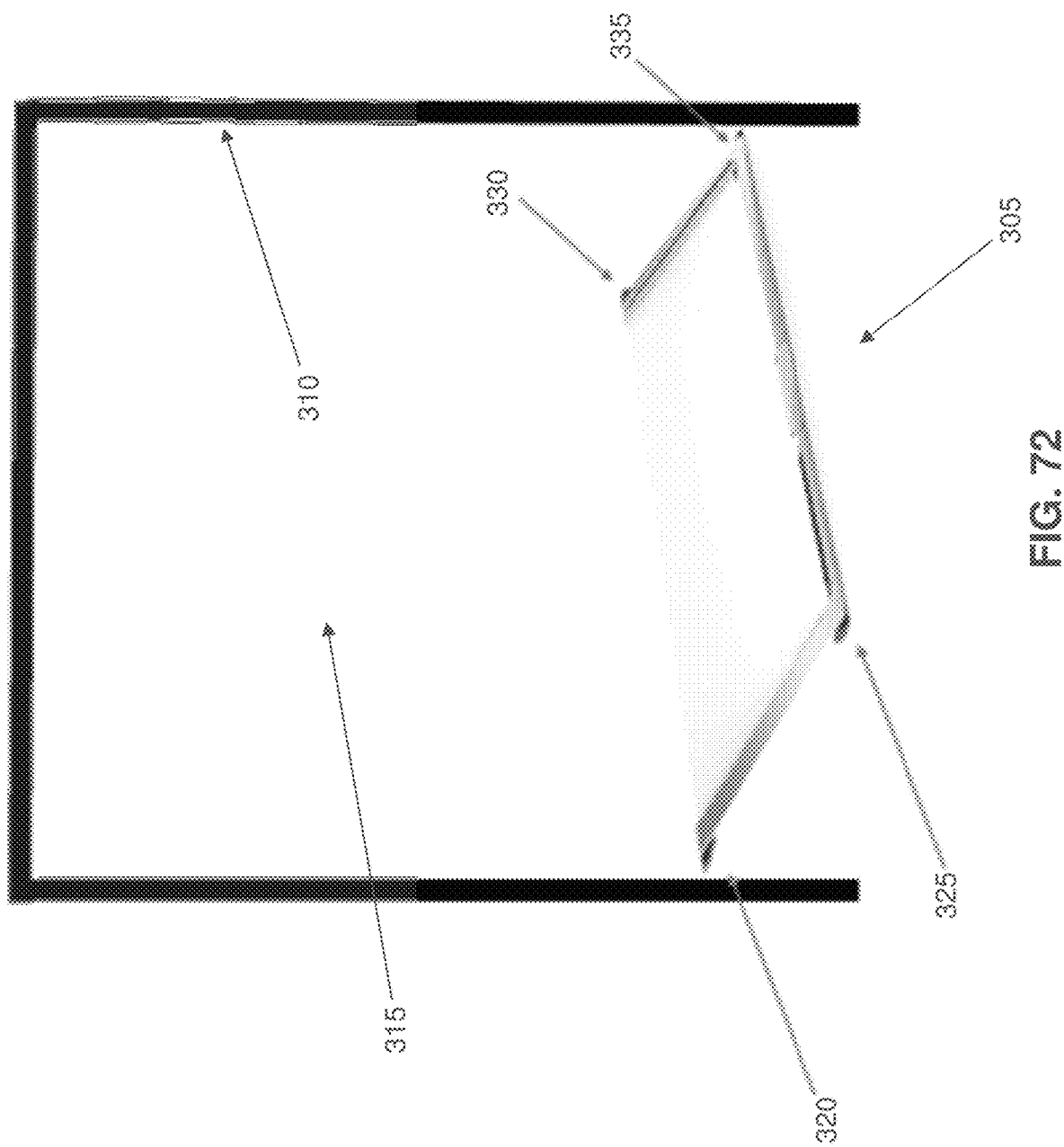

FIG. 72 shows a "smart" safety gate 305 in doorway 315, where the "smart" safety gate has become dislodged. When any one of the sensors 320A, 325A, 330A, 335A, 316A and 319A detects a change in the status of the safety gate, the associated wireless communication units 320B, 325B, 330B, 335B, 316B and 319B transmit an alert to the connected smart device 355.

By way of example but not limitation, where sensors 320A, 325A, 330A, 335A, 316A comprise pressure sensors and when "smart" safety gate becomes dislodged from the doorframe 310 within which it is disposed (e.g., in the manner shown in FIG. 72), sensors 320A, 325A, 330A, 335A, 316A will report that "smart" safety gate 305 is no longer in direct contact with doorframe 310 and/or the floor, and wireless communication system 350 will transmit an alert to the connected smart device 355.

By way of further example but not limitation, where sensors 320A, 325A, 330A, 335A, 316A and 319A comprise accelerometer sensors and when "smart" safety gate becomes dislodged from the doorframe 310 within which it is disposed (e.g., in the manner shown in FIG. 72), sensors 320A, 325A, 330A, 335A, 316A and 319A will report that "smart" safety gate 305 has moved, and wireless communication system 350 will transmit an alert to the connected smart device 355.

By way of still further example but not limitation, where sensors 319A comprise tension sensors and where a force exceeding a pre-determined threshold is exerted against cross-member 319 of "smart" safety gate 305, sensors 319A will sense the excessive force on cross-member 319 and wireless communication system 350 will transmit an alert to the connected smart device 355.

Note that, if desired, "smart" safety gate 305 may utilize the construction features of the aforementioned safety gate 5, the aforementioned safety gate 205 or the pressure-fit safety gate with non-folding arms 405 discussed below.

Figure 73:
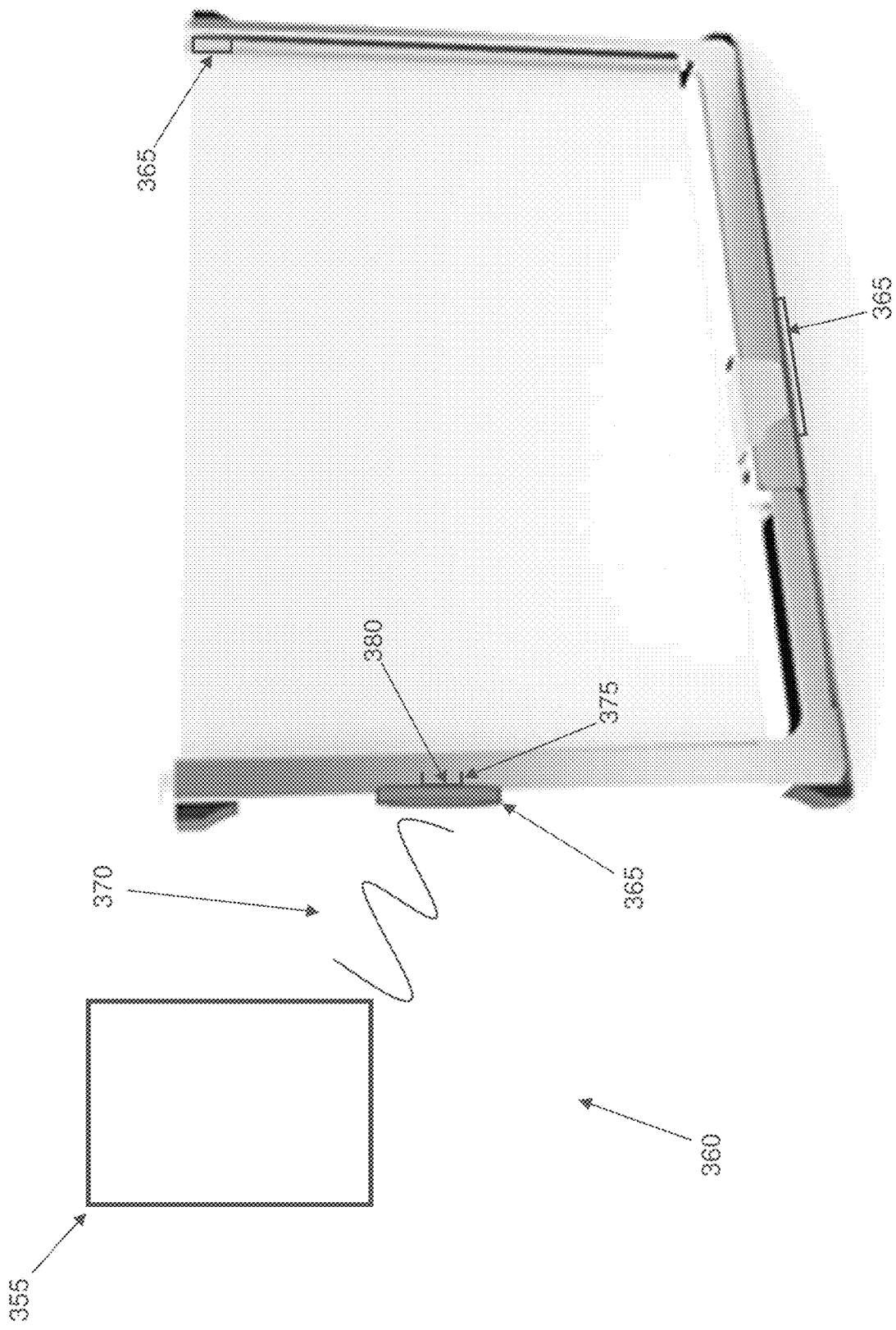
FIGS. 73 and 74 are schematic views showing a universal gate safety monitoring system for retrofit to existing safety gates to provide pet owners and/or parents with vital, real-time information regarding significant changes to the state of the safety gate, and wherein the universal gate safety monitoring system also includes a monitoring system for determining when the safety gate is properly installed and closed, and/or when the safety gate is improperly installed and/or becomes dislodged, and/or when the safety gate is not closed, and/or when excessive force is being placed on the safety gate, and also includes an electronic interface that aggregates data on the state of the safety gate and wirelessly communicates that data to "smart" devices (e.g., a smartphone, a smartwatch, a tablet, a computer, a television, etc.) which may be seen by pet owners and/or parents.

"Smart" safety gate 305 (where sensors 320, 325, 330, 335, 316, 319 are factory-installed on the safety gate) constitutes one preferred form of the invention. However, in another form of the invention, and looking now at FIG. 73, a universal gate safety monitoring system 360 is provided for retrofit to existing safety gates to provide pet owners and/or parents with vital, real-time information regarding significant changes to the status of the safety gate. In this respect it should be appreciated that universal gate safety monitoring system 360 may also be used to retrofit substantially any safety gate, e.g., conventional safety gates, the aforementioned safety gate 5 and/or the aforementioned safety gate 205.

Universal gate safety monitoring system 360 also comprises one or more sensors 365 for determining when the safety gate is properly installed and closed, and/or when the safety gate is improperly installed and/or becomes dislodged, and/or when the safety gate is not closed, and/or when excessive force is being placed on the safety gate, and an electronic interface 370 that aggregates the data on the state of the safety gate and wirelessly communicates that data to smart device 355. In one preferred form of the invention, sensors 365 comprise sensors which monitor conditions at selected touchpoints (e.g., pressure, motion, etc.) and include means 375 for mounting sensors 365 to the safety gate, e.g., an adhesive backing, a clamp, a mounting bracket, a screw mount, etc. By way of example but not limitation, sensors 375 may comprise pressure sensors for sensing contact with the surrounding doorframe 310 (or with the floor), tension sensors which measure tension on cross-member 319, accelerometers which measure movement of the safety gate or its components, etc. It will be appreciated that electronic interface 370 comprises wireless communication units 380 for transmitting data from sensors 365 to smart device 355.

Figure 74:
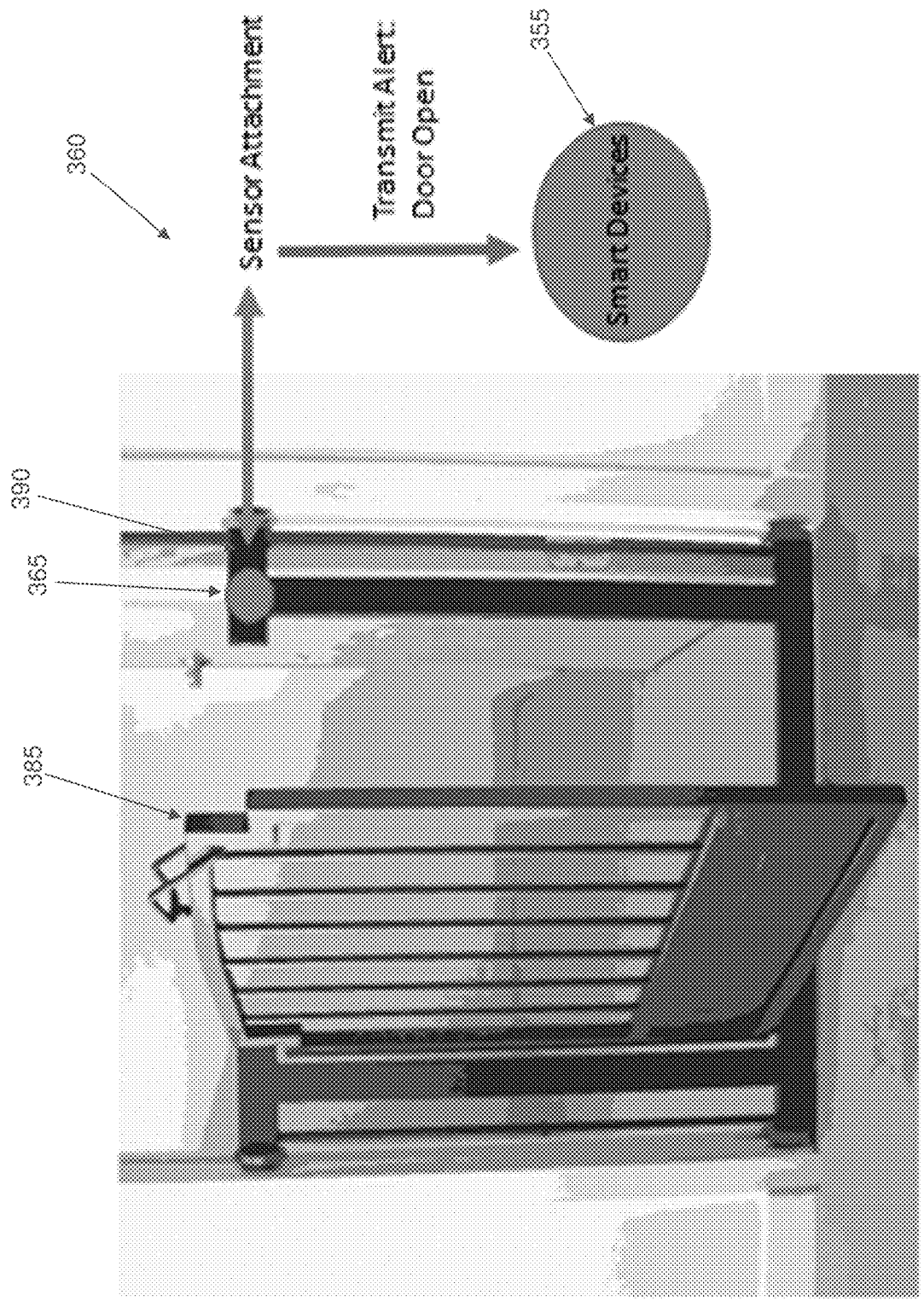

By way of further example but not limitation, and looking now at FIG. 74, there is shown a conventional safety gate with an open door which is monitored by a sensor 365: when the door 385 is open, the sensor sends an alert to the smart device 355. It will be appreciated that in this form of the invention, it may be desirable to form sensor 365 as a contact sensor for determining when door 385 is in contact with gate frame 390 (i.e., when the door of the safety gate is closed).

Pressure-Fit Safety Gate with Non-Folding Arms

The present invention also provides a novel pressure-fit safety gate with non-folding arms which may be positioned in an opening such as a doorway or hallway or walkway so as to close off the opening to pets and/or small children. The pressure-fit safety gate with non-folding arms generally comprises a U-shaped frame and a retractable flexible barrier. The U-shaped frame acts as a support structure for the flexible barrier, holding the flexible barrier as the barrier extends across the opening of the doorway or hallway or walkway. The U-shaped frame is designed to make a pressure fit against an adjoining architectural structure, and is designed to be reconfigured to a manageable size when not in use. The U-shaped frame generally comprises three separate components: a horizontal adjustable base member and two upright vertical arms. The flexible barrier is intended to be set across the U-shaped frame when the opening is to be closed off, and can be selectively detached from the U-shaped frame when an adult needs to pass through the opening. The pressure-fit safety gate with non-folding arms is intended to be temporary in nature and thus able to be in any doorway, walkway, etc.

It should be appreciated that, if desired, the pressure-fit safety gate with non-folding arms may utilize the aforementioned monitoring system of "smart" safety gate 305 (which may comprise, but is not limited to, a pressure sensor, and/or a tension sensor, and/or a motion sensor, and/or a contact sensor, etc.) for determining when the safety gate is properly installed and closed, and/or when the safety gate is improperly installed and/or becomes dislodged, and/or when the safety gate is not closed, and/or when excessive force is being placed on the safety gate, and an electronic interface that aggregates data on the state of the safety gate and wirelessly communicates that data to "smart" devices (e.g., a smartphone, a smartwatch, a tablet, a computer, a television, etc.) which may be seen by pet owners and/or parents.

The Pressure-Fit Safety Gate with Non-Folding Arms in General

The present invention comprises the provision and use of a novel pressure-fit safety gate with non-folding arms.

Figure 75:
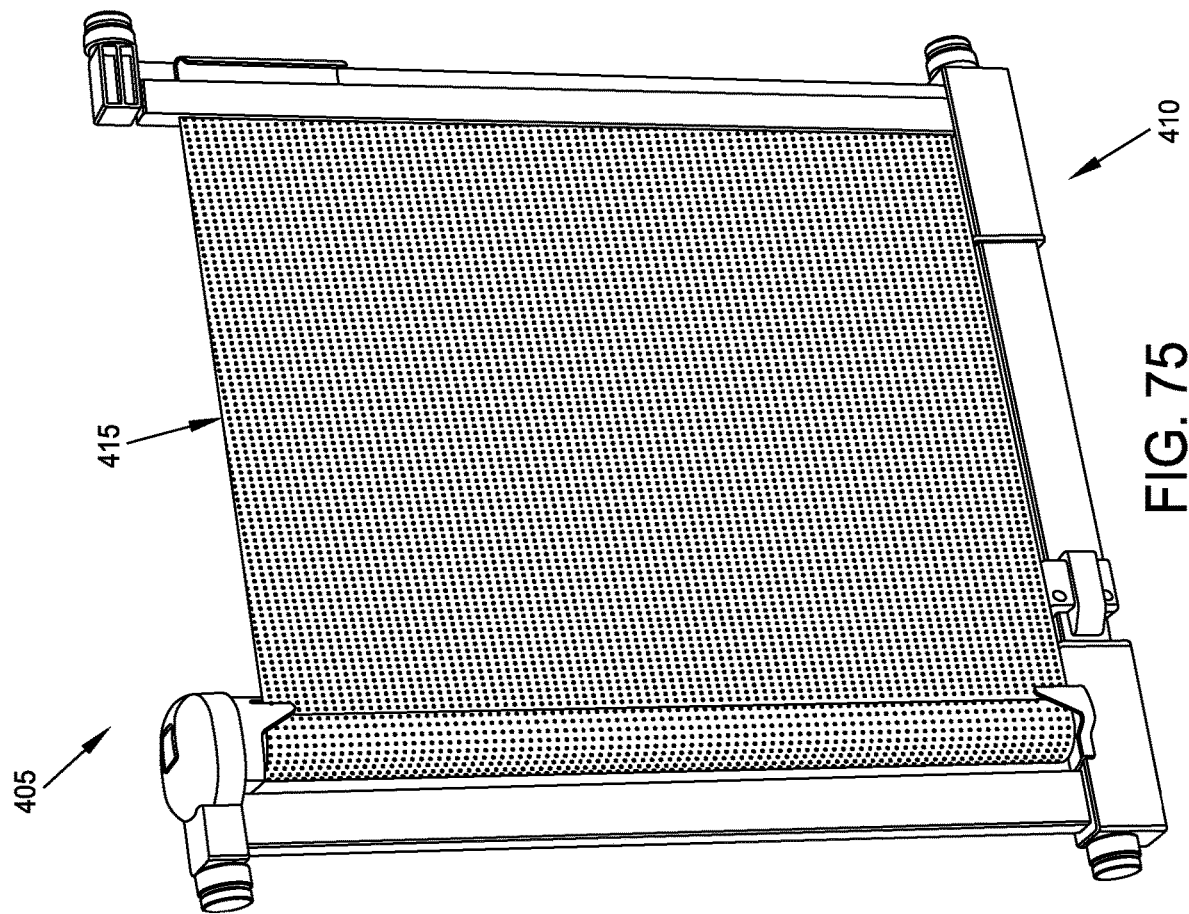
FIGS. 75-77 are schematic views showing a new and improved pressure-fit safety gate with non-folding arms formed in accordance with the present invention, wherein the pressure-fit safety gate with non-folding arms comprises a U-shaped frame and a retractable flexible barrier.
Figure 76:
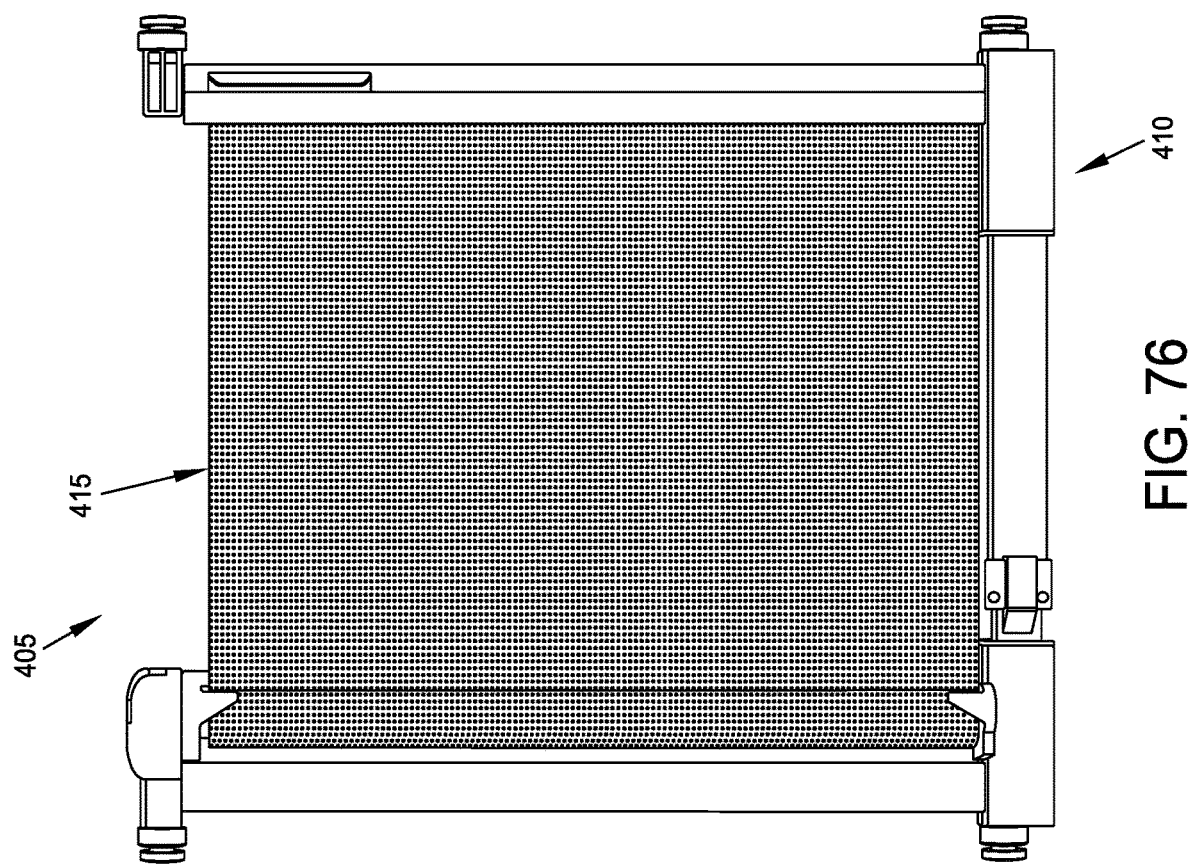
Figure 77:
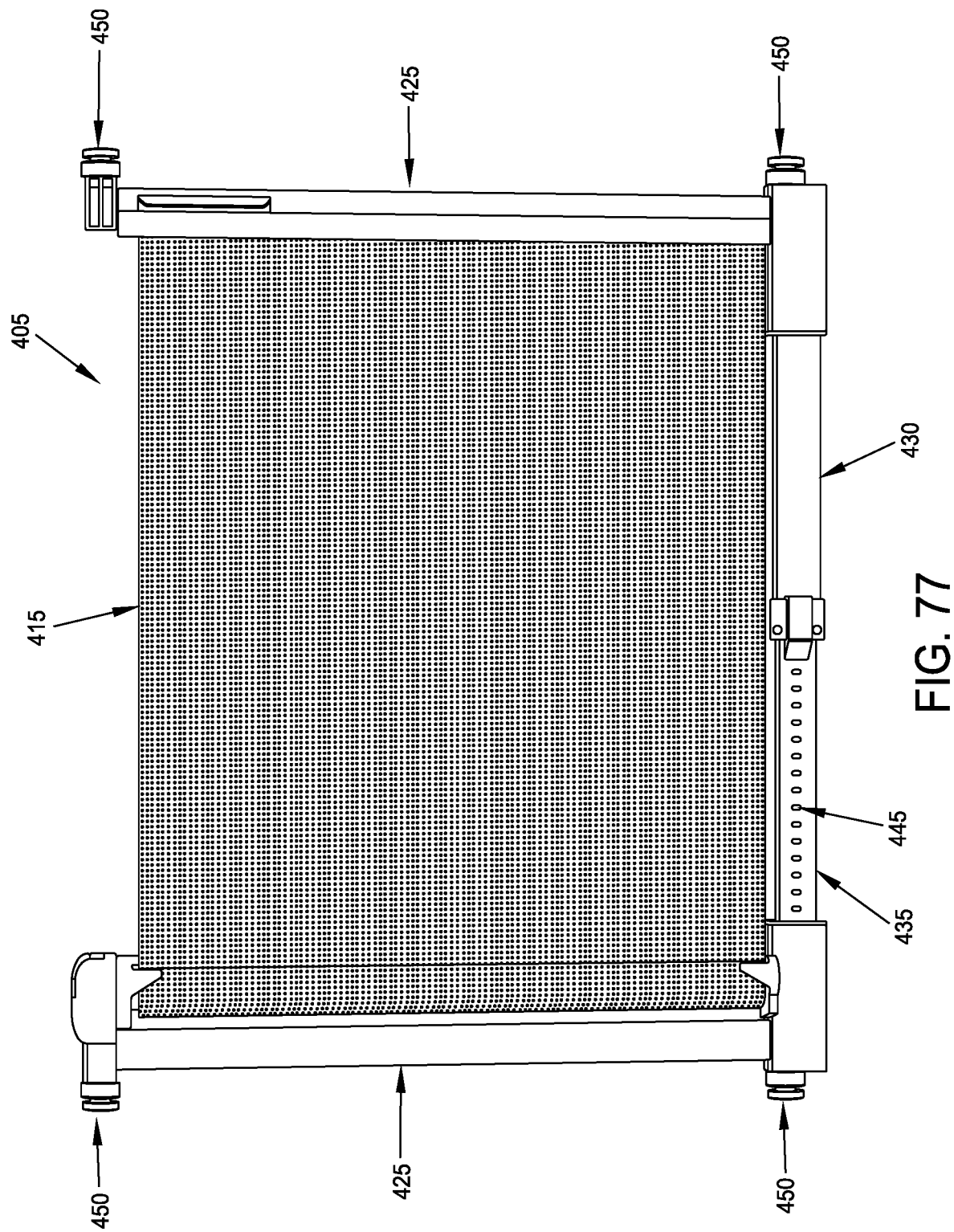

Looking first at FIGS. 75-77, there is shown one preferred construction of a novel pressure-fit safety gate with non-folding arms 405 formed in accordance with the present invention. Safety gate 405 generally comprises a U-shaped frame 410 and a retractable flexible barrier 415.

Looking next at FIGS. 78-83, U-shaped frame 410 comprises an adjustable horizontal base member 420 and a pair of upright vertical arms 425.

Adjustable horizontal base member 410 comprises two base members 430, 435 which are telescopically extendable relative to one another so as to accommodate an array of different doorway (or hallway or walkway) widths. Base members 430, 435 are able to slide freely in one direction (i.e., in an opening direction—outward) but are prevented from returning in the other direction (i.e., in a closing direction—inward) by a latch mechanism 440. Latch mechanism 440 is a hand operated device: for base members 430 and 435 to be telescoped together (inwardly), latch mechanism 440 must be opened so that the latch is free from connect holes 445 in base member 435.

Upright vertical arms 425 each have an L-shape and connect to adjustable horizontal base member 420 so as to form U-shaped frame 410. More particularly, upright vertical arms 425 each comprise a horizontal portion 425A and a vertical portion 425B, with horizontal portion 425A and vertical portion 425B being attached to one another so as to form a singular structure (e.g., horizontal portion 425A and vertical portion 425B may be formed out of separate members which are secured to one another so as to form the complete upright vertical arm 425, or horizontal portion 425A and vertical portion 425B may be formed out of a single integral member so as to form the complete upright vertical arm 425, etc.).

Upright vertical arms 425 are configured so that their upper ends canter outwardly relative to adjustable horizontal base member 420 (i.e., so that they form an angle of greater than 90 degrees relative to adjustable horizontal base member 420), whereby to ensure secure engagement of the arms with the vertical walls of the doorway (or hallway or walkway). In other words, upright vertical arms 425 flare outwardly relative to adjustable horizontal base member 420 so that when the lower portion of U-shape frame 410 securely engages the vertical walls of the doorway (or hallway or walkway), the upper ends of upright vertical arms 425 form a robust pressure fit with the vertical walls of the doorway (or hallway or walkway). In one preferred form of the invention, adjustable horizontal base member 420, and horizontal portions 425A and vertical portions 425B of upright vertical arms 425, are substantially straight members, and the outward angling of upright vertical arms 425 (i.e., the outward angling of vertical portions 425B of upright vertical arms 425) is provided by setting the final disposition of vertical portions 425B of upright vertical arms 425 at an angle of slightly greater than 90 degrees to adjustable horizontal base member 420. Note that this is preferably done by setting the vertical portions 425B of upright vertical arms 425 at an angle of slightly greater 90 degrees to the horizontal portions 425A of upright vertical arms 425. Additionally and/or alternatively, if desired, vertical portions 425B of upright vertical arms 425 may have an outward arc along their length. Note that upright vertical arms 425 preferably comprise some flexibility, so that their outward flare can yield as necessary in order to establish a robust pressure fit with the vertical walls of the doorway (or other hallway or walkway).

In one preferred form of the invention, upright vertical arms 425 are formed out of straight segments of steel (e.g., horizontal portion 425A and vertical portion 425B are formed as separate members having straight configurations and which are welded to one another so as to form the complete upright vertical arm 425). In one preferred form of the invention, horizontal portions 425A and vertical portions 425B are set at an angle of 90.5-95.0 degrees relative to one another so as to provide vertical portion 425B with an outward flare relative to horizontal portion 425A (and an outward flare relative to adjustable horizontal base member 420). It should be appreciated that upright vertical arms 425 may comprise materials other than steel, e.g., upright vertical arms 425 may be formed out of plastic. However, regardless of the material used to form upright vertical arms 425, it is preferred, as noted above, that upright vertical arms 425 comprise some flexibility, so that their outward flare can yield as necessary in order to establish a robust pressure fit with the vertical walls of the doorway (or other hallway or walkway).

Upright vertical arms 425 comprise four adjustable bumpers 450 to securably maintain a pressure fit contact with the wall (or doorframe, or passageway, etc.) to securely keep U-shaped frame 410 in place. Bumpers 450 create the pressure fit required to keep the safety gate in place, as will hereinafter be discussed in further detail.

One of the upright vertical arms 425 includes a fastening mechanism 455 to which flexible barrier 415 may be releasably secured. See FIG. 84. Fastening mechanism 455 is configured to receive and retain the free end of flexible barrier 415, as will hereinafter be discussed in further detail.

Additionally, one of the upright vertical arms 425 includes a spring-biased spool 460 for storing flexible barrier 415, and a lock 462 which engages/disengages the internal spring mechanism controlling flexible barrier 415, as will hereinafter be discussed in further detail below.

Figure 78:
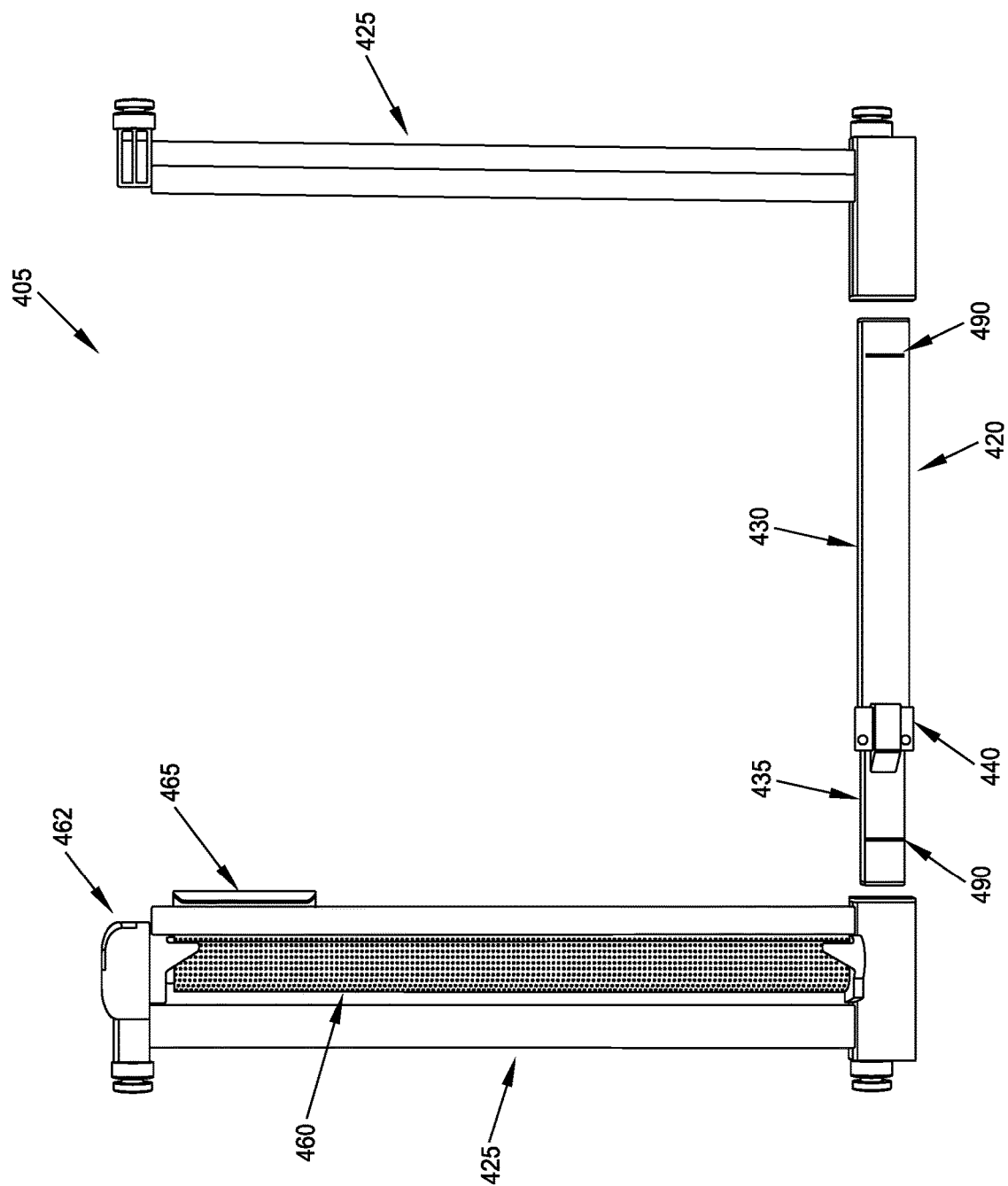
FIG. 78 is a schematic view showing the three separate components of the U-shaped frame of the pressure-fit safety gate with non-folding arms shown in FIG. 75.

Looking now at FIG. 78, there is shown an "extended" view of the three separate components of U-shaped frame 410 (i.e., the adjustable horizontal base member 420 and the two upright vertical arms 425). To connect the three separate components to one another so as to form the U-shaped frame 410, one upright vertical arm 425 connects/slides onto base member 435 of adjustable horizontal base member 420, and the other of the upright vertical arms 425 connects/slides onto horizontal base member 430 of adjustable horizontal base member 420.

Figure 79:
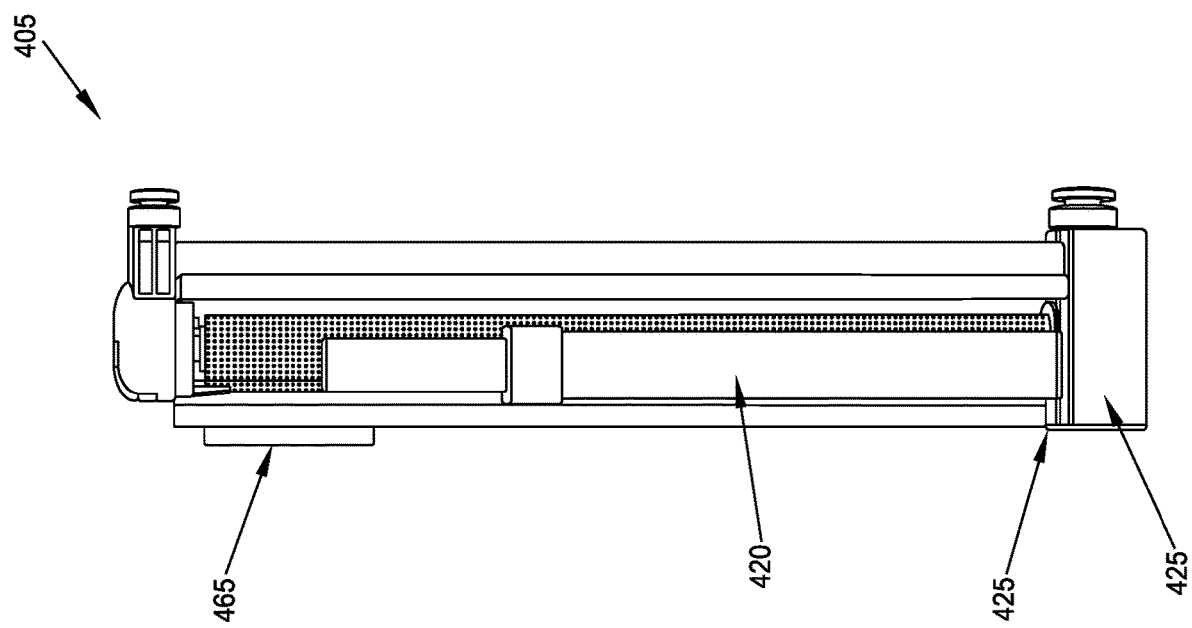
FIG. 79 is a schematic view showing the three separate components of the U-shaped frame condensed so as to take up the least amount of space, i.e., so as to be travel size.

FIG. 79 shows safety gate 405 condensed for ease of travel/stowing. Vertical arms 425 are detached from adjustable horizontal base member 420, with flexible barrier 415 permanently affixed to one of the vertical arms 425 (and retracted onto its spool 460). Adjustable horizontal base member 420 is telescoped inwardly to its smallest size, and the detached vertical arms 425 are placed side by side with one another and adjustable horizontal base member 420.

Looking now at FIGS. 75-78 and 84-87, retractable flexible barrier 415 comprises a screen, or a mesh screen, or a plastic screen, etc., so as to prevent a small child or pet from passing through the U-shaped frame 410. In FIGS. 75-77, flexible barrier 415 is shown extending across U-shaped frame 410. In FIG. 78, flexible barrier 415 is retracted into spool 460. Flexible barrier 415 may also include a handle 465 for enabling a user to easily slide flexible barrier 415 across U-shaped frame 410 (i.e., between the two upright vertical arms 425).

Note that, if desired, pressure-fit safety gate with non-folding arms 405 may comprise the aforementioned sensors 320A, 325A, 330A, 335A, 316A and 319A of "smart" safety gate 305 which monitor conditions at touchpoints on the gate (e.g., pressure, tension, motion, etc.), and hence monitor changes to the state of the gate (e.g., whether the safety gate is properly installed and closed, and/or whether the safety gate is improperly installed and/or becomes dislodged, and/or when the safety gate is not closed, and/or when excessive force is being placed on the safety gate, etc.). If desired, the aforementioned sensors 320A, 325A, 330A and 335A may be formed as part of adjustable bumpers 450 of the pressure-fit safety gate with non-folding arms 405.

Note also that, if desired, pressure-fit safety gate with non-folding arms 405 may comprise the aforementioned universal gate safety monitoring system 360.

Adjustable Bumpers 450

Figure 80:
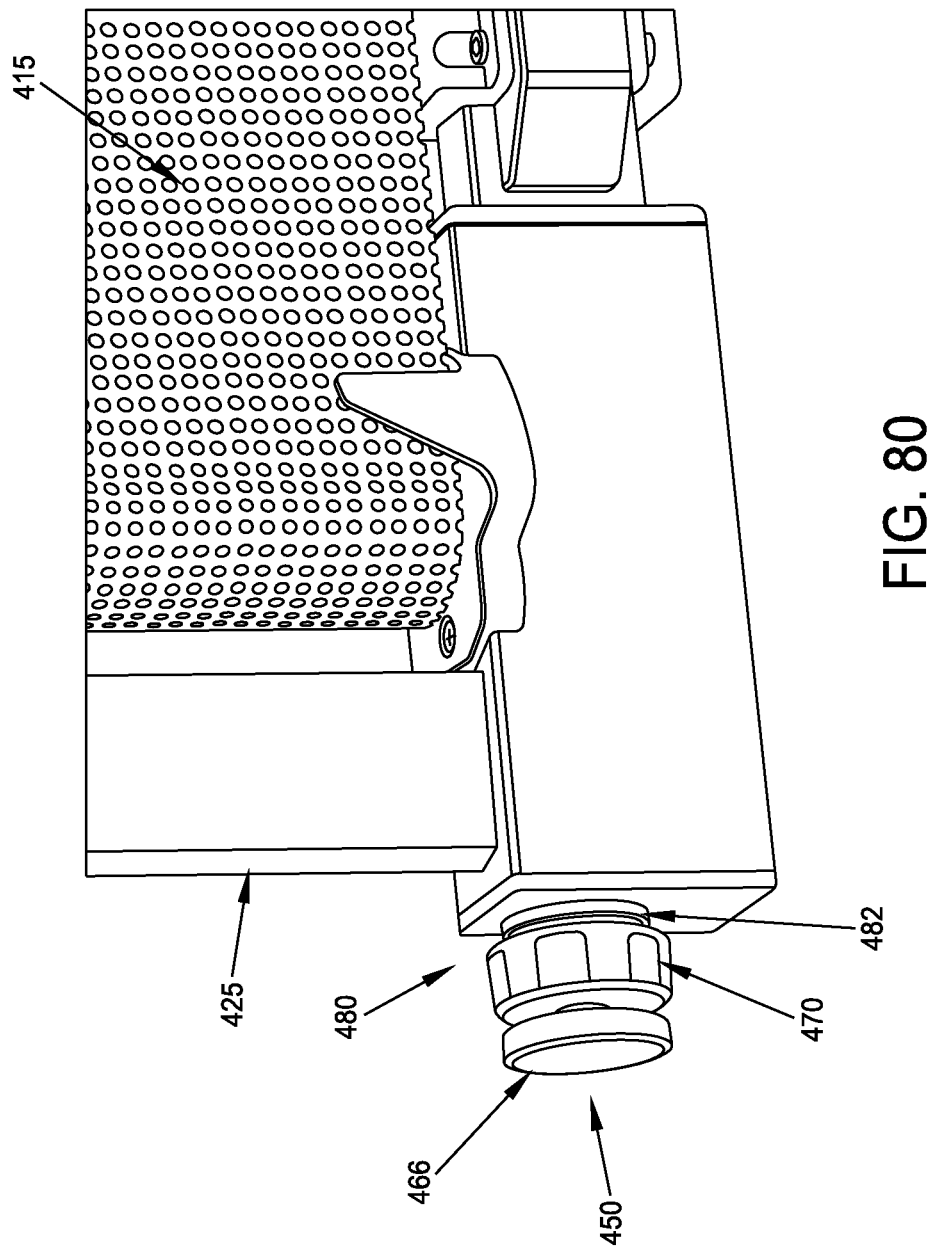
FIGS. 80 and 81 are close-up schematic views of the pressure fit mechanism used by the U-shaped frame.
Figure 81:
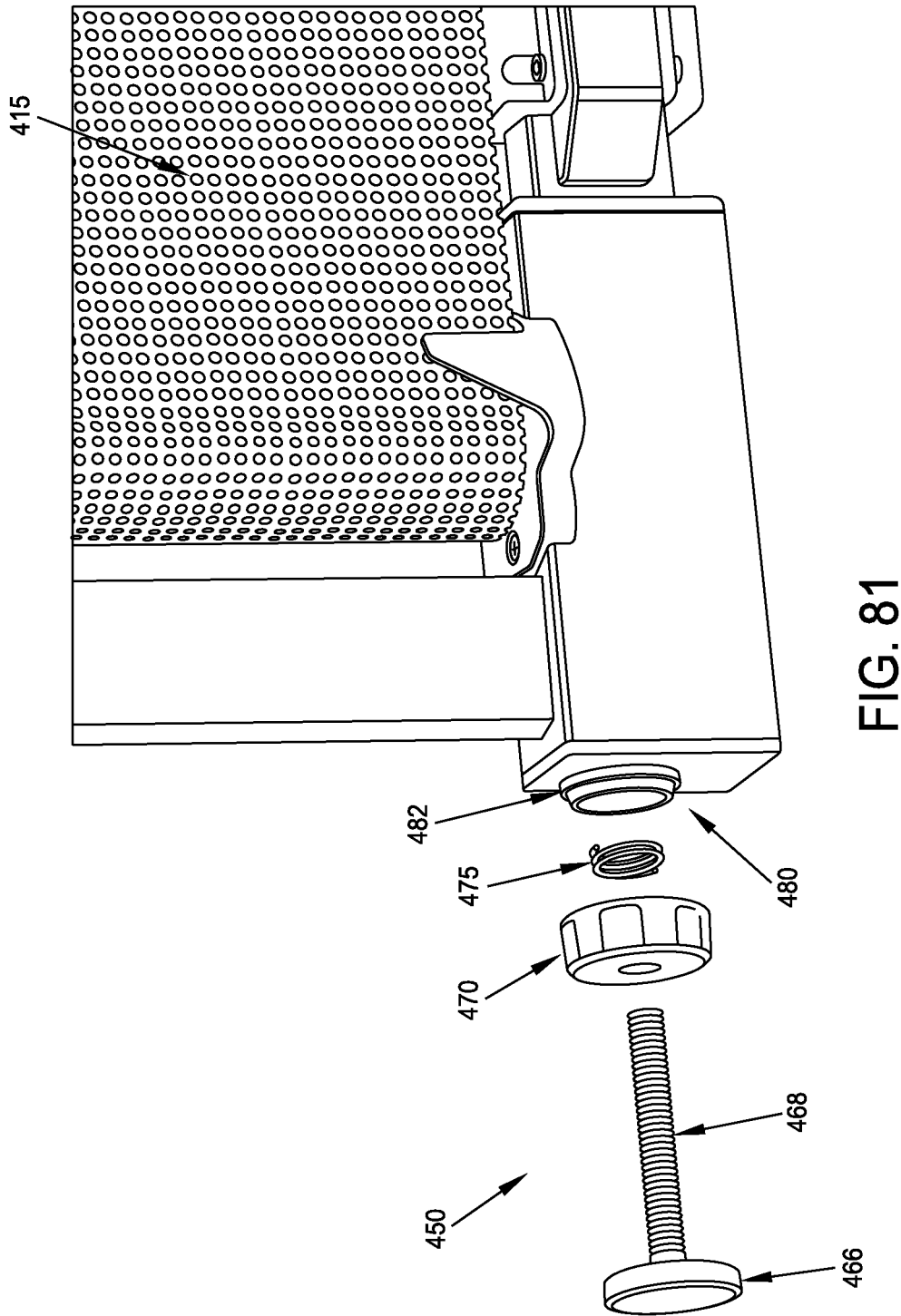

FIGS. 80 and 81 show a close-up view of one of the adjustable bumpers 450. FIG. 81 shows an exploded view of one embodiment of adjustable bumpers 450.

In this embodiment, adjustable bumpers 450 are threaded and make contact with the walls of a doorway (or hallway or walkway). More particularly, adjustable bumpers 450 comprise a contact pad 466 mounted to a threaded shaft 468, a cap 470 mounted to threaded shaft 468 and a coil spring 475 which provides outward force on adjustable bumper 450. Threaded shaft 468 of adjustable bumper 450 is able to telescope in and out of vertical arms 425 (i.e., in and out of either horizontal portions 425A or vertical portions 425B of vertical arms 425), and is spring-biased into the "out" position. If desired, visual indicators 480 may be provided for adjustable bumpers 450. In this form of the invention, visual indicators 480 comprise a colored projection 482 on a vertical arm 425 (i.e., on either a horizontal portion 425A or a vertical portion 425B of a vertical arm 425), with cap 470 being in fixed relation to contact pad 466, so that when adjustable horizontal base member 420 is telescoped outwardly (i.e., by opening latch 440 on adjustable horizontal base member 420 and physically forcing base members 430, 435 apart) and contact pad 466 engages a door frame, adjustable bumper 450 and the vertical arm 425 (i.e., the horizontal portion 425A or the vertical portion 425B of the vertical arm 425) move closer together in proportion to the force with which the adjustable horizontal base member 420 is telescoped outwardly (i.e., forced toward the door frame), and when that force is at an adequate level, cap 470 will cover the colored projection 482. In other words, when an appropriate force (measured in lbs/inch, or some other unit of force measurement) is achieved, visual indicator 480 is concealed, this ensures that safety gate 405 has the proper force to stay in place (i.e., so as to ensure secure engagement of the vertical arms 425 with the walls of the doorway or hallway or walkway). It should be appreciated that, if desired, all four adjustable bumpers 450 may be provided with visual indicators 480.

Connection of Adjustable Horizontal Base Member 420 and Vertical Arms 425

Figure 82:
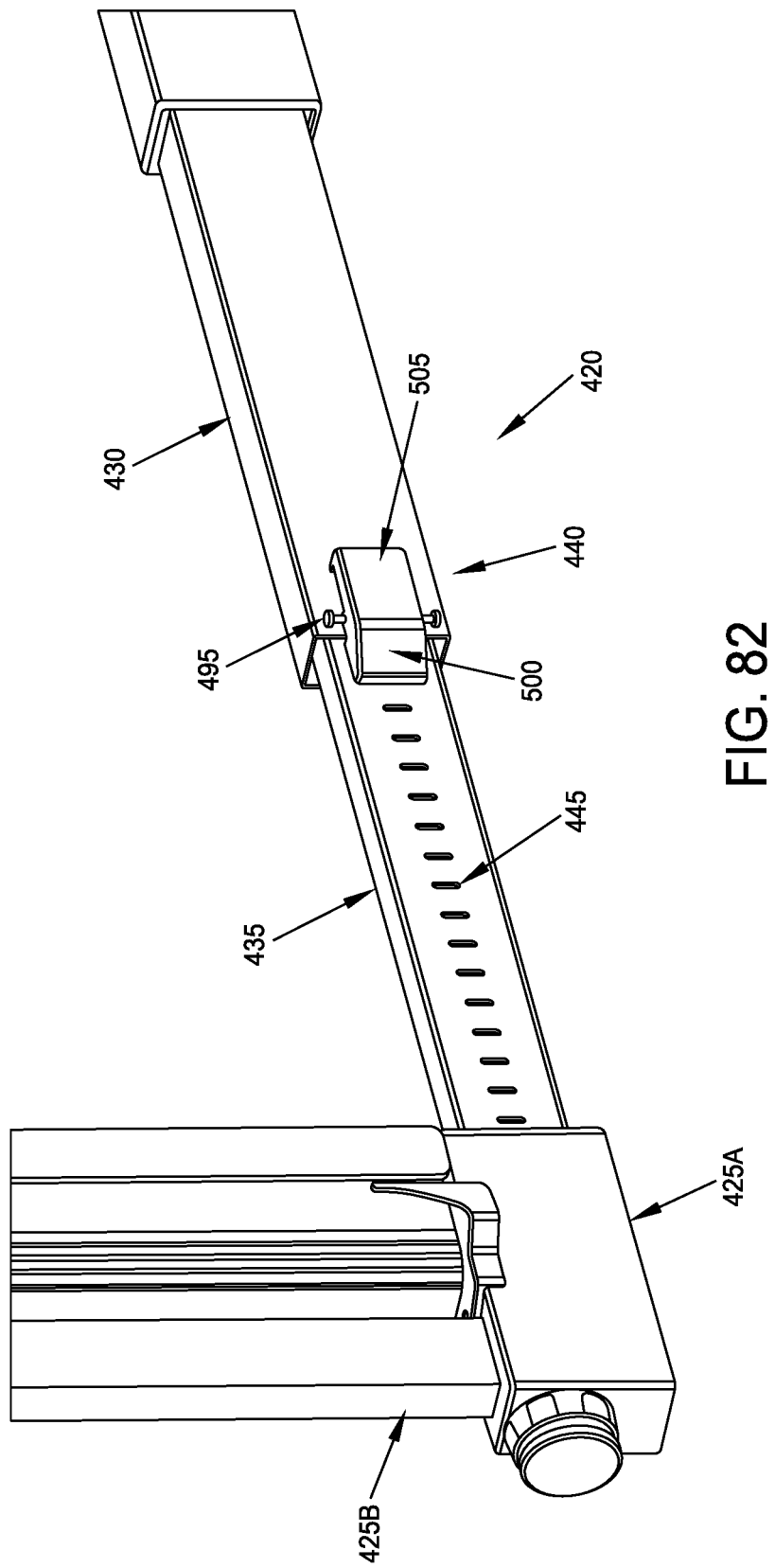
FIG. 82 is a close-up schematic view of the adjustable horizontal base member of the U-shaped frame.
Figure 83:
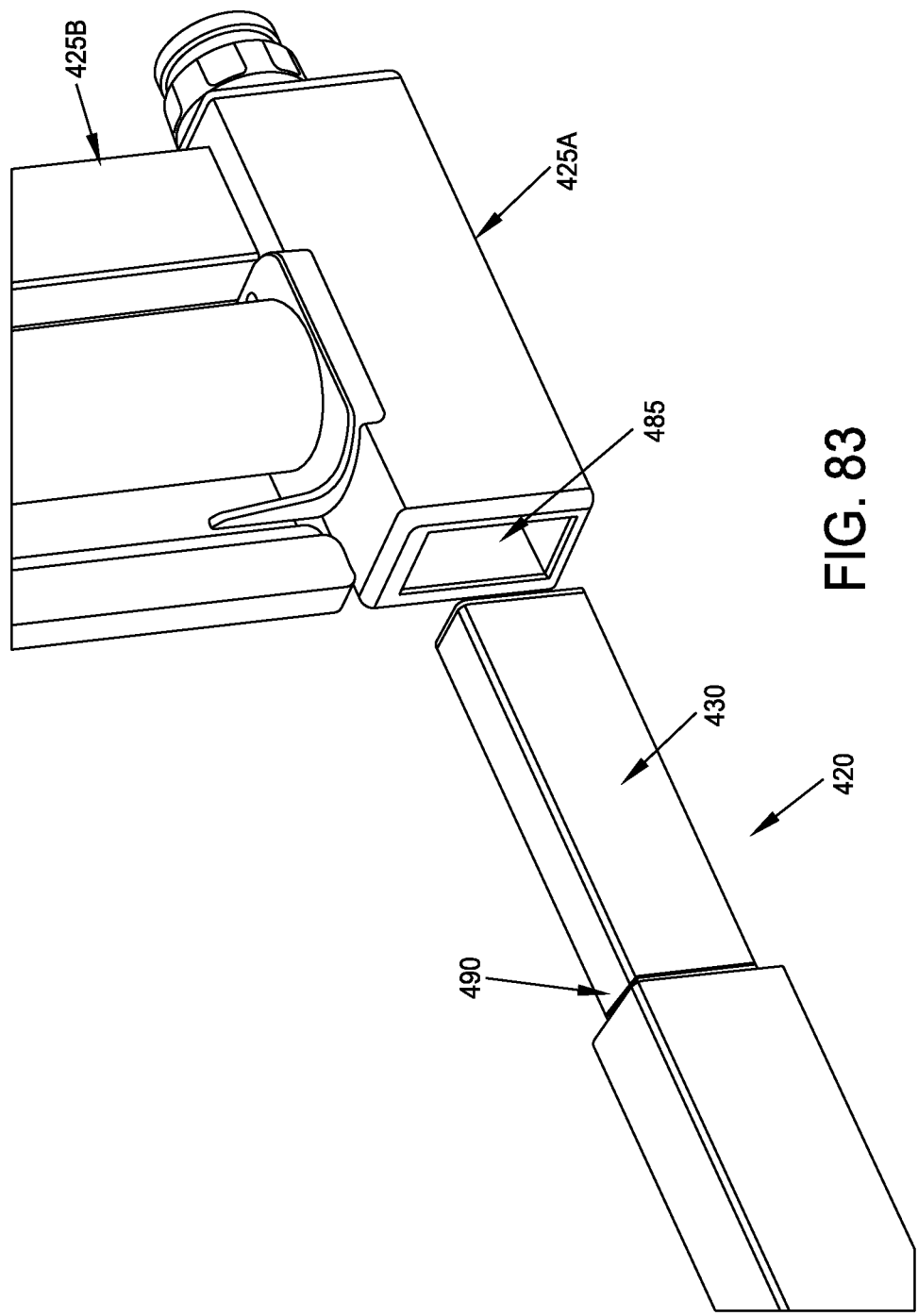
FIG. 83 is a close-up schematic view showing how the adjustable horizontal base member fits into the upright vertical arms, thereby creating the U-shaped frame.

FIGS. 82 and 83 show a close-up view of the connection between adjustable horizontal base member 420 and vertical arms 425. More particularly, FIGS. 82 and 83 show the connection between base members 430, 435 of adjustable horizontal base member 420 and horizontal portions 425A of vertical arms 425. In the preferred form of the invention, horizontal portions 425A of vertical arms 425 comprise a recess 485 (see FIG. 83) for receiving an end of adjustable horizontal base member 420 (i.e., an end of base member 430 or an end of base member 435). Base members 430, 435 fit securely into recesses 485 in horizontal portions 425A of vertical arms 425. FIG. 82 shows the connection between base member 435 of adjustable horizontal base member 420 and the horizontal portion 425A of one of vertical arms 425. FIG. 83 shows the connection between base member 430 of adjustable horizontal base member 420 and the horizontal portion 425A of the other one of vertical arms 425. These two connections (i.e., the two L-shaped vertical arms 425 connected to the horizontal base 420) create the U-shaped frame 410.

Indicator lines 490 (see FIGS. 78 and 83) are provided to visually alert users as to whether base members 430, 435 of adjustable horizontal base member 420 are fully inserted into recesses 485 of horizontal portions 425A vertical arms 425. More particularly, indicator lines 490 are normally visible on base members 430, 435, however, when a base member 430, 435 is fully inserted into a recess 485 of a horizontal portion 425A of a vertical arm 425, an indicator line 490 is no longer visible. Thus, when indicator lines 490 are no longer visible, base members 430, 435 of adjustable horizontal base member 420 are securely connected to upright vertical arms 425 so as to create a stable U-shaped frame 410.

Latch Mechanism 440 of Adjustable Horizontal Base Member 420

Figure 83A:
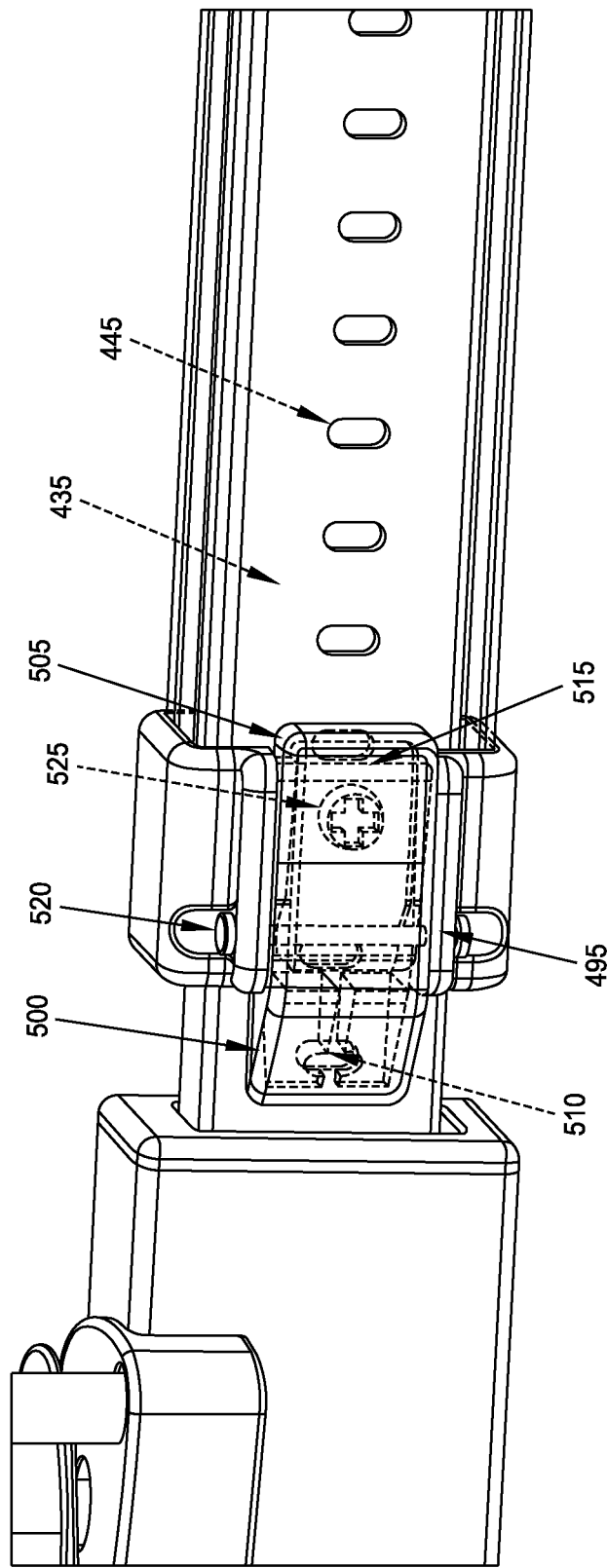
FIG. 83A is a close-up schematic view showing a latch mechanism which may be used to adjust the length of the adjustable horizontal base member.

FIG. 83A is a close-up schematic view showing one form of the latch mechanism 440 which may be used to adjust the length of adjustable horizontal base member 420.

More particularly, base members 430, 435 are configured to telescope relative to one another. Latch mechanism 440 is configured to allow base members 430, 435 to slide freely in one direction (i.e., in an expanding direction—"outward") but prevent base members 430, 435 from sliding freely in the opposite direction (i.e., in a collapsing direction—"inward") unless latch mechanism 440 is manually operated. In the preferred form of the invention, latch mechanism 440 comprises a pivoting member 495 having a first end 500 and a second end 505. First end 500 comprises a projection 510 which is configured to fit into connect holes 445 in base member 435 of adjustable horizontal base member 420. Second end 505 comprises a finger seat 515. Pivoting member 495 is pivotally connected to base member 430 with a pivot pin 520. A spring 525 biases finger seat 515 away from base member 430 and biases projection 510 toward base member 435. In this way, in order for base members 430 and 435 to be telescoped relative to one another, finger seat 515 of pivoting member 495 must be pushed against the power of spring 525 so that projection 510 is withdrawn from a connect hole 445 in base member 435. For base members 430 and 435 to be locked in position relative to one another, the force applied to finger seat 515 of pivoting member 495 must be released so that spring 525 causes projection 510 to be advanced into a connect hole 445 in base member 435.

Fastening Mechanism 455 for Retractable Flexible Barrier 415

Figure 84:
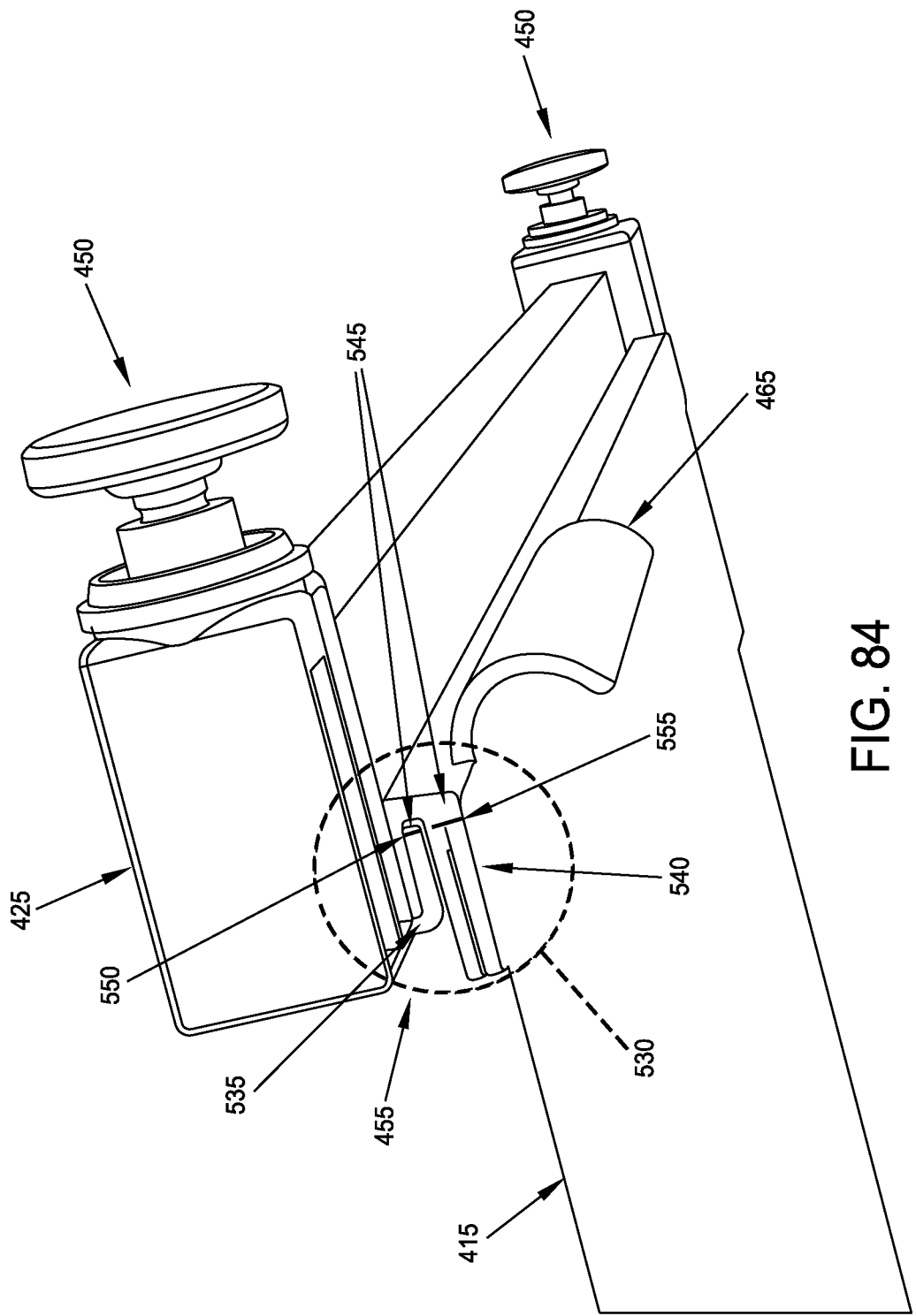
FIG. 84 is a close-up schematic view showing how the retractable flexible barrier may be locked in place on one of the upright vertical arms of the U-shaped frame.
Figure 85:
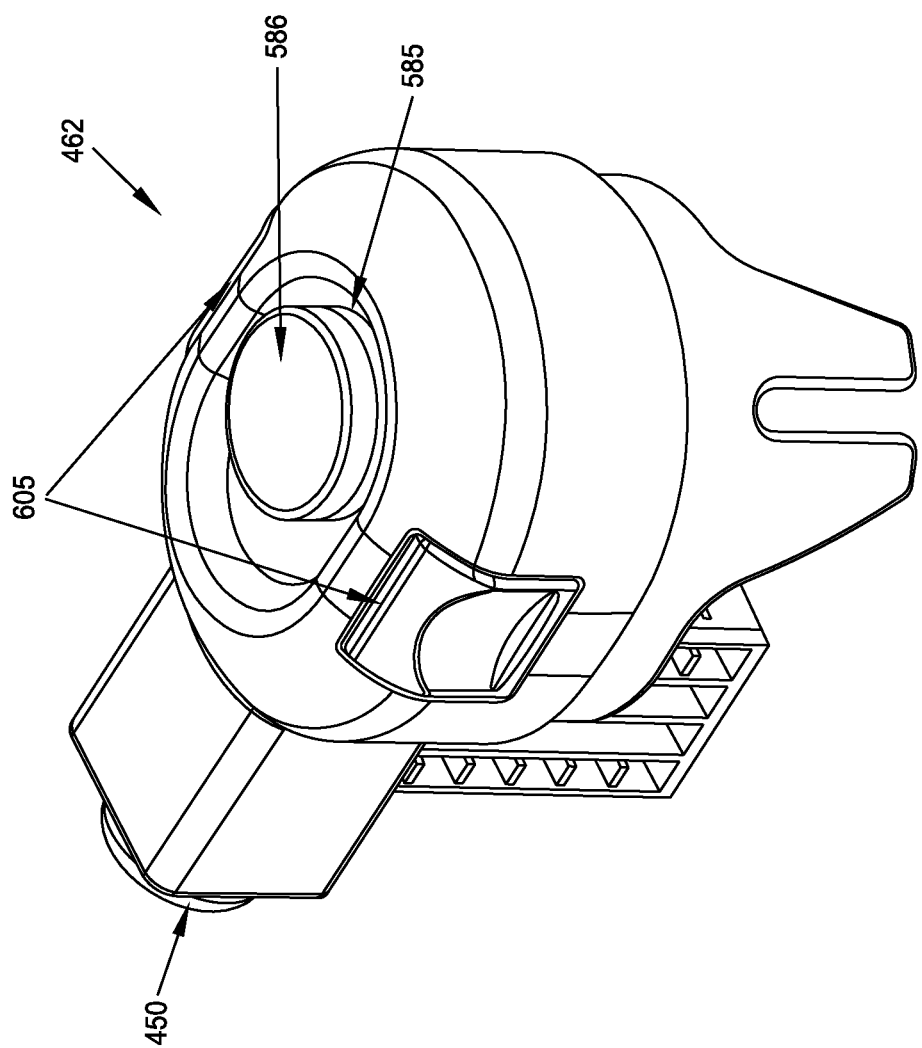
FIGS. 85-88 are schematic views showing how a user locks/unlocks the retractable flexible barrier.
Figure 86:
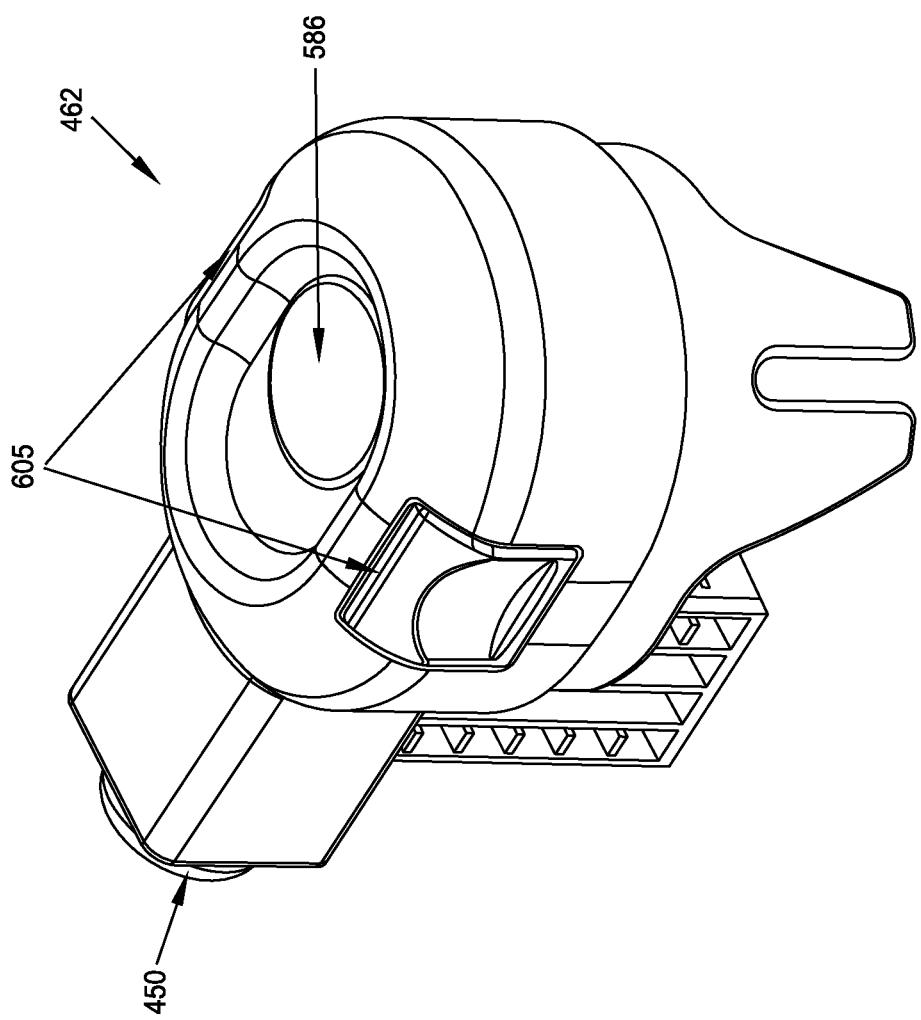
Figure 87:
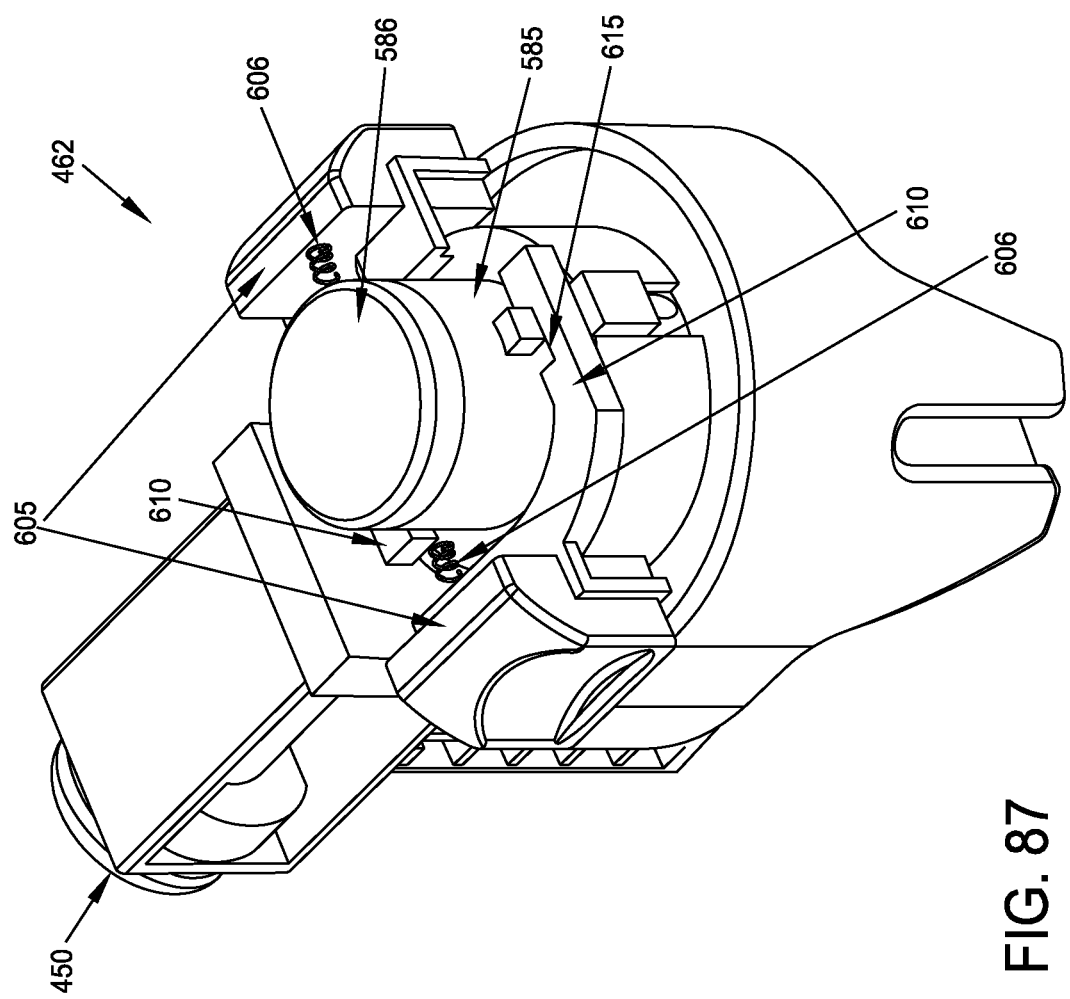
Figure 88:
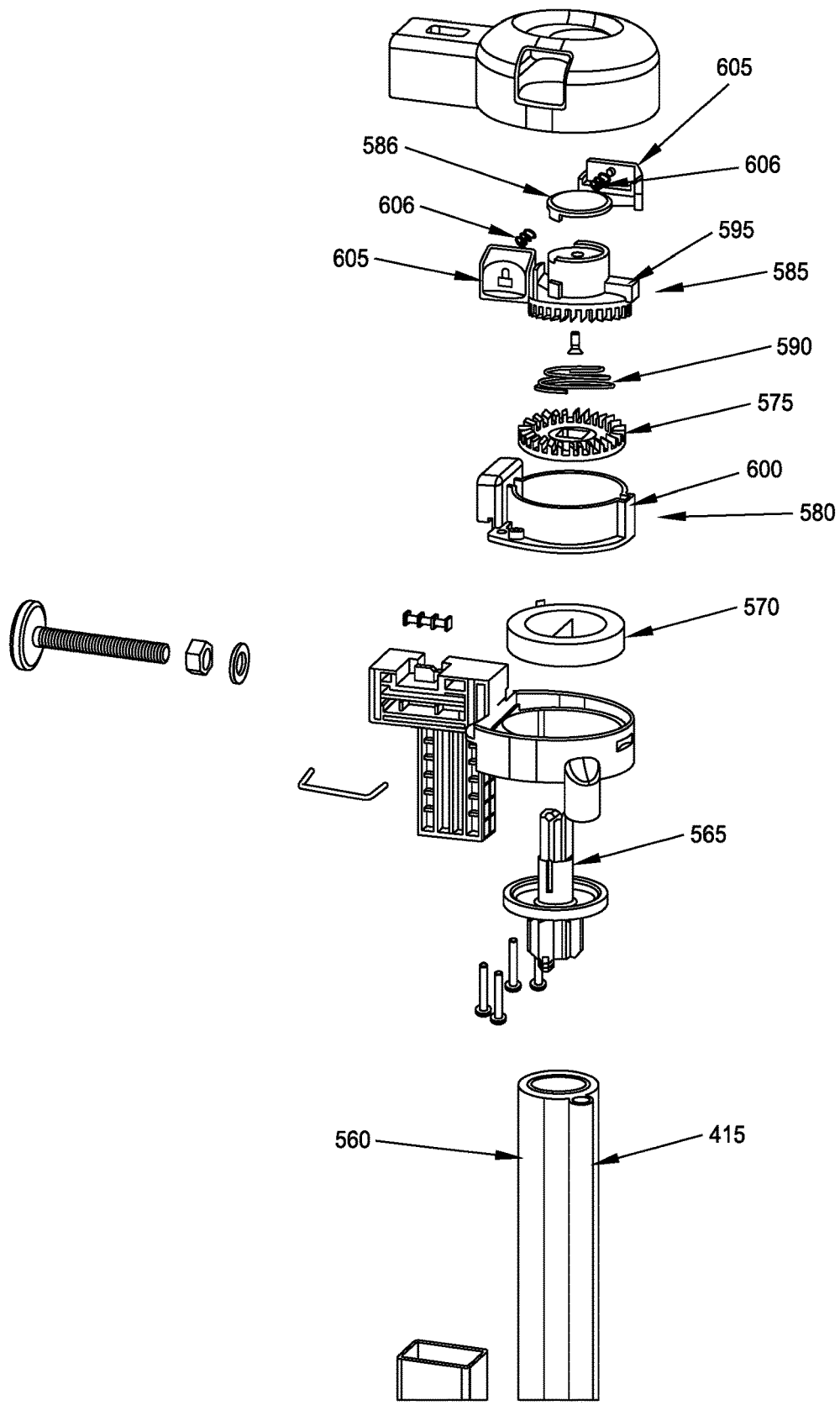

FIG. 84 shows one exemplary way in which flexible barrier 415 is securely locked/fitted to one of the vertical arms 425 (i.e., the vertical arm 425 carrying fastening mechanism 455). In this form of the invention, fastening mechanism 455 comprises a dovetail lock 530. Dovetail lock 530 forms a releasable locking connection between vertical arm 425 and handle 465 of flexible barrier 415. More particularly, dovetail lock 530 comprises a first U-shaped structure 535 secured to upright vertical arm 425, and a second U-shaped structure 540 secured to handle 465 of flexible barrier 415. When handle 465 of flexible barrier 415 is to be locked to vertical arm 425, handle 465 is used to pull flexible barrier 415 outwardly so that second U-shaped structure 540 passes by first U-shaped structure 535, and then the force on handle 465 is relaxed so that second U-shaped structure 540 nests within first U-shaped structure 535, with the retraction-bias on flexible barrier 415 maintaining second U-shaped structure 540 nested in first U-shaped structure 535.

Indicator lines 545 are provided to visually alert users as to whether the dovetail lock 530 is properly nested. More particularly, indicator lines 545 comprise a first indicator line 550 on first U-shaped structure 535, and a second indicator line 555 on second U-shaped structure 540. When second U-shaped structure 540 is properly nested in first U-shaped structure 535, indicator lines 550, 555 are lined-up with one another, thereby indicating that handle 465 of flexible barrier 415 is properly secured to vertical arm 425. When second U-shaped structure 540 is not properly nested in first U-shaped structure 535, indicator lines 550, 555 will not properly align with one another, thereby indicating that handle 465 of flexible barrier 415 is not properly secured to vertical arm 425.

Lock 462 of Retractable Flexible Barrier 415

Looking next at FIGS. 85-88, there is shown details of lock 462 which engages/disengages (i.e., locks/unlocks) the internal spring mechanism controlling movement of flexible barrier 415. More particularly, a spool 560 carries flexible barrier 415. A stem 565 is secured to spool 560. Stem 565 extends through a spring 570 and is secured to a gear 575. Spring 570 is secured to housing 580 so as to bias spool 560 into a retracting condition (i.e., to retract flexible barrier 415 onto spool 560). Flexible barrier 415 may be extended from spool 560 by pulling on handle 465 against the power of spring 570.

A locking element 585 carrying a cap 586 is mounted coaxial with stem 565 and gear 575. Locking element 585 telescopes axially relative to stem 565 and gear 575. A spring 590 biases locking element 585 away from stem 565 and gear 575. Locking element 585 is constrained against rotational movement by virtue of a pair of ears 595 which ride in channels 600 formed in housing 580. As a result of this construction, when locking element 585 is telescoped away from stem 565 and gear 575, stem 565 and gear 575 are free to rotate, and hence spool 560 is free to rotate; however, when locking element 585 is forced into engagement with gear 575, the teeth of locking element 585 mesh with the teeth of gear 575, and ears 595/channels 600 prevent gear 575 and stem 565 from rotating, and hence prevent spool 560 from rotating.

Side buttons 605 comprise springs 606 which bias side buttons 605 into their outboard positions, and collars 610 which are provided for constraining vertical movement of locking element 585. More particularly, collars 610 comprise openings 615. When side buttons 605 are pushed towards one another, against the bias of springs 606, openings 615 align with ears 595 of locking element 585 and permit vertical movement of locking element 585 into or out of engagement with gear 575. However, when side buttons 605 are not pushed towards one another, springs 606 push side buttons 605 into their outboard positions, openings 615 are not aligned with ears 595 of locking element 585, and ears 595 are locked against movement past collars 610, i.e., locking element 585 is locked either into or out of engagement with gear 575.

In one manner of use, lock 462 is initially in a disengaged condition, so that locking element 585 is spaced from gear 575 and flexible barrier 415 is retracted onto spool 560 under the power of spring 570. Collars 610 prevent locking element 585 from engaging gear 575 and flexible barrier 415. In this condition, flexible barrier 415 may be pulled off spool 560 using handle 465. When spool 560 is to be locked against rotation, side buttons 605 may be pressed inwardly, against the bias of springs 606, so as to align openings 615 with ears 595, whereupon cap 586 may be pushed downwardly so as to cause locking element 585 to engage gear 575 and prevent spool 560 from rotating. Thereafter releasing side buttons 605 causes side buttons 605 to be pushed into their outboard position by springs 606 and collars 610 to move outwardly, bringing openings 615 out of alignment with ears 595, whereby to maintain locking element 585 in engagement with gear 575 and thereby lock spool 560 against rotation. Subsequently, when it is desired to unlock spool 560, side buttons 605 are again pushed inwardly, whereby to align openings 615 with ears 595, and spring 590 moves locking element 585 out of engagement with gear 575.

Note that by color coding locking element 585 differently than cap 586, a visual indication can be provided of whether locking element 585 is in an engaged or disengaged position relative to gear 575, i.e., depending on whether locking element 585 is visible to the user. See, for example, FIGS. 85 and 86.

It should be appreciated that, in the foregoing construction, side buttons 605 and collars 610 essentially provide a gate which only allows vertical motion of locking element 585 when side buttons 605 are forced inwardly against the power of springs 606 so that openings 615 in collars 610 are aligned with ears 595. When cap 586 is in the "up" position, cap 586 (and hence locking element 585) can only be pushed down (to lock spool 560) when side buttons 605 are forced inwardly. When cap 586 is in the "down" position, cap 586 (and hence locking element 585) can only be spring-driven upwardly (to unlock the spool) when side buttons 605 are forced inwardly against the force of springs 606. Thus, side buttons 605 and collars 610 cause locking element 585 to remain in its current position (up and unlocked, or down and locked) until side buttons 605 are pushed inwardly, whereupon locking element 585 is free to move either upwardly under the power of the bias spring 590 or downwardly under the power of manual pushing of cap 586.

Level Indicators 620

Figure 89:
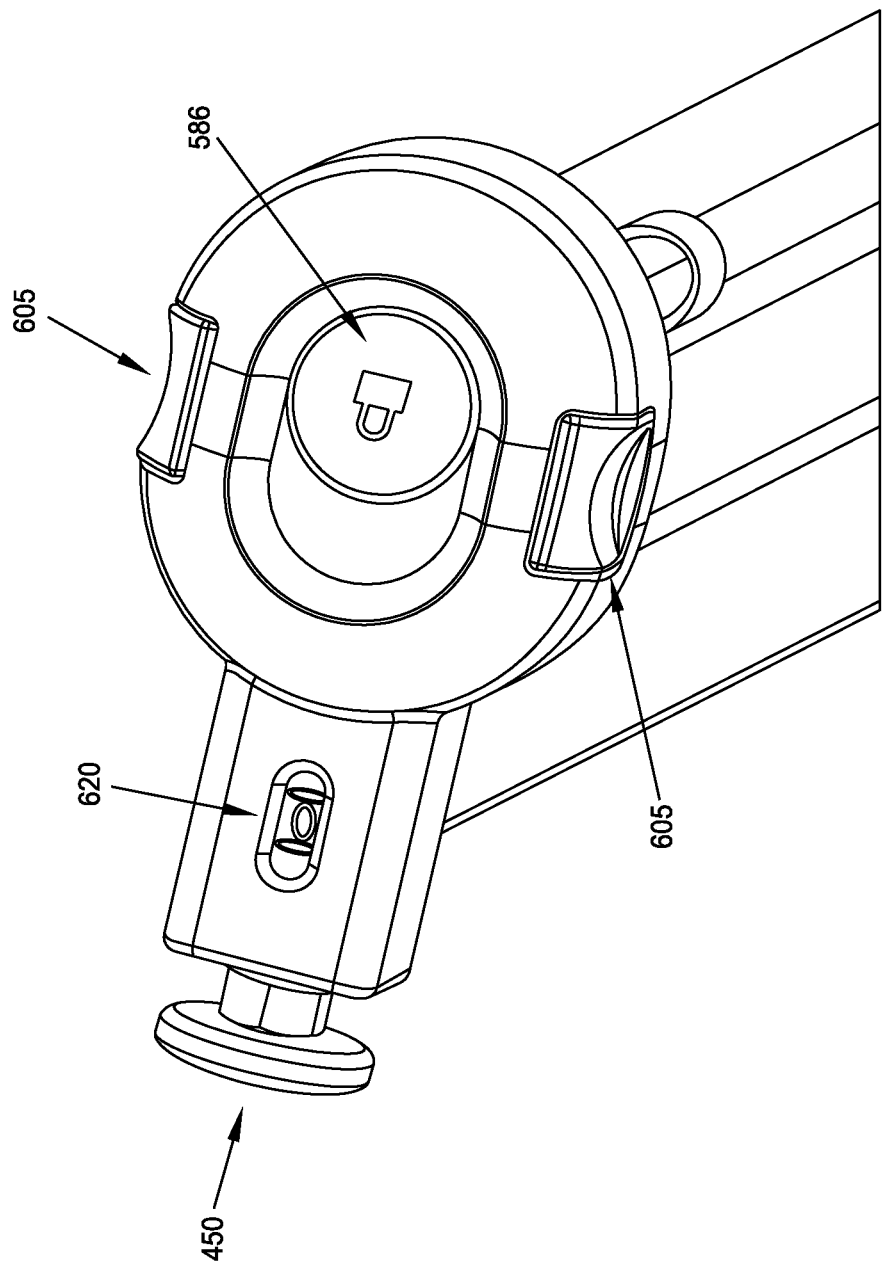
FIG. 89 is a schematic view showing a level indicator which may be provided at the upper end of the upright vertical arms of the U-shaped frame.

In one form of the present invention, if desired, upright vertical arms 425 may be provided with level indicators 620 at their upper ends. FIG. 89 shows a close-up view of one of the level indicators 620. Level indicators 620 preferably comprise a bubble indicator to show that the upright vertical arm 425 is in a vertical position, which will confirm that enough force is being applied to that upright vertical arm 425 to overcome the outward bias of that upright vertical arm 425.

Alternative Construction for Adjustable Bumpers 450

With the adjustable bumpers 450 of FIGS. 80 and 81 discussed above, an adjustable bumper is driven outwardly by opening latch 440 on adjustable horizontal base member 420 and physically forcing base members 430, 435 apart so as to cause the adjustable bumper 450 into progressively greater engagement with the doorframe. As base members 430, 435 telescope apart so as to drive adjustable bumper 450 against the doorframe with increasing force, adjustable bumper 450 and cap 470 press against coil spring 475 so that adjustable bumper 450 and cap 470 approach horizontal portion 425A of vertical arm 425 and cap 470 covers colored projection 482 of visual indicator 480.

However, in an alternative construction, a nut and washer may be provided which ride on threaded shaft 468 of adjustable bumper 450 and may be used to force the adjustable bumper into progressively greater engagement with the door frame and to simultaneously operate a visual indicator so as to indicate a proper level of pressure has been established.

Figure 90:
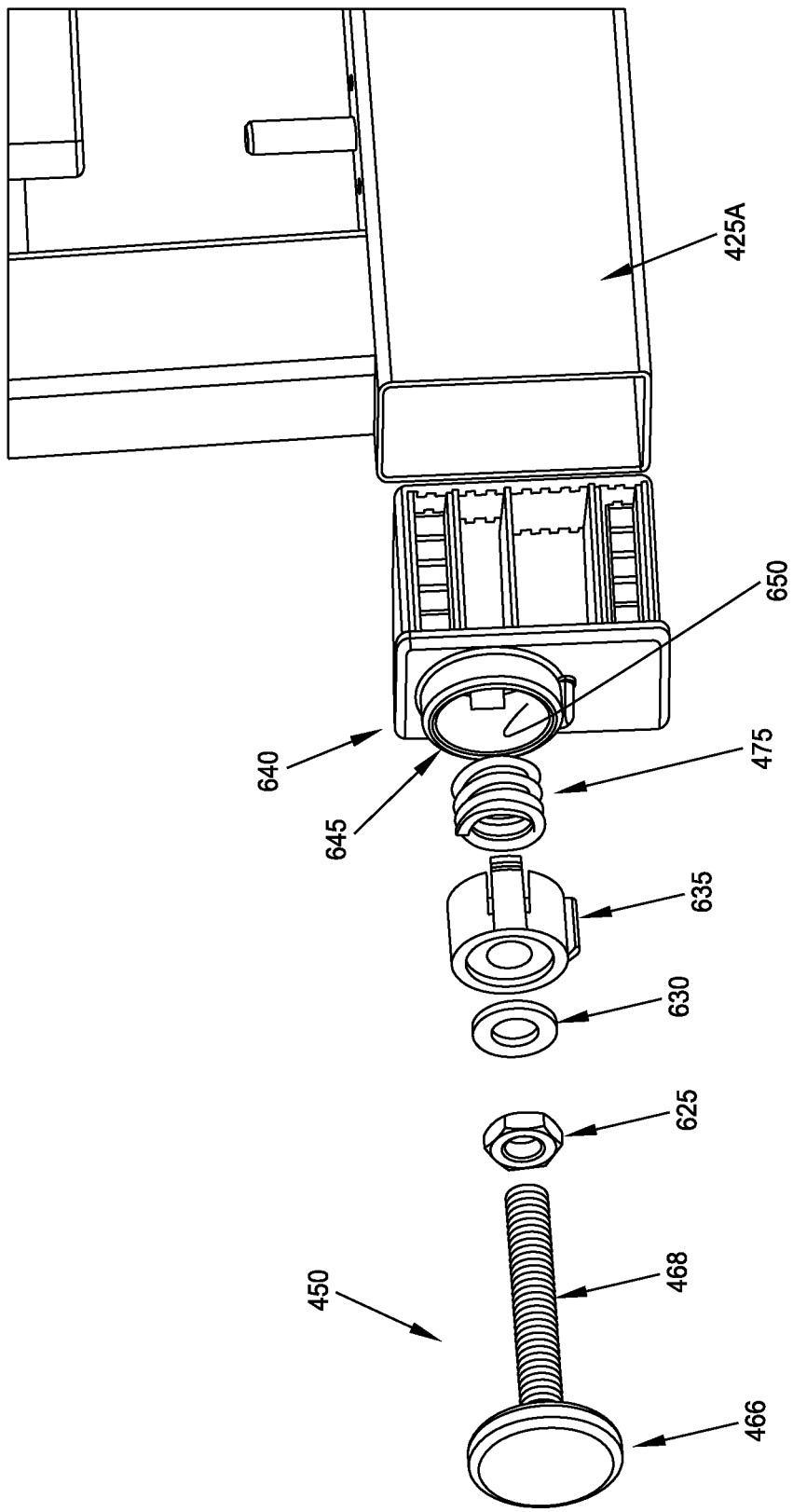
FIGS. 90-92 are schematic views showing an alternative construction of the pressure fit mechanism which may be used by the U-shaped frame.
Figure 91:
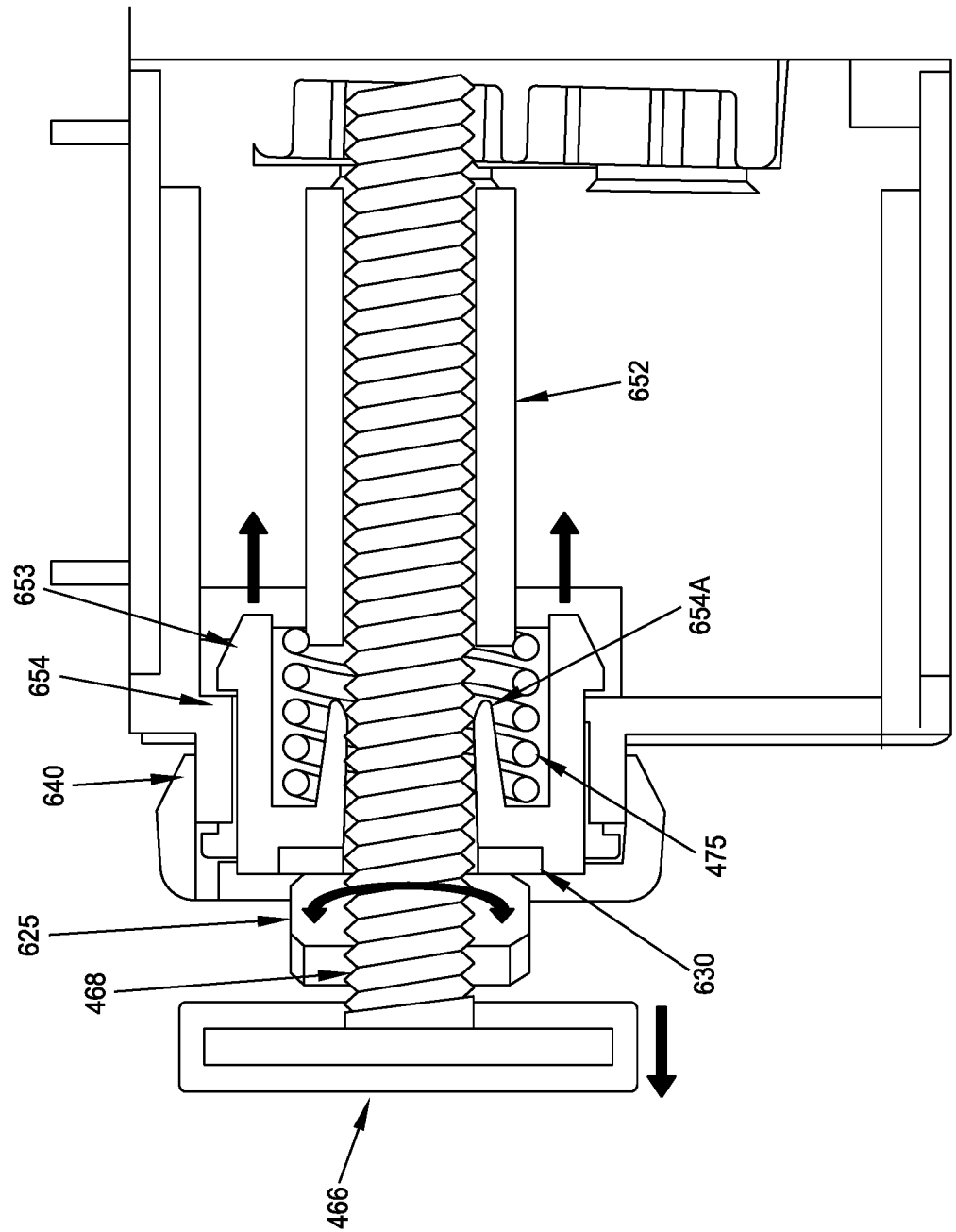
Figure 92:
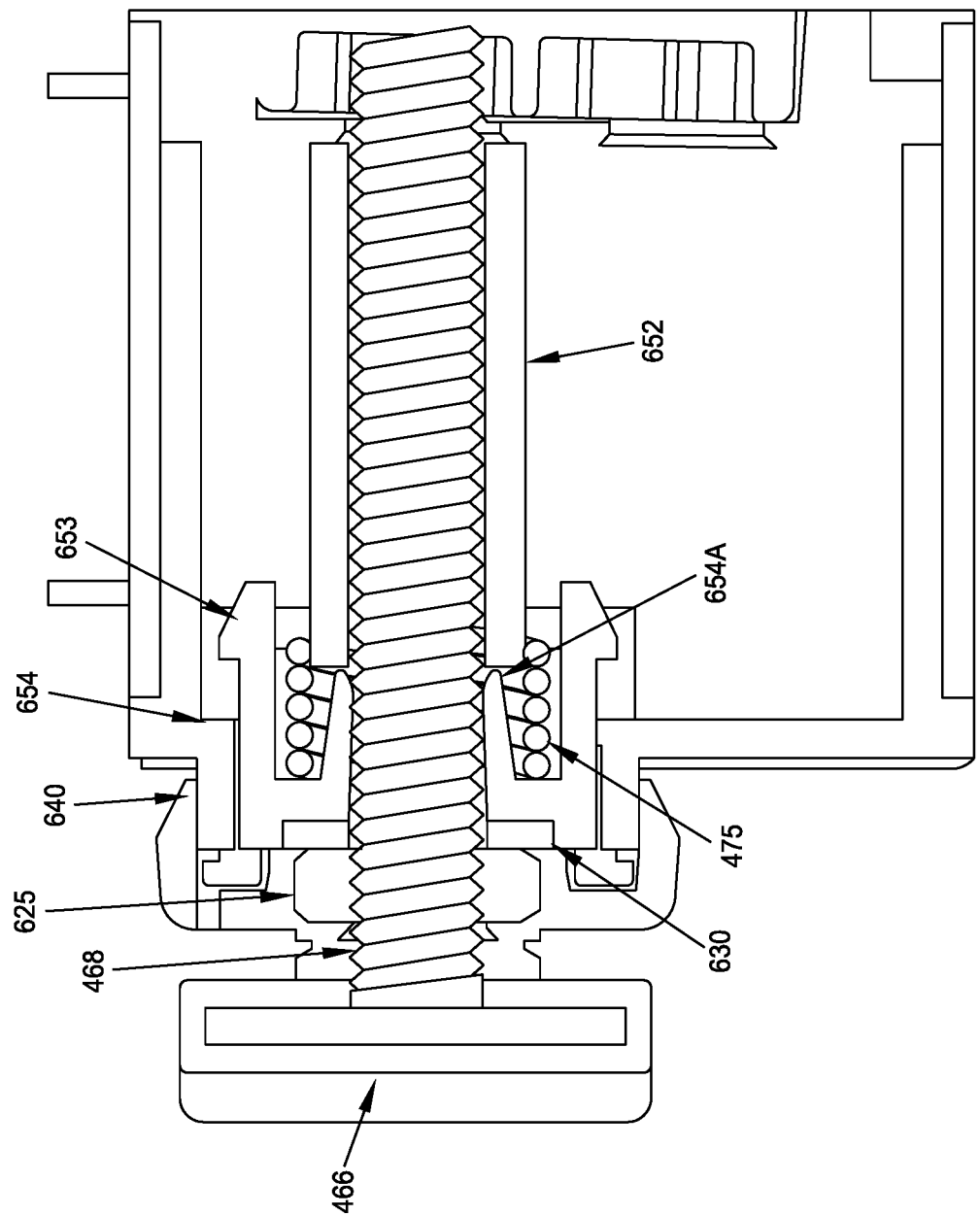
Figure 93:
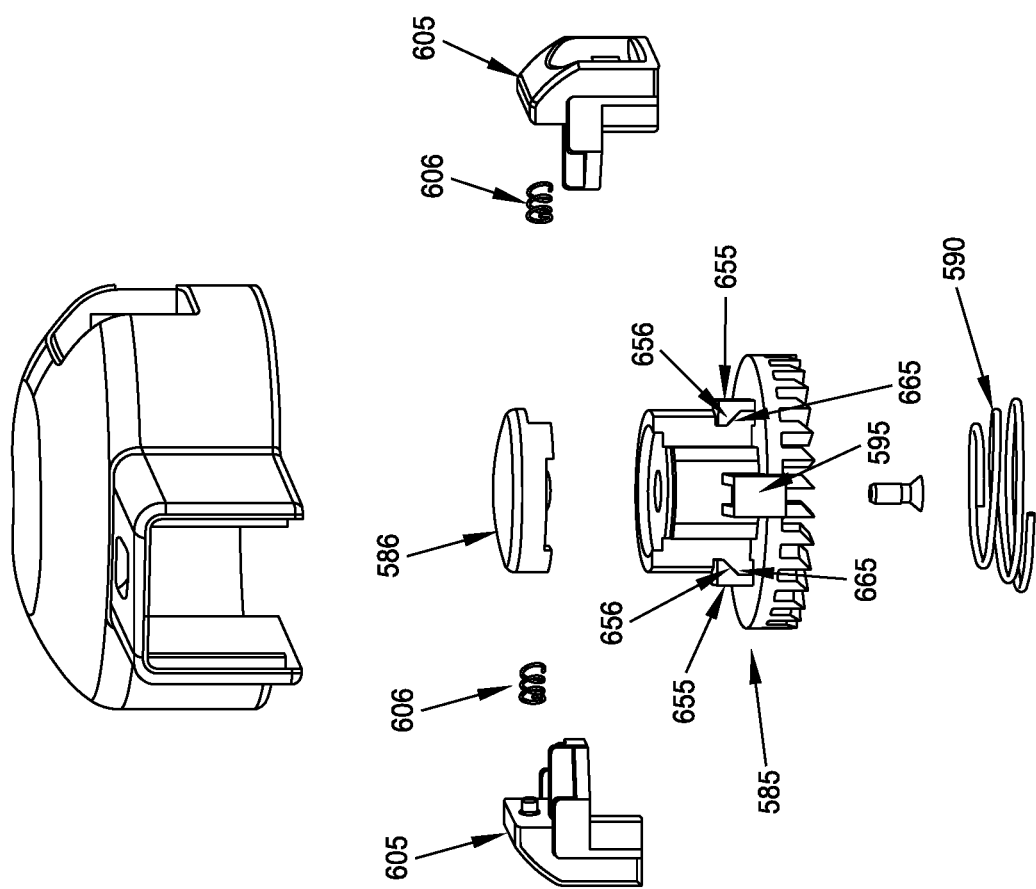
FIGS. 93-96 are schematic views showing an alternative construction for enabling a user to lock/unlock the retractable flexible barrier.
Figure 94:
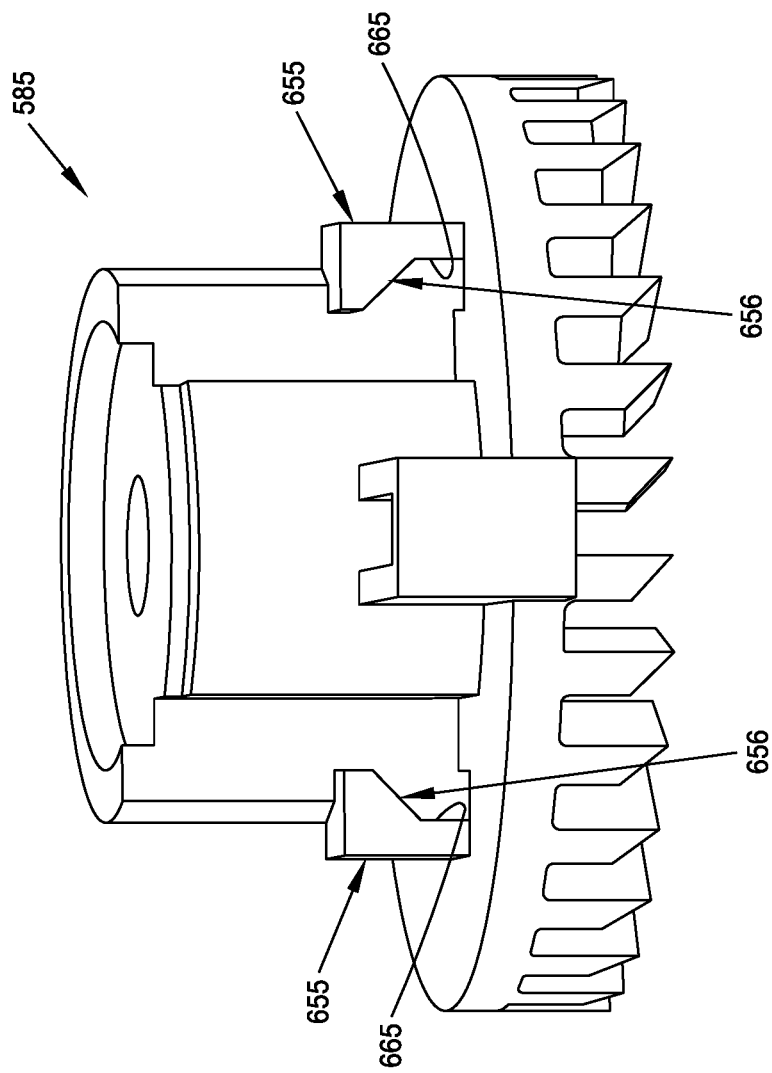
Figure 95:
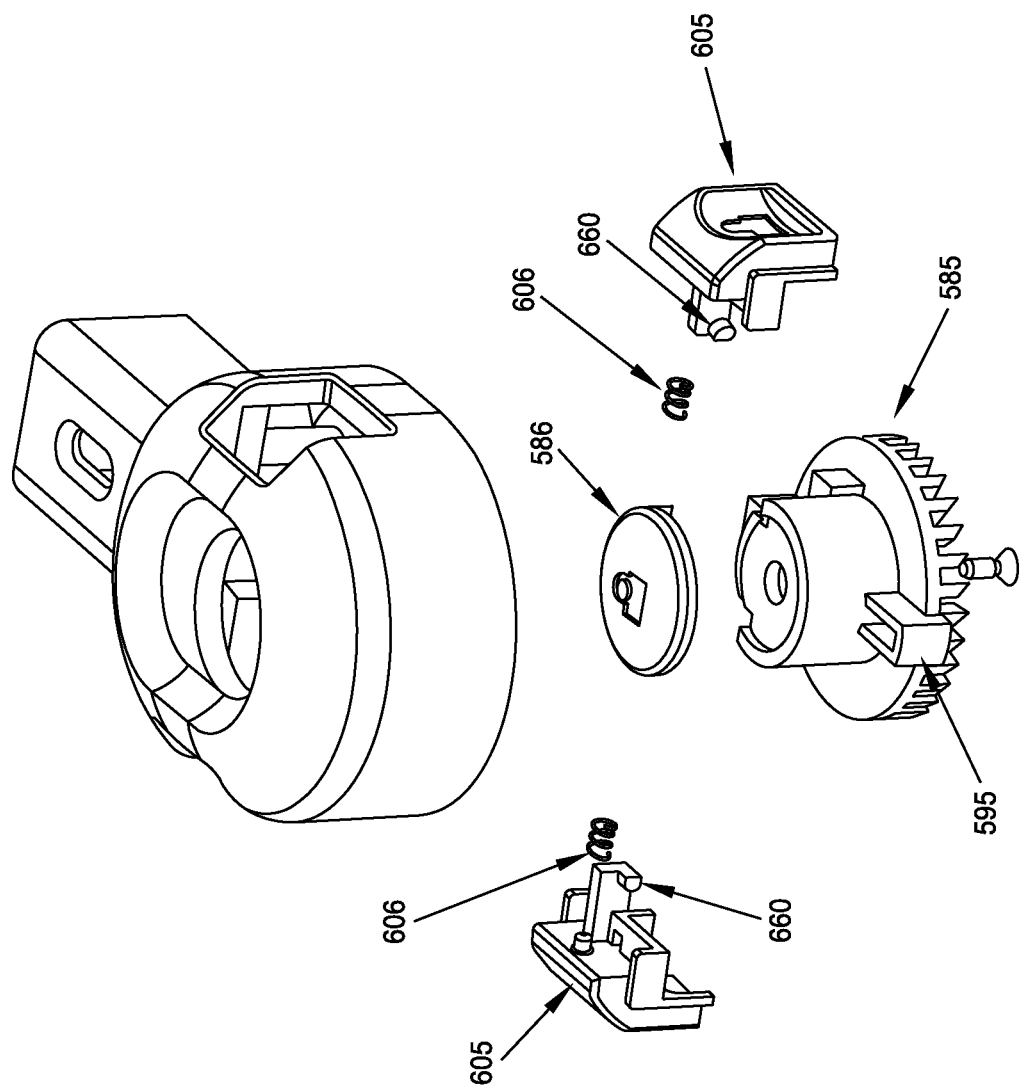
Figure 96:
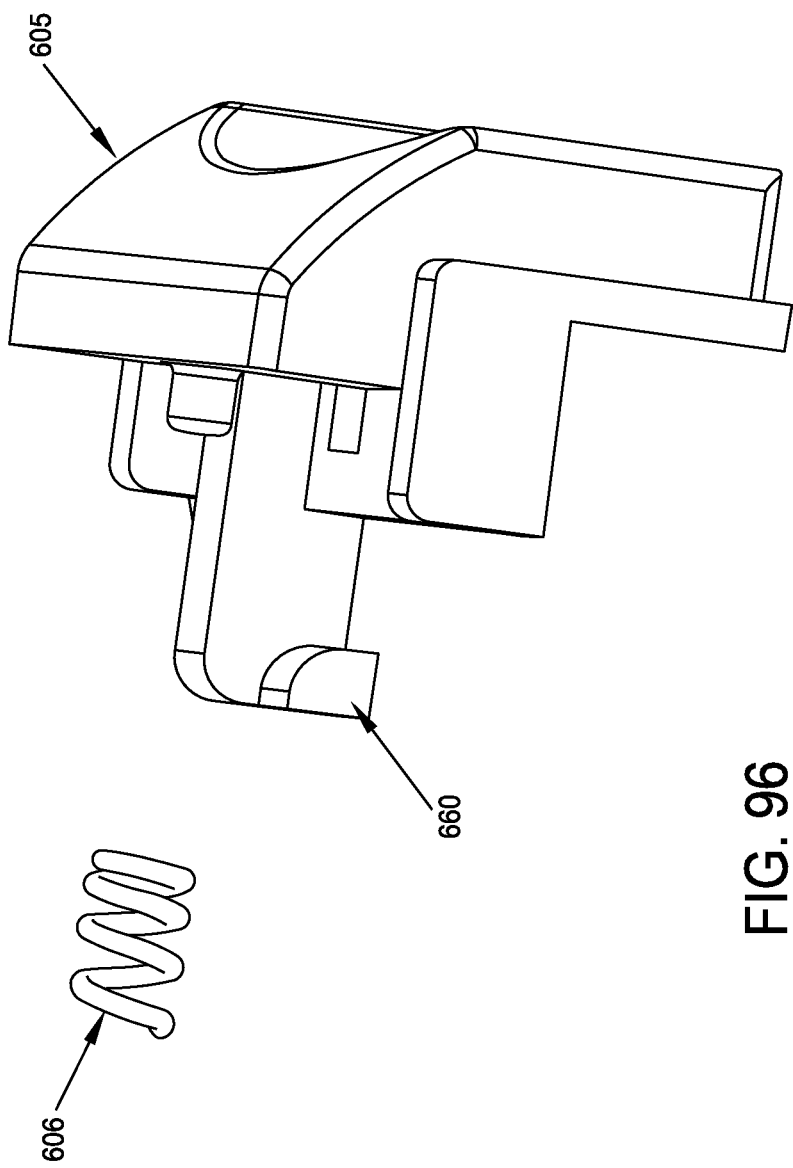

More particularly, and looking now at FIGS. 90-92, in this form of the invention, adjustable bumper 450 comprises the aforementioned contact pad 466, the aforementioned threaded shaft 468, a nut 625, a washer 630, a visual indicator 635 and the aforementioned coil spring 475. In addition, horizontal portion 425A of vertical arm 425 comprises a member 640 which has a projection 645 surrounding an opening 650, and a hollow cylinder 652 disposed coaxial with opening 650. Threaded shaft 468 of adjustable bumper 450 is slidably received in hollow cylinder 652 and is threaded into a portion of visual indicator 635. Visual indicator 635 is coaxial with projection 645 and is spring-biased outwardly by spring 475. Nut 625 rides on threaded shaft 468 and contacts washer 630, which in turn engages visual indicator 635, so that when nut 625 is turned in one direction, nut 625 simultaneously causes (i) threaded shaft 468 and contact pad 466 to move outwardly toward the doorframe, and (ii) visual indicator 635 to move inwardly against the power of spring 475. Note that the outermost position of visual indicator 635 is limited by the engagement of shoulder 653 of visual indicator 635 with shoulder 654 of member 640. Note also that the innermost position of visual indicator 635 is limited by the engagement of element 654A with cylinder 652. Thus, in this form of the invention, turning of nut 625 can be used to increase the outward force with which contact pad 466 contacts the doorframe, and this same nut 625 causes movement of visual indicator 635 so as to inform the user when an appropriate force (measured in lbs/inch, or some other unit of force measurement) is achieved.

It should be appreciated that, if desired, all four adjustable bumpers 450 may be provided with visual indicators 635.

Alternative Construction for Lock 462 of Retractable Flexible Barrier 415

With the lock 462 of FIGS. 85-88 discussed above, side buttons 605 effectively form a gate which only allows vertical motion of locking element 585 when side buttons 605 are forced inwardly against the power of springs 606 so that openings 615 in collars 610 are aligned with ears 595. In order to move locking element 585 past the gate in either direction (i.e., either down or up), side buttons 605 must be pushed inward. However, in an alternative construction, the gate can be configured so as to allow (i) downward movement of locking element 585 under the power of a manual push on cap 586 regardless of whether side buttons 605 are pressed inwardly, and (ii) upward movement of locking element 585 only if side buttons 605 are pushed inwardly.

More particularly, and looking now at FIGS. 93-96, lock 462 is substantially the same as discussed above with respect to FIGS. 85-88, but a different mechanism is provided for regulating vertical movement of locking element 585.

More particularly, in this form of the invention, locking element 585 comprises cam members 655 having cam surfaces 656, and side buttons 605 comprise cam followers 660. When cap 586 is in the up position, cam followers 660 are at the bottom portion 665 of cam surfaces 656, and side buttons 605 are in their outboard positions under the bias of springs 606. When locking element 585 and side buttons 605 are in this position, cap 586 can be depressed downwardly against the power of vertical bias spring 590, and as locking element 585 moves downwardly, cam followers 660 of side buttons 605 ride on cam surfaces 656 and cam followers 660 are pulled inwardly, causing side buttons 605 to move inwardly until cam surfaces 656 move all the way past cam followers 660, at which point springs 606 of side buttons 605 pop side buttons 605 outboard, which causes cam followers 660 to sit above cam members 655 and thereby prevent locking element 585 from returning upwardly. If side buttons 605 are thereafter pushed inwardly, against the power of springs 606, cam members 655 (acting under the upward bias of spring 590) are allowed to pass by cam followers 660, and springs 606 on side buttons 605 thereafter cause cam followers 660 to re-engage with cam surfaces 656, with cam followers 660 following cam surfaces 656 as the cam surfaces move upwardly until cam followers 660 are once again at the bottom portion 665 of cam surfaces 656.

It should be appreciated that, in the foregoing construction, side buttons 605 no longer provide a gate which only allows vertical motion of locking element 585 when side buttons 605 are forced inwardly against the power of springs 606. Instead, in this form of the invention, when cap 586 is in the up position, cap 586 (and hence locking element 585) can be pushed down (to lock spool 560) without side buttons 605 being forced inwardly.

It should also be appreciated that, in both constructions of lock 462 discussed herein, when cap 586 is in the down position, cap 586 (and hence locking element 585) can only be spring-driven upwardly (to unlock the spool) when side buttons 605 are forced inwardly against the force of springs 606.

Advantages of the Pressure-Fit Safety Gate with Non-Folding Arms

The present invention provides numerous advantages over prior art safety gates. For one thing, the present invention provides an adjustable U-shaped safety gate which is pressure-mounted to adjacent architectural structures, thus enabling the safety gate to be flexible and temporary in nature. And the present invention provides the ability to pass through the safety gate by unlatching one end of the flexible barrier from a vertical arm while a person passes through the safety gate. Also, the present invention provides a safety gate which has a flexible horizontal top "crossbar" instead of a rigid horizontal top "crossbar". Furthermore, the present invention provides a self-contained safety gate that is easily condensed, stowed and transported.

Modifications

While the present invention has been described in terms of certain exemplary preferred embodiments, it will be readily understood and appreciated by those skilled in the art that it is not so limited, and that many additions, deletions and modifications may be made to the preferred embodiments discussed above while remaining within the scope of the present invention.

What is claimed is:

1. A safety gate for preventing pets and small children from passing through an opening, the safety gate comprising:
   a frame for selective disposition in the opening, the frame comprising:
      a resizable horizontal base having a first end, a second end, and a longitudinal axis extending therebetween, the resizable horizontal base being configured so that a distance extending between the first end and the second end is adjustable; and
      first and second upright arms, each of the first and second upright arms comprising a horizontal portion and a vertical portion, wherein the horizontal portion and the vertical portion are fixed to one another so that the first and second upright arms each has a generally L-shaped configuration;
      the first and second upright arms being formed as separate components from one another, and as separate components from the resizable horizontal base, such that the frame can be stored with the resizable horizontal base and the vertical portions of the first and second upright arms extending parallel to one another; and
      the first and second upright arms being selectively connectable to the first and second ends, respectively, of the resizable horizontal base, such that the frame can be assembled into a generally U-shaped configuration; and
   a flexible barrier for mounting to the frame so as to prevent a pet or small child from passing through the space between the resizable horizontal base and the first and second upright arms;
   wherein the horizontal portions of the first and second upright arms each comprise at least one opening, and further wherein the first end of the resizable horizontal base is receivable in the at least one opening in the horizontal portion of the first upright arm and the second end of the resizable horizontal base is receivable in the at least one opening in the horizontal portion of the second upright arm so as to connect the first and second upright arms to the first and second ends of the resizable horizontal base, whereby to provide the assembled frame; and
   wherein the first upright arm comprises a spring-biased spool for spooling the flexible barrier onto the first upright arm and a lock for selectively locking the spring-biased spool against movement, and further wherein the lock comprises:
      (i) a locking element for reciprocal movement between (a) a first position in which the locking element is engaged with the spring-biased spool so as to enable locking of the spring-biased spool against movement, and (b) a second position in which the locking element is disengaged from the spring-biased spool so as to disable locking of the spring-biased spool against movement; and
      (ii) a manually-operated gate for selectively preventing movement of the locking element between its first position and its second position.

2. A safety gate according to claim 1 further comprising:
   at least one sensor mounted to the frame for sensing data relating to the state of the safety gate; and
   a wireless communication system for transmitting data from the at least one sensor to a smart device.

3. A safety gate according to claim 1 wherein the vertical portions of the first and second upright arms comprise a level to indicate when a sufficient amount of force is being applied to the first and second upright arms.

4. A safety gate according to claim 1 wherein the first and second upright arms comprise spring-biased bumpers.

5. A safety gate according to claim 4 wherein the spring-biased bumpers comprise a visual indicator to indicate when the spring-biased bumpers achieve a pre-determined amount of force.

6. A safety gate according to claim 5 wherein the visual indicator comprises a marking on the spring-biased bumper which is:
   (i) visible when the spring-biased bumper does not achieve the pre-determined amount of force; and
   (ii) not visible when the spring-biased bumper achieves or exceeds the pre-determined amount of force.

7. A method for preventing pets and small children from passing through an opening, the method comprising:
   providing a safety gate, the safety gate comprising:
      a frame for selective disposition in the opening, the frame comprising:
         a resizable horizontal base having a first end, and a second end, and a longitudinal axis extending therebetween, the resizable horizontal base being configured so that a distance extending between the first end and the second end is adjustable; and first and second upright arms, each of the first and second upright arms comprising a horizontal portion and a vertical portion, wherein the horizontal portion and the vertical portion are fixed to one another so that the first and second upright arms each has a generally L-shaped configuration;

the first and second upright arms being formed as separate components from one another, and as separate components from the resizable horizontal base, such that the frame can be stored with the resizable horizontal base and the vertical portions of the first and second upright arms extending parallel to one another; and the first and second upright arms being selectively connectable to the first and second ends, respectively, of the resizable horizontal base, such that the frame can be assembled into a generally U-shaped configuration; and a flexible barrier for mounting to the frame so as to prevent a pet or small child from passing through the space between the resizable horizontal base and the first and second upright arms;

wherein the horizontal portions of the first and second upright arms each comprise at least one opening, and further wherein the first end of the resizable horizontal base is receivable in the at least one opening in the horizontal portion of the first upright arm and the second end of the resizable horizontal base is receivable in the at least one opening in the horizontal portion of the second upright arm so as to connect the first and second upright arms to the first and second ends of the resizable horizontal base, whereby to provide the assembled frame; and wherein the first upright arm comprises a spring-biased spool for spooling the flexible barrier onto the first upright arm and a lock for selectively locking the spring-biased spool against movement, and further wherein the lock comprises:
(i) a locking element for reciprocal movement between (a) a first position in which the locking element is engaged with the spring-biased spool so as to enable locking of the spring-biased spool against movement, and (b) a second position in which the locking element is disengaged from the spring-biased spool so as to disable locking of the spring-biased spool against movement; and
(ii) a manually-operated gate for selectively preventing movement of the locking element between its first position and its second position;

connecting the first and second upright arms to the first and second ends, respectively, of the resizable horizontal base so as to assemble the frame into a generally U-shaped configuration;

positioning the frame across the opening so that the resizable horizontal base extends along the bottom of the opening and the first and second upright arms extend along opposing sides of the opening, with the first and second upright arms applying an outward force to opposing sides of the opening; and positioning the flexible barrier on the frame so as to prevent a pet or small child from passing through the space between the resizable horizontal base and the first and second upright arms.

8. A method according to claim 7 wherein the vertical portions of the first and second upright arms comprise a level to indicate when a sufficient amount of force is being applied to the first and second upright arms.

9. A method according to claim 7 wherein the safety gate further comprises:
at least one sensor mounted to the frame for sensing data relating to the state of the safety gate; and
a wireless communication system for transmitting data from the at least one sensor to a smart device.

10. A method according to claim 7 wherein the first and second upright arms comprise spring-biased bumpers.

11. A method according to claim 10 wherein the spring-biased bumpers comprise a visual indicator to indicate when the spring-biased bumpers achieve a pre-determined amount of force.

12. A method according to claim 11 wherein the visual indicator comprises a marking on the spring-biased bumper which is:
(i) visible when the spring-biased bumper does not achieve the pre-determined amount of force; and
(ii) not visible when the spring-biased bumper achieves or exceeds the pre-determined amount of force.

13. A method according to claim 7 further comprising:
detaching the flexible barrier from the frame;
removing the frame from the opening;
disconnecting the first and second upright arms from the first and second ends, respectively, of the resizable horizontal base so as to disassemble the frame; and
storing the frame with the resizable horizontal base and the vertical portions of the first and second upright arms extending parallel to one another.

14. A safety gate for preventing pets and small children from passing through an opening, the safety gate comprising:
a frame for selective disposition in the opening, the frame comprising:
a resizable horizontal base having a first end, a second end, and a longitudinal axis extending therebetween, the resizable horizontal base being configured so that a distance extending between the first end and the second end is adjustable; and first and second upright arms, each of the first and second upright arms comprising a horizontal portion and a vertical portion, wherein the horizontal portion and the vertical portion are fixed to one another so that the first and second upright arms each has a generally L-shaped configuration;

the first and second upright arms being formed as separate components from one another, and as separate components from the resizable horizontal base, such that the frame can be stored with the resizable horizontal base and the vertical portions of the first and second upright arms extending parallel to one another; and the first and second upright arms being selectively connectable to the first and second ends, respectively, of the resizable horizontal base, such that the frame can be assembled into a generally U-shaped configuration; and a flexible barrier for mounting to the frame so as to prevent a pet or small child from passing through the space between the resizable horizontal base and the first and second upright arms;

wherein the horizontal portions of the first and second upright arms each comprise at least one opening, and further wherein the first end of the resizable horizontal base is receivable in the at least one opening in the horizontal portion of the first upright arm and the second end of the resizable horizontal base is receivable in the at least one opening in the horizontal portion of the second upright arm so as to connect the first and second upright arms to the first and second ends of the resizable horizontal base, whereby to provide the assembled frame; and wherein the first upright arm comprises a spring-biased spool for spooling the flexible barrier onto the first upright arm and a lock for selectively locking the spring-biased spool against movement, and further wherein the lock comprises:
(i) a locking element for reciprocal movement between (a) a first position in which the locking element is engaged with the spring-biased spool so as to enable locking of the spring-biased spool against movement, and (b) a second position in which the locking element is disengaged from the spring-biased spool so as to disable locking of the spring-biased spool against movement; and
(ii) a manually-operated gate for selectively preventing movement of the locking element from its first position to its second position but not preventing movement of the locking element from its second position into its first position.

15. A safety gate according to claim 14 wherein the vertical portions of the first and second upright arms comprise a level to indicate when a sufficient amount of force is being applied to the first and second upright arms.

16. A safety gate according to claim 14 wherein the first and second upright arms comprise spring-biased bumpers.

17. A safety gate according to claim 16 wherein the spring-biased bumpers comprise a visual indicator to indicate when the spring-biased bumpers achieve a pre-determined amount of force.

18. A safety gate according to claim 17 wherein the visual indicator comprises a marking on the spring-biased bumper which is:
(i) visible when the spring-biased bumper does not achieve the pre-determined amount of force; and
(ii) not visible when the spring-biased bumper achieves or exceeds the pre-determined amount of force.

19. A safety gate according to claim 14 further comprising:
at least one sensor mounted to the frame for sensing data relating to the state of the safety gate; and
a wireless communication system for transmitting data from the at least one sensor to a smart device.

20. A method for preventing pets and small children from passing through an opening, the method comprising:
providing a safety gate, the safety gate comprising:
a frame for selective disposition in the opening, the frame comprising:
a resizable horizontal base having a first end, and a second end, and a longitudinal axis extending therebetween, the resizable horizontal base being configured so that a distance extending between the first end and the second end is adjustable; and
first and second upright arms, each of the first and second upright arms comprising a horizontal portion and a vertical portion, wherein the horizontal portion and the vertical portion are fixed to one another so that the first and second upright arms each has a generally L-shaped configuration;
the first and second upright arms being formed as separate components from one another, and as separate components from the resizable horizontal base, such that the frame can be stored with the resizable horizontal base and the vertical portions of the first and second upright arms extending parallel to one another; and
the first and second upright arms being selectively connectable to the first and second ends, respectively, of the resizable horizontal base, such that the frame can be assembled into a generally U-shaped configuration; and
a flexible barrier for mounting to the frame so as to prevent a pet or small child from passing through the space between the resizable horizontal base and the first and second upright arms;
wherein the horizontal portions of the first and second upright arms each comprise at least one opening, and further wherein the first end of the resizable horizontal base is receivable in the at least one opening in the horizontal portion of the first upright arm and the second end of the resizable horizontal base is receivable in the at least one opening in the horizontal portion of the second upright arm so as to connect the first and second upright arms to the first and second ends of the resizable horizontal base, whereby to provide the assembled frame; and
wherein the first upright arm comprises a spring-biased spool for spooling the flexible barrier onto the first upright arm and a lock for selectively locking the spring-biased spool against movement, and further wherein the lock comprises:
(i) a locking element for reciprocal movement between (a) a first position in which the locking element is engaged with the spring-biased spool so as to enable locking of the spring-biased spool against movement, and (b) a second position in which the locking element is disengaged from the spring-biased spool so as to disable locking of the spring-biased spool against movement; and
(ii) a manually-operated gate for selectively preventing movement of the locking element from its first position to its second position but not preventing movement of the locking element from its second position into its first position;
connecting the first and second upright arms to the first and second ends, respectively, of the resizable horizontal base so as to assemble the frame into a generally U-shaped configuration;
positioning the frame across the opening so that the resizable horizontal base extends along the bottom of the opening and the first and second upright arms extend along opposing sides of the opening, with the first and second upright arms applying an outward force to opposing sides of the opening; and
positioning the flexible barrier on the frame so as to prevent a pet or small child from passing through the space between the resizable horizontal base and the first and second upright arms.

21. A method according to claim 20 wherein the vertical portions of the first and second upright arms comprise a level to indicate when a sufficient amount of force is being applied to the first and second upright arms.

22. A method according to claim 20 wherein the first and second upright arms comprise spring-biased bumpers.

23. A method according to claim 22 wherein the spring-biased bumpers comprise a visual indicator to indicate when the spring-biased bumpers achieve a pre-determined amount of force.

24. A method according to claim 23 wherein the visual indicator comprises a marking on the spring-biased bumper which is:

(i) visible when the spring-biased bumper does not achieve the pre-determined amount of force; and
(ii) not visible when the spring-biased bumper achieves or exceeds the pre-determined amount of force.

25. A method according to claim 20 further comprising:
at least one sensor mounted to the frame for sensing data relating to the state of the safety gate; and
a wireless communication system for transmitting data from the at least one sensor to a smart device.

26. A method according to claim 20 further comprising:
detaching the flexible barrier from the frame;
removing the frame from the opening;
disconnecting the first and second upright arms from the first and second ends, respectively, of the resizable horizontal base so as to disassemble the frame; and
storing the frame with the resizable horizontal base and the vertical portions of the first and second upright arms extending parallel to one another.

\* \* \* \* \*